US006630747B1

(12) United States Patent
Kamada et al.

(10) Patent No.: US 6,630,747 B1
(45) Date of Patent: Oct. 7, 2003

(54) CONNECTOR AND CONTROL PATTERN CHANGE DEVICE, DATA CHANGE DEVICE AND FAILED AREA DETERMINATION DEVICE USING THIS CONNECTOR

(75) Inventors: Seiji Kamada, Hiratsuka (JP); Atsushi Nagira, Hiratsuka (JP); Hidenori Koizumi, Naka-gun (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/338,868

(22) Filed: Jun. 23, 1999

(30) Foreign Application Priority Data

Jun. 24, 1998 (JP) .......................................... 10-177778

(51) Int. Cl.$^{7}$ .................................................. B60L 1/00

(52) U.S. Cl. ....................... 307/10.1; 307/9.1; 307/147; 439/218; 439/221

(58) Field of Search ................................ 307/9.1, 10.1, 307/147; 439/218, 221

(56) References Cited

U.S. PATENT DOCUMENTS

| | | | | |
|---|---|---|---|---|
| 4,405,190 A | * | 9/1983 | Schroeder | 339/28 |
| 5,540,601 A | * | 7/1996 | Botchek | 439/502 |
| 6,134,887 A | * | 10/2000 | Bertotti et al. | 60/422 |

* cited by examiner

*Primary Examiner*—Brian Sircus
*Assistant Examiner*—Robert L. DeBeradinis
(74) *Attorney, Agent, or Firm*—Varndell & Varndell, PLLC

(57) ABSTRACT

A connection mode of connector members is changed so that a control signal for the same control direction (e.g. fore and back direction) of a control member is output from different terminals (a terminal for an arm drive signal) and (a terminal for a swing drive signal) of the connector member.

18 Claims, 24 Drawing Sheets

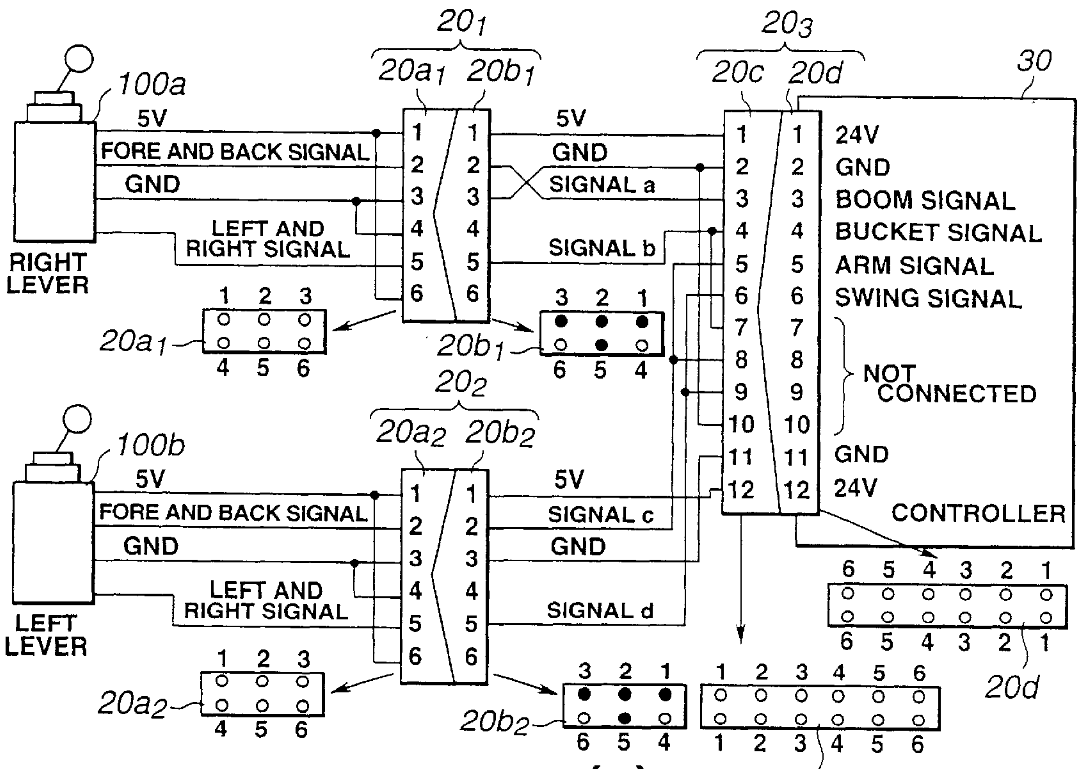

FIG.3(a)

| DIRECTION OF CONNECTOR | | CONNECTOR $20_3$ NORMAL | CONNECTOR $20_3$ REVERSE |
|---|---|---|---|
| CONNECTOR $20_1$ AS IS | NORMAL | FORE AND BACK → BOOM<br>LEFT AND RIGHT → BUCKET | FORE AND BACK → BOOM<br>LEFT AND RIGHT → SWING |
| | REVERSE | FORE AND BACK → BUCKET<br>LEFT AND RIGHT → BOOM | FORE AND BACK → SWING<br>LEFT AND RIGHT → BOOM |
| CONNECTOR ELEMENT $2b_2$ IS CONNECTED TO CONNECTOR ELEMENT $2a_1$ | NORMAL | FORE AND BACK → ARM<br>LEFT AND RIGHT → SWING | FORE AND BACK → ARM<br>LEFT AND RIGHT → BUCKET |
| | REVERSE | FORE AND BACK → SWING<br>LEFT AND RIGHT → ARM | FORE AND BACK → BUCKET<br>LEFT AND RIGHT → ARM |

COMBINATION OF RIGHT LEVER CONTROL DIRECTION AND OPERATION DIRECTION OF WORKING MACHINE

| DIRECTION OF CONNECTOR | | CONNECTOR $20_3$ NORMAL | CONNECTOR $20_3$ REVERSE |
|---|---|---|---|
| CONNECTOR $20_2$ AS IS | NORMAL | FORE AND BACK → ARM<br>LEFT AND RIGHT → SWING | FORE AND BACK → ARM<br>LEFT AND RIGHT → BUCKET |
| | REVERSE | FORE AND BACK → SWING<br>LEFT AND RIGHT → ARM | FORE AND BACK → BUCKET<br>LEFT AND RIGHT → ARM |
| CONNECTOR ELEMENT $2b_1$ IS CONNECTED TO CONNECTOR ELEMENT $2a_2$ | NORMAL | FORE AND BACK → BOOM<br>LEFT AND RIGHT → BUCKET | FORE AND BACK → BOOM<br>LEFT AND RIGHT → SWING |
| | REVERSE | FORE AND BACK → BUCKET<br>LEFT AND RIGHT → BOOM | FORE AND BACK → SWING<br>LEFT AND RIGHT → BOOM |

COMBINATION OF LEFT LEVER CONTROL DIRECTION AND OPERATION DIRECTION OF WORKING MACHINE

FIG.3(b)

(1)
CONNECTOR $20_1$: NORMAL
CONNECTOR $20_2$: NORMAL
CONNECTOR $20_3$: NORMAL
ISO PATTERN (2)
CONNECTOR $20_1$: NORMAL
CONNECTOR $20_2$: REVERSE
CONNECTOR $20_3$: NORMAL
PATTERN OF COMPANY A (3)
CONNECTOR $20_1$: NORMAL
CONNECTOR $20_2$: NORMAL
CONNECTOR $20_3$: REVERSE
PATTERN OF COMPANY B (4)
CONNECTOR $20_1$: REVERSE
CONNECTOR $20_2$: NORMAL
CONNECTOR $20_3$: REVERSE
$20_1$ $20_2$ SWITCH

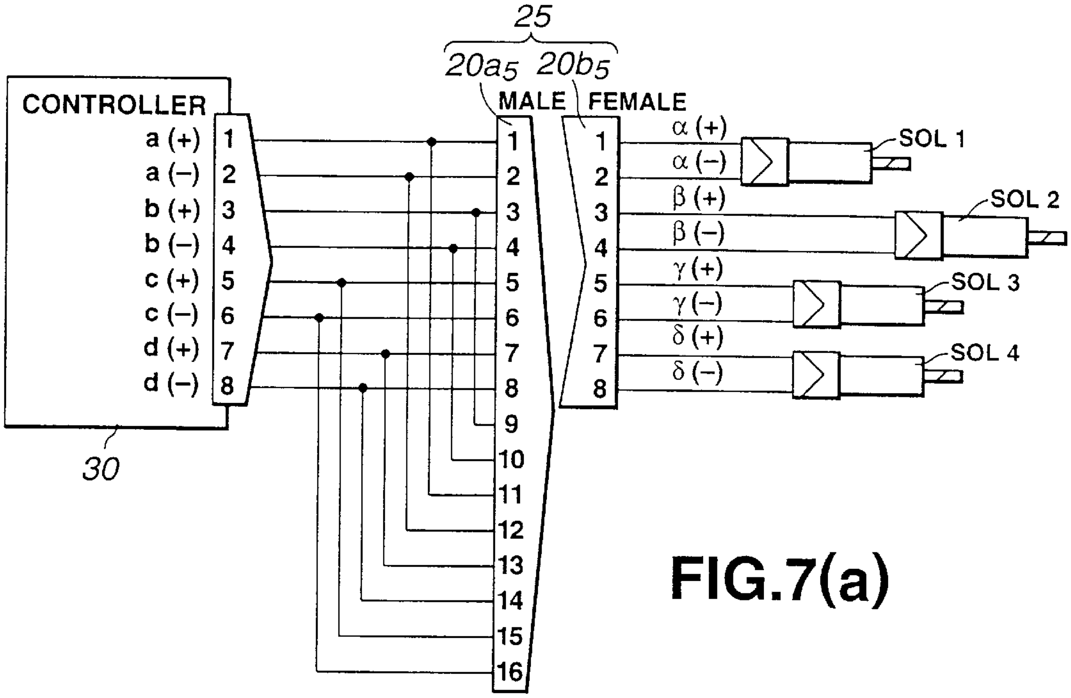
FIG.7(a)
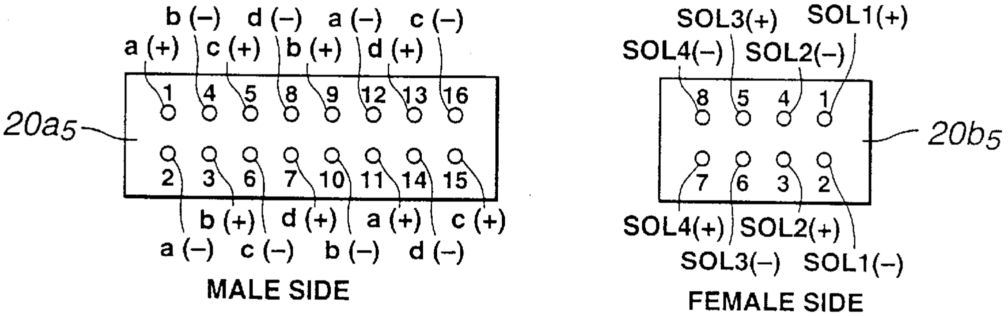
FIG.7(b)
| POSITION OF FEMALE SIDE CONNECTOR | CONNECTOR VERTICAL DIRECTION | CONTROL OUTPUT a | b | c | d |
|---|---|---|---|---|---|
| $20b_5$ [1 4 5 8 / 2 3 6 7] $20a_5$ | NORMAL | SOL1 | SOL2 | SOL3 | SOL4 |
| | REVERSE | SOL4 | SOL3 | SOL2 | SOL1 |
| $20a_5$ [5 8 9 12 / 6 7 10 11] $20b_5$ | NORMAL | SOL4 | SOL3 | SOL1 | SOL2 |
| | REVERSE | SOL2 | SOL1 | SOL3 | SOL4 |
| $20a_5$ [9 12 13 16 / 10 11 14 15] $20b_5$ | NORMAL | SOL2 | SOL1 | SOL4 | SOL3 |
| | REVERSE | SOL3 | SOL4 | SOL1 | SOL2 |
FIG.7(c)

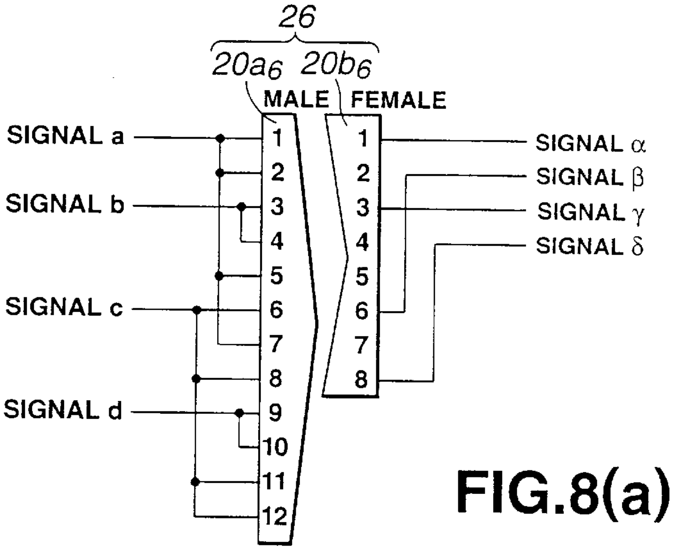

FIG.8(a)

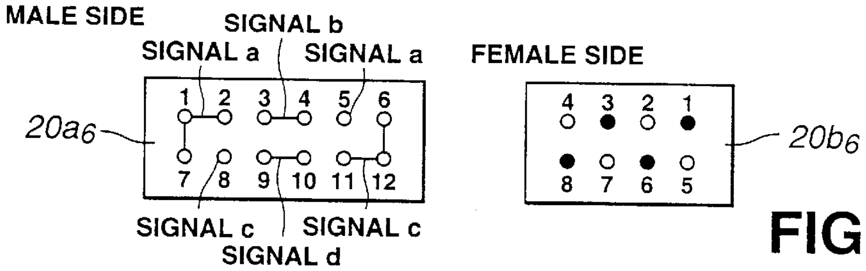

FIG.8(b)

| POSITION OF FEMALE CONNECTOR | CONNECTOR NORMAL | CONNECTOR REVERSE |
|---|---|---|
| 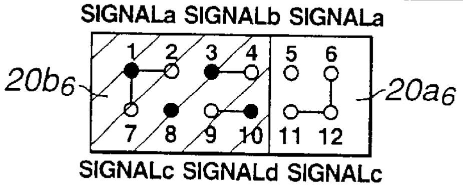 | SIGNAL α ← SIGNAL a<br>SIGNAL β ← SIGNAL c<br>SIGNAL γ ← SIGNAL b<br>SIGNAL δ ← SIGNAL d | SIGNAL α ← SIGNAL d<br>SIGNAL β ← SIGNAL b<br>SIGNAL γ ← SIGNAL c<br>SIGNAL δ ← SIGNAL a |
| 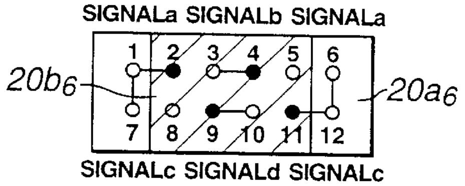 | SIGNAL α ← SIGNAL a<br>SIGNAL β ← SIGNAL d<br>SIGNAL γ ← SIGNAL b<br>SIGNAL δ ← SIGNAL c | SIGNAL α ← SIGNAL c<br>SIGNAL β ← SIGNAL b<br>SIGNAL γ ← SIGNAL d<br>SIGNAL δ ← SIGNAL a |
| 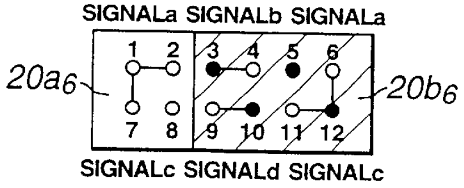 | SIGNAL α ← SIGNAL b<br>SIGNAL β ← SIGNAL d<br>SIGNAL γ ← SIGNAL a<br>SIGNAL δ ← SIGNAL c | SIGNAL α ← SIGNAL c<br>SIGNAL β ← SIGNAL a<br>SIGNAL γ ← SIGNAL d<br>SIGNAL δ ← SIGNAL b |

FIG.8(c)

CONNECTOR AND CONTROL PATTERN CHANGE DEVICE, DATA CHANGE DEVICE AND FAILED AREA DETERMINATION DEVICE USING THIS CONNECTOR

BACKGROUND OF THE INVENTION

1. Field of the Invention

The present invention relates to a control pattern change device, data change device and failed area determination device, and more particularly to a device suitable for applying to changing the control pattern of a construction machine, changing the data content of a controller of a construction machine, and the determination of a failed area of a construction machine.

2. Description of the Related Art

For such construction machines as shovels and cranes, the combination of control directions of a control lever and operation directions of a working machine (hereafter called control pattern) often differs depending on the manufacturing company and the model of the construction machine.

For example, when the control levers 100*a* and 100*b* are equipped at the left and right of the seating position of an operator, as shown in FIG. 19(*a*), the control direction of the control levers and the operating direction of the working machine are different, as shown in the ISO pattern in FIG. 19(*b*), the pattern of company A in FIG. 19(*c*) and the pattern of company B in FIG. 19(*d*).

In the case of the ISO pattern shown in FIG. 19(*b*), the fore and back control of the control lever 100*a* (left lever) is the arm control, and the left and right control is the swing control. If the control lever 100*a* is pushed forward, the arm is operated in the dumping direction. And if the control lever 100*a* is pulled backward, the arm is operated in the digging direction. In the same manner, if the control lever 100*a* is pushed to the left, the upper structure is operated in the left swing direction, and if the control lever 100*a* is pushed to the right, the upper structure is operated in the right direction. The fore and back control of the control lever 100*b* (right lever), on the other hand, is the boom control, and the left and right control is the bucket control. If the control lever 100*b* is pushed forward, the boom is operated in the downward direction, and if pulled backward, the boom is operated in the upward direction. If the control lever 100*b* is pushed to the left, the bucket is operated in the digging direction, and if pushed to the right, the bucket is operated in the dumping direction.

In the case of the pattern of company A shown in FIG. 19(*c*), the fore and back control of the control lever 100*a* (left lever) is the swing control, and the left and right control is the arm control. If the control lever 100*a* is pushed forward, the upper structure is operated in the right swing direction, and if pulled backward, the upper structure is operated in the right swing direction. If the control lever 100*a* is pushed to the left, the arm is operated in the dumping direction, and if pushed to the right, the arm is operated in the digging direction. The fore and back control of the control lever 100*b* (right lever), on the other hand, is the boom control, and the left and right control is the bucket control. If the control lever 100*b* is pushed forward, the boom is operated in the downward direction, and if pulled backward, the boom is operated in the upward direction. If the control lever 100*b* is pushed to the left, the bucket is operated in the digging direction, and if pushed to the right, the bucket is operated in the dumping direction. In the case of the pattern of company B shown in FIG. 19(*d*), the fore and back control of the control lever 100*a* (left lever) is the arm control, and the left and right control is the bucket control. If the control lever 100*a* is pushed forward, the arm is operated in the dumping direction, and if pulled backward, the arm is operated in the digging direction. If the control lever 100*a* is pushed to the left, the bucket is operated in the dumping direction, and if pushed to the right, the bucket is operated in the digging direction. The fore and back control of the control lever 100*b* (right lever), on the other hand, is the boom control, and the left and right control is the swing control. If the control lever 100*b* is pushed forward, the boom is operated in the downward direction, and if pulled backward, the boom is operated in the upward direction. If the control lever 100*b* is pushed to the left, the upper structure is operated in the left swing direction, and if pushed to the right, the upper structure is operated in the right swing direction.

In this way, the control pattern differs depending on the manufacturing company and the model of the construction machine.

So various control pattern change devices which can change the control pattern of a construction machine to a control pattern familiar to the operator have been proposed.

For example, there is a device which changes a control pattern by changing the software embedded in a controller 30, as shown in FIG. 20(*a*). In this device, a control pattern is selected from some control patterns stored in the controller 30, such as 91, 92, 93 and 94, by an external switch 90, so that the combination of control directions of the control lever and the operating directions of the working machine are easily changed.

However, simply changing the control pattern may not be allowed, such as on a public construction site where an ISO pattern is compulsory.

Also in the case of the above mentioned control pattern change device using the switch 90, a control pattern can easily be changed by a switch control, so on a site where operators who operate a construction machine frequently change, it is possible that the first operator has changed the control pattern, and the next operator, who does not know of the change, will control the machine incorrectly, and will cause an unexpected accident due to a control error.

Another problem is that not only adding hardware, such as the switch 90, but also adding software to change the control pattern is necessary. At the same time, a failure of the switch 90 may cause the working machine to operate differently than the intended control pattern, which lowers reliability.

There are another conventional techniques as shown in FIGS. 20(*b*) and 20(*c*). As FIG. 20(*b*) shows, the control signals for each control direction of the control levers 100*a* and 10*b*, which are electric levers, are input to the connector 22*c* at the controller 30 side via an electric signal wire and connectors 22*a* and 22*b*. The controller 30 generates control signals to operate the working machine in an operation direction according to the control direction input to each terminal of the connector 22, operating the working machine in the corresponding operation direction. To change the combination of control directions of the control lever 100*a* and the operating directions of the working machine here, the intermediate harness 95, which has different wiring according to the control pattern to be changed, is provided and inserted into the connector 20*a*, as shown in FIG. 20(*c*). This changes the combination of control directions to be input to each terminal of the connector 22*c*, and the combination of control directions of the control lever 100*a* and the operating directions of the working machine is changed.

In other words, the control pattern is changed using the intermediate harness 95, which means that an operator cannot easily change the control pattern at a site.

Another available device is where the above mentioned intermediate harness 95 is a cartridge type, and the control pattern is changed by changing the cartridge.

With the above mentioned prior art, however, parts must be added, and if the above mentioned intermediate harness 95 is used, intermediate harnesses 95 must be provided for the number of available control patterns for changing a control pattern, which increases cost.

Since the control pattern is changed via the intermediate harness 95 inserted into the connector 22*a*, space problems occur, such as the electric signal wire becomes long, for which a construction machine requires extra space.

Further, as another conventional problem, the controller 30 equipped to a construction machine generates control signals to control various hydraulic equipment. To control the swash plate of a hydraulic pump, for example, the swash plate of a hydraulic pump is controlled based on a predetermined p-q curve (p is the pump pressure, q is the displacement of the pump), so that the absorption torque of this hydraulic pump does not exceed a certain torque. This p-q curve differs depending on the model, specifications, type of attachment and other factors of the construction machine. Therefore the data content of this p-q curve must be changed depending on e.g. the model.

Conventionally an external switch box is disposed on the controller 30, and the above mentioned data content is changed by special control by a special key.

Or to change the data content, a personal computer is connected to the controller 30, and data is transferred to the controller 30 by a keyboard operation of the personal computer.

Such a change of data content, however, involves considerable preparation and requires operation skills. Therefore an operator without these skills cannot easily change the data content at a site.

Construction machines have equipment operated by various switches, such as wipers, lights and alarms. Normally a combination of the type of switch and the type of equipment, such as wipers, lights and alarms, (hereafter control pattern), is fixed.

However, depending on the model, the operator may want to change the above mentioned control pattern so that equipment is operated by a switch disposed at another location. For example, when a switch for the wipers fails, the operator may want to operate wipers using the switch disposed for lights, so that work can continue in rain without interruption.

Also when wipers do no operate, for example, it is required to quickly determine whether the failure occurred due to a switch or another cause at the site, so that the failure is remedied immediately.

SUMMARY OF THE INVENTION

With the foregoing in view, it is a first object of the present invention to provide a connector and a control pattern change device which require no added parts or software, that are free from such problems as increased installation space, have high reliability, and are free from control errors caused when a control pattern is very easily changed by a switch control.

It is a second object to provide a data change device where even an unskilled operator can easily change the data content of the controller.

It is a third object to provide a control pattern change device which can operate equipment by a switch disposed at another location, and can operate wipers using a switch for lights when a switch for the wipers fails by changing the control pattern so that work can be continued in rain without interruption.

It is a fourth object to provide a failure area determination device which determines a failure area quickly at the site as to whether the cause of the failure is a switch or other cause.

To achieve the first object, second object, third object and fourth object, a first aspect of the present invention is a connector comprising a first connector member having terminals each for receiving each input signal and a second connector member having terminals each for outputting each output signal, each terminal of the first connector member being connected with each terminal of the second connector member, wherein a same input signal is output from different terminals of the second connector member by changing a connection mode of the first connector member and the second connector member.

To achieve the first object, a second aspect of the present invention is a control pattern change device comprising control means for outputting control signals according to a control input, a first connector member having terminals each for receiving a control signal for each control direction of the control means, and a second connector member having terminals each for outputting a drive signal for each drive direction of an actuator, the actuator being driven in a drive direction according to a control direction of the control means by connecting each terminal of the first connector member and each terminal of the second connector member, wherein a control signal for a same control direction of the control means is output from different terminals of the second connector member to change a control pattern by changing a connection mode of the first connector member and the second connector member.

To achieve the first object, a third aspect of the present invention is a control pattern change device comprising control means for outputting control signals according to control inputs, a first connector member having terminals each for receiving a control signal for each control direction of the control means, and a second connector member having terminals each for outputting a drive signal for each drive direction of an actuator, the actuator being driven in a drive direction according to a control direction of the control means by connecting each terminal of the first connector member and each terminal of the second connector member, wherein a plurality of terminals are provided in the first connector member as terminals for receiving control signals in a same control direction of the control means, and each one of the terminals for receiving the control signal in the same control direction of the first connector member is connected to a different terminal of the second connector member to change a control pattern by changing a connection mode of the first connector member and the second connector member.

In accordance with the first aspect and the second aspect of the present invention, same input signals (e.g. fore and back direction control signals) are output from a terminal 2 (terminal for arm drive signals) and a terminal 5 (terminal for swing drive signals), which are different terminals of the connector member 20*b*, by changing the connection mode of the connector members 20*a* and 20*b*, as shown in FIGS. 1(*b*) and 1(*c*).

In accordance with the third aspect of the present invention, the control pattern is changed by changing the connection mode such that a terminal 2 to input control signals in the same direction (e.g. fore and back direction) of the connector member 20*a* is connected to a terminal 5, which is a different terminal, of the connector member 20*b*.

Since a control pattern can be changed by only one connector 20, such a new part as the intermediate harness 70, which is used in a prior art, need not be added and installation space does not increase. Also since a control pattern is not changed by the switching operation of the switch 80, reliability is high, and control errors, caused when a control pattern is very easily changed, do not occur here.

Also when arm control by the fore and back control of the control lever 100 is disabled due to failure, the left and right control of the lever can be used for arm control by changing the control pattern.

A fourth aspect of the present invention is the control pattern change device according to the second aspect or the third aspect of the present invention, wherein the control pattern is changed by changing an insertion direction of the first connector member to the second connector member.

In accordance with the fourth aspect of the present invention, if the connector members 20*a* and 20*b* shown in FIG. 1(*c*) are connected without changing the vertical state of the connection surfaces, the control pattern is changed to the "ISO pattern", and if the connector members 20*a* and 20*b* shown in FIG. 1(*c*) are connected by turning the connection face of one connector member (e.g. 20*a*) of the connector members 20*a* and 20*b* upside down, the control pattern is changed to the "pattern of company A".

A fifth aspect of the present invention is the control pattern change device according to the second aspect or the third aspect of the present invention wherein the first connector member has a plurality of insertion faces for the second connector member, and the control pattern is changed by changing the insertion face of the first connector member.

In accordance with the fifth aspect of the present invention, the connector member 20*a*" has a plurality of (2) insertion faces for the connector member 20*b*", as shown in FIGS. 2(*a*), 2(*b*) and 2(*c*), and the control pattern is changed by changing a face (face in arrow A direction, or face in arrow B direction) to which the connector member 20*b*" is inserted.

A sixth aspect of the present invention is the control pattern change device according to the second aspect or the third aspect of the present invention, wherein the control pattern is changed by changing the control input of the first connector member to the second connector member.

In accordance with the sixth aspect, the control pattern is changed by changing the control input of the connector member 20*b*7 to the connector member 20*a*7, (FIG. 9(*a*) shows the first step insertion position, and FIG. 9(*b*) shows the second step insertion position), as shown in FIGS. 9(*a*), 9(*b*) and 9(*c*).

To achieve the second object, a seventh aspect of the present invention is a data change device comprising a first connector member having terminals each for receiving a signal, and a second connector member having terminals each for outputting a control signal to a controller, data being input to the controller to change a data content by connecting each terminal of the first connector member and each terminal of the second connector member, wherein the data content to be input to the controller is changed by changing a connection mode of the first connector member and the second connector member.

An eighth aspect of the present invention is the data change device according to the seventh aspect of the present invention, wherein at least two terminals of the first connector member are electrically connected, at least one terminal of the second connector member conducts electric signals at logic 1 level, which are output from the controller, and the content of digital data to be input to the controller is changed by changing the connection mode of the first connector member and the second connector member.

In accordance with the first aspect and the seventh aspect of the present invention, the content of data "11", "01", "10" and "00" to be input to the controller 30 is changed by changing the connection mode of the first connector member 20*c*2 and the second connector member 20*d*2, as shown in FIGS. 11(*a*) and 11(*b*).

Also in accordance with the eighth aspect of the present invention, the terminals 1, 2 and 3 of the connector member 20*c*2, for example, are electrically connected, as shown in FIG. 11(*a*). On the other hand, a ground potential GND is supplied to the terminal 1 of the connector member 20*d*2. As a consequence, as FIG. 11(*b*) shows, the electrical connection state of each terminal 1 to 4 on the connection surface of the connector member 20*d*2 (terminals electrically connected are connected with a line) changes according to the connection mode of the connector 21, and accordingly, the binary digital data "11", "01", "10" or "00" to be input to the controller 30 is changed.

As described above, in accordance with the first aspect, the seventh aspect and the eighth aspect of the present invention, data is changed merely by changing the connection mode of the connector 21, where the preparation for a data change is simple and no special skill is required for that operation therein. Therefore even an operator without special operation skills can easily change the data content at the site.

To achieve the third aspect, a ninth aspect of the present invention is a control pattern change device comprising control means for outputting control signals, a first connector member having terminals each for receiving a control signal to each one of the control means, and a second connection member having terminals each for outputting a drive signal to each equipment, a corresponding equipment being driven according to the control of the control means by connecting each terminal of the first connector member and each terminal of the second connector member, wherein a control signal of a same control means is output from different terminals of the second connector member to change a control pattern by changing a connection mode of the first connector member and the second connector member.

To achieve the third object, a tenth aspect of the present invention is a control pattern change device comprising control means for outputting control signals, a first connector member having terminals each for receiving a control signal to each one of the control means, and a second connector member having terminals each for outputting a drive signal to each equipment, a corresponding equipment being driven according to the control of the control means by connecting each terminal of the first connector member and each terminal of the second connector member, wherein a plurality of terminals are provided in the first connector as terminals to receive the control signals of a same control means, and each one of the plurality of terminals to receive the control signal of the same control means of the first connector member is connected to a different terminal of the second connector member to change a control pattern by changing a connection mode of the first connector member and the second connector member.

In accordance with the ninth aspect of the present invention, the connection mode of the connector members 20$a$3 and 20$b$3 can be changed and the same input signals (e.g. signal which switch X inputs) are output as drive signals $\alpha$ and $\gamma$ from the terminals 1 and 3, which are different terminals, of the connector member 20$b$3, as shown in FIGS. 4($a$), 4($b$) and 4($c$).

In accordance with the tenth aspect of the present invention, the control pattern is changed by changing the connection mode such that each one of the plurality of terminals 1 and 6 to input the control signals of the same control means (e.g. switch X) of the connector member 20$a$3 is connected to the terminals 1 and 3, which are different terminals, of the connector member 20$b$3.

Here equipment operated by various switch controls, such as wipers, lights and alarms, are equipped in a construction machine. Normally a combination of the type of switches and type of such equipment as wipers, lights and alarms, is fixed.

However, depending on the model of the machine, an operator may want to change the above mentioned control pattern so that the equipment is operated by a switch disposed at another location.

In accordance with the first aspect, the ninth aspect and the tenth aspect of the present invention, such a change of the control pattern can be easily executed merely by changing the connection mode of the connector 23.

Also, if a switch X for wipers fails, it is possible to operate the wipers using a switch Y disposed for lights, so that work in rain can continue without interruption.

To achieve the fourth object, an eleventh aspect of the present invention is a failed area determination device comprising control means for outputting control signals, a first connector member having terminals each for receiving a control signal of each one of the control means, and a second connector member having terminals each for outputting a drive signal to each equipment, a failed area in cased of driving a corresponding equipment according to the control of the control means being determined by connecting each terminal of the first connector member and each terminal of the second connector member, wherein a control signal of a same control means is output from different terminals of the second connector member by changing a connection mode of the first connector member and the second connector member, and the failed area is determined based on the drive signals output from each terminal of the second connector member for each connection mode of the first connector member and the second connector member.

To achieve the fourth object, a twelfth aspect of the present invention is a failed area determination device comprising a first connector member terminals each for receiving each input signal and a second connector member having terminals each for outputting a drive signal to each equipment, a failed area in case of driving a corresponding equipment being determined according to the input signal by connecting each terminal of the first connector member and each terminal of the second connector, wherein a same input signal is output from different terminals of the second connector member by changing the connection mode of the first connector member and the second connector member, and the failed area is determined based on the drive signal output from each terminal of the second connector member for each connection mode of the first connector member and the second connector member.

Now it is assumed that the wipers do not operate even if switch X is ON during operation in the "normal control pattern" shown in FIG. 4($c$).

So the connection mode of the connector 23 is changed to check the operation when changed to "the first change pattern". If the alarm is operated by a control signal y, which is output from the switch X, for wipers, and the wipers are not operated by a control signal $\alpha$, which is output from the switch Y for lights at this time, then it can be determined that the switch X for wipers is normal and the wiper drive control system, other than switch X, is abnormal. If, on the other hand, the alarm is not operated by the control signal $\gamma$, which is output from the switch X for wipers, and the wipers are operated by the control signal $\alpha$, which is output from the switch Y for lights, then it can be determined that the wiper drive control system, other than the switch X, is normal, and the switch X for wipers is abnormal.

In this way, in accordance with the first aspect, the eleventh aspect and the twelfth aspect of the present invention, when wipers, for example, do not operate during the operation of the construction machine, whether the failed area is caused by a switch can be quickly determined at the site so as to be remedied immediately.

BRIEF DESCRIPTION OF THE DRAWINGS

FIGS. 7($a$) to 7($c$) are drawings depicting a configuration of an embodiment of the control pattern change device in accordance with the present invention;

FIGS. 8($a$) to 8($c$) are drawings depicting a variant form of FIG. 7;

DESCRIPTION OF THE PREFERRED EMBODIMENTS

Embodiments of the connector, control pattern change device, data change device and failed area determination device of the present invention will now be described with reference to the accompanying drawings.

At first, an embodiment of a device to change the control pattern for the combination of the control direction of the control level and the operation direction of the working machine will be described referring to FIGS. 1(*a*), 1(*b*) and 1(*c*).

This embodiment is based on the assumption that each working machine of a construction machine is operated by the left and right control levers, as described in FIG. 19(*a*). Of the left and right control levers, the left control lever is used for explanation. Here it is assumed that the control pattern is changed from the "ISO pattern" shown in FIG. 19(*b*) to "the pattern of company A" shown in FIG. 19(*c*). Change to the right lever and to another control pattern is implemented in the same way as in this embodiment.

Figure 1A:
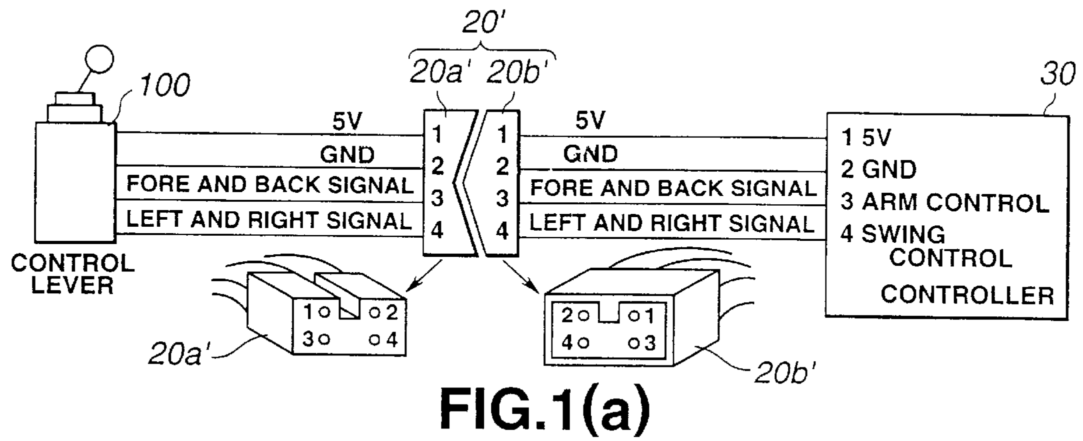
FIGS. 1($a$) to 1($c$) are drawings depicting configurations of an embodiment of the control pattern change device in accordance with the present invention.
Figure 1B:
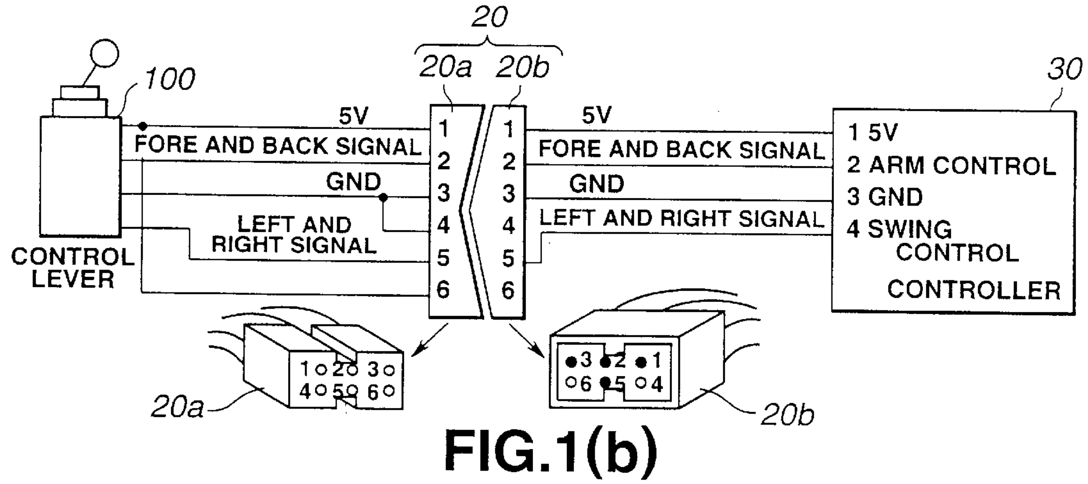
Figure 1C:
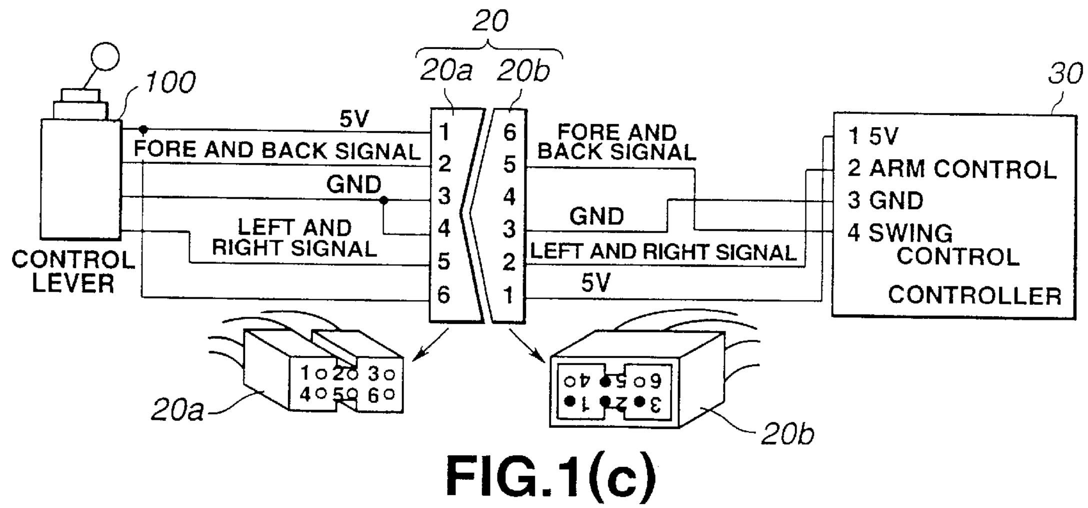

FIG. 1(*a*) shows a state where the "ISO pattern" is set using a conventional connector 20'. FIG. 1(*b*) shows a state where the control pattern is changed to the "ISO pattern" using the connector of the present invention, and FIG. 1(*c*) shows a state where the control state is changed to the "pattern of company A" using the connector of the present invention.

As FIG. 1(*a*) shows, in the case of the conventional connector 20', the concave portion is formed at the upper part of the connection face of the connector member 20*a*', and this concave portion inter fits with the convex portion formed at the upper part of the connection face of the connector member 20*b*'.

When the connector members are connected such that the concave portion of the connector member 20*a*' interfits with the convex portion of the connector member 20*b*', the terminals 1 to 4 of the connector member 20*a*' are connected to the terminals 1 to 4 of the connector member 20*b*' respectively.

The terminals 1, 2, 3 and 4 are disposed in the controller 30, and a 5V potential is supplied from the terminal 1 to the control lever 100 via an electric signal wire. In the same way, a ground potential GND is supplied from the terminal 2 of the controller 30 to the control lever 100 via an electric signal wire.

Since the control lever 100 is an electric lever, a ground potential GND must be supplied from the controller 30 to the electric lever 100 in order to output electric signals at the ground potential level corresponding to the minimum value of the control input from a potentiometer, which is not illustrated, attached to the control lever 100. In the same way, a 5V potential must be supplied from the controller 30 to the electric lever 100 in order to output a 5V potential of electric signals corresponding to the maximum value of the control input from the potentiometer. The terminal 1 of the connector members 20*a*' and 20*b*' is to supply a 5V potential to the electric lever 100, and the terminal 2 is to supply a ground potential GND.

When a control signal of the control lever 100 is input to the terminal 3 of the controller 30, a drive control signal for driving a hydraulic cylinder for an arm is generated by the controller 30 responding to the control signal, and the drive control signal is output to the hydraulic cylinder for the arm. By this signal, the arm is operated in the digging direction or dumping direction.

In the same way, when a control signal of the control lever 100 is input to the terminal 4 of the controller 30, a drive control signal for driving the hydraulic motor for swinging is generated by the controller 30 responding to this signal, and this drive control signal is output to the hydraulic motor for swinging. By this signal, the upper structure is operated in the left swing direction or right swing direction.

A control signal indicating a control input in the fore and back direction is input from the control lever 100 to the terminal 3 of the connector members 20*a*' and 20*b*' via an electric signal wire. This control signal is then output to the terminal 3 of the controller 30.

In the same way, a control signal indicating a control input in the left and right direction is input from the control lever 100 to the terminal 4 of the connector members 20*a*' and 20*b*' via an electric signal wire. This control signal is then output to the terminal 4 of the controller 30.

In other words, if the connector members 20*a*' and 20*b*'are connected after changing the insertion direction of the connector member 20*a*' to the connector member 20*b*' by turning the connector member 20*b*' upside down, for example, then the terminal for supplying a 5V potential of the connector member 20*a*' is connected to the terminal 4 for swing control of the connector member 20*b*', and the terminal 2 for supplying a ground potential GND of the connector member 20*a*' is connected to the terminal 4 for fore and back control of the connector member 20*b*'.

So in the case of the conventional connector 20', a concave portion, to which a convex portion formed at the upper part of the connection face of the connector member 20*b*' is interfit, is formed at the upper part of the connection face of the connector member 20*a*', to prevent connection while changing the connection mode of the connector members 20*a*' and 20*b*', so that the arm or the hydraulic motor will not cause an unexpected accident or damage the controller 30 by making a mistake in the connection mode of the connector member 20*a*'and 20*b*' or by connecting the connector members 20*a*' and 20*b*'in a different connection direction while turning the connector member 20*b*' upside down.

The control pattern change device of the present invention, on the other hand, can be connected even if the connection mode of the connector members is changed.

This control pattern change device, as FIG. 1(*b*) shows, comprises a left control lever 100 as an electric lever, a controller 30 which outputs drive control signals to an actuator for operating the working machine based on the control signals which are output from the control lever 100, and a connector 20 which changes the control pattern depending on the connection mode of the connector member 20*a* at the male side and the connector member 20*b* at the female side.

Terminals 1 to 6 are disposed in each connector 20*a* and 20*b* of the connector 20 so that a ground potential GND is supplied from the controller 30 to the electric lever 100 without fail and a 5V potential is supplied from the controller 30 to the electric lever 100 without fail even if the connection mode of these connectors 20*a* and 20*b* is different.

The connector member 20*a* has each terminal 1 to 6, and the terminal 1 of the connector member 20*a* is a terminal for supplying a 5V potential, and a 5V potential is supplied from this terminal 1 for supplying a 5V potential to the electric lever 100 via an electric signal wire. In the same way, the terminal 3 of the connector member 20*a* is a terminal for supplying a ground potential GND, and the ground potential GND is supplied from this terminal 3 for supplying a ground potential GND to the electric lever 100 via an electric signal wire.

Signal wires branched from each one of the above mentioned electric signal wires are connected to the terminals 4 and 6 of the connector member 20*a*. In other words, a ground potential GND is supplied from the terminal 4 of the connector member 20*a* to the electric lever 100 via an electric signal wire. In the same way, a 5V potential is supplied from the terminal 6 of the connector member 20*a* to the electric lever 100 via an electric signal wire.

A control signal indicating a control input in the fore and back directions is input from the control lever 100 to the terminal 2 of the connector member 20*a* via an electric signal wire. In the same way, a control signal indicating a control input in the left and right direction is input from the control lever 100 to the terminal 5 of the connector member 20*a* via an electric signal wire.

The terminal 1 of the connector member 20*b*, on the other hand, is connected to the terminal 1 for supplying a 5V potential of the controller 30 via an electric signal wire. In the same way, the terminal 3 of the connector member 20*b* is connected to the terminal 3 for supplying a ground potential GND of the controller 30 via an electric signal wire. The terminal 2 of the connector member 20*b* is connected to the terminal 2 for controlling the arm of the controller 30 via an electric signal wire. In the same way, the terminal 5 of the connector member 20*b* is connected to the terminal 4 for controlling the swing of the controller 30 via an electric signal wire. The other terminals 4 and 6 of the connector member 20*b* are not connected.

In each upper and lower part of the connection face of the connector member 20*a*, the concave portions, to which convex portions formed in each upper and lower part of the connection face of the connector member 20*b* interfit respectively, are formed.

When both connector members are connected such that the convex portion of the connector member 20*b* interfit with the concave portion of the connector member 20*a*, the terminals 1 to 6 of the connector member 20*b* are connected with the terminals 1 to 6 of the connector member 20*b* respectively, as shown in FIG. 1(*b*).

At this time, the fore and back direction control signals, which are output from the control lever 100, are input to the terminal 2 for controlling the arm of the controller 30 via the terminal 2 of the connector member 20*a* and the terminal 2 of the connector member 20*b*. The left and right direction control signals, which are output from the control lever 100, are input to the terminal 4 for controlling the swing of the controller 3 via the terminal 5 of the connector member 20*a* and the terminal 5 of the connector member 20*b*.

A 5V potential is supplied to the control lever 100 via the terminal 1 for supplying a 5V potential of the controller 30, the terminal 1 of the connector member 20*b* and terminal 1 for supplying a 5V potential of the connector member 20*a*. In the same way, a ground potential GND is supplied to the control lever 100 via the terminal 3 for supplying a ground potential GND of the controller 30, the terminal 3 of the connector member 20*b*, and the terminal 3 for supplying a ground potential GND of the connector member 20*a*. As a consequence, the control pattern is changed to the "ISO pattern" shown in FIG. 19(*b*).

Here if the connector member 20*b* is turned upside down to change the insertion direction of the connector member 20*a* to the connector member 20*b* from the state shown in FIG. 1(*b*), and if these connector members 20*a* and 20*b* are connected, then the terminals 1 to 6 of the connector member 20*a* are connected to the terminals 6 to 1 of the connector member 20*b* respectively, as shown in FIG. 1(*c*).

At this time, the fore and back direction control signals, which are output from the control lever 100, are input to the terminal 4 for the swing of the controller 30 via the terminal 2 of the connector member 20*a* and the terminal 5 of the connector member 20*b*. The left and right direction control signals, which are output from the control lever 100, are input to the terminal 2 for controlling the arm of the controller 30 via the terminal 5 of the connector member 20*a* and the terminal 2 of the connector member 20*b*.

A 5V potential is supplied to the control lever 100 via the terminal 1 for supplying a 5V potential of the controller 30, the terminal 1 of the connector member 20*b*, and the terminal 6 for supplying a 5V potential of the connector member 20*a*. In the same way, a ground potential GND is supplied to the control lever 100 via the terminal 3 for supplying a ground potential GND of the controller 30, the terminal 3 of the connector member 20*b* and the terminal 4 for supplying a ground potential GND of the connector member 20*a*. As a consequence, the control pattern is changed to the "pattern of company A" shown in FIG. 19(*c*).

As described above, in accordance with this embodiment, a control pattern is changed by changing the connection mode of the connector members 20*a* and 20*b*, so that such a new part as the intermediate harness 70, which is used for a prior art, need not be added and installation space is not increased. Also, since a control pattern is not changed by the switching operation of the switch 80, reliability is high, and control errors, which are caused when a control pattern can be changed very easily, do not occur here.

Also, when the arm control by the fore and back control of the control lever 100 is disabled due to failure, the left and right control of the lever can be used for the arm control by changing the control pattern.

In this embodiment, control mode is changed such that the terminal 2 to input the control signal for a same control direction (e.g. fore and back direction) of the connector member 20*a* is connected to the terminal 5, which is a different terminal, of the connector member 20*b* in order to change the control pattern, but the connector 20 is not restricted to such a configuration.

Figure 2A:
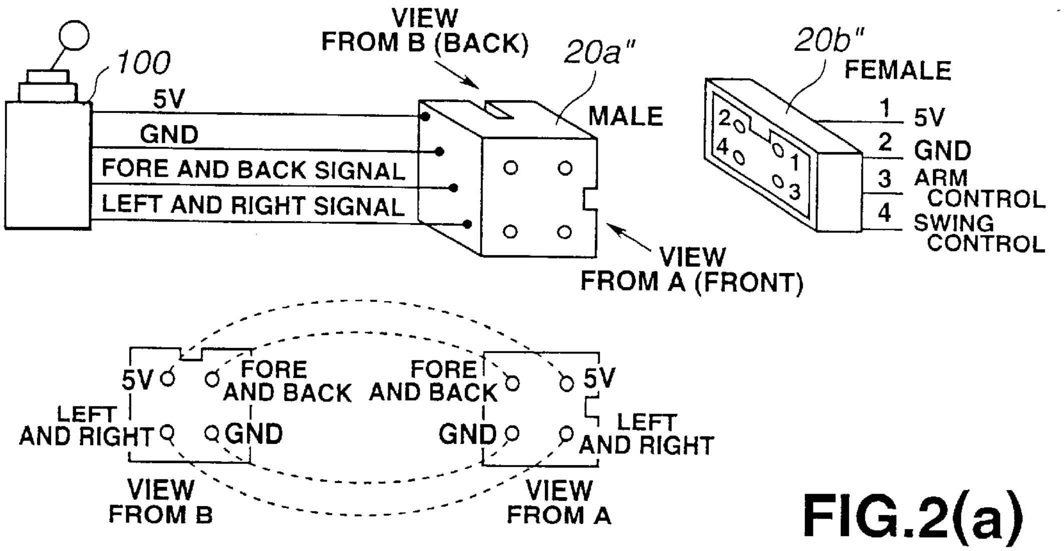
FIGS. 2($a$) to 2($c$) are drawings depicting a configuration of an embodiment of the control pattern change device in accordance with the present invention.
Figure 2B:
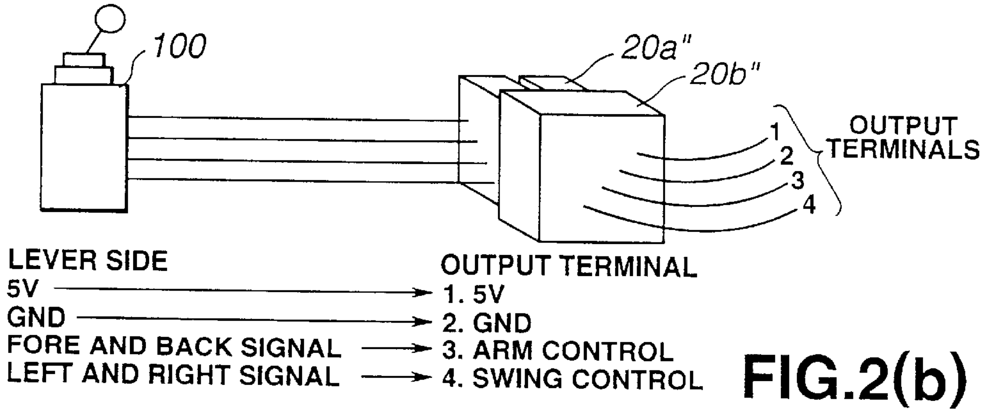
Figure 2C:
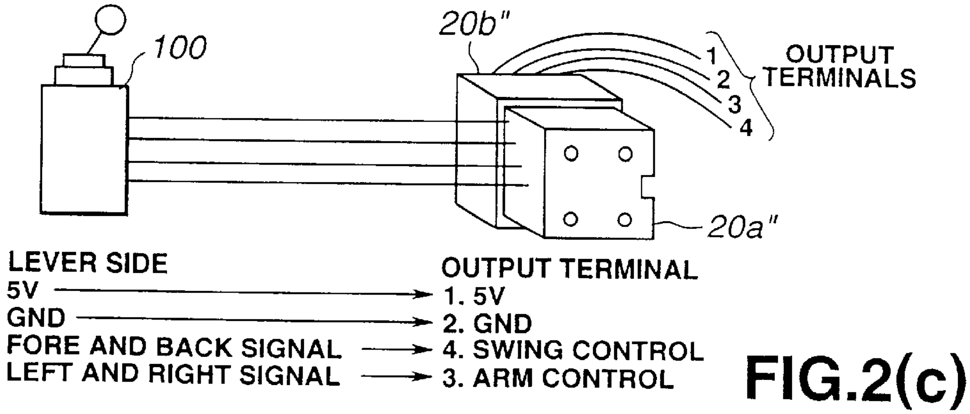

Also in this embodiment, the control pattern is changed by changing the insertion direction of the connector member 20*a* to the connector member 20*b*, but the control pattern may be changed by providing the connector member 20*a*' with a plurality of insertion faces (2 faces) for the connector member 20*b*', and by changing the face to which the connector member 20*b*' is inserted, as FIG. 2 shows.

As FIG. 2(*a*) shows, the connector member 20*a*" at the control lever 100 side is cubic, and 4 terminals, that is, a terminal to input fore and back direction control signals, a terminal to input left and right direction control signals, a terminal for supplying a 5V potential, and a terminal for supplying a ground potential GND, are disposed in different modes on the connection face on the front face (view from A) and on the connection face on the back face (view from B). On the connection face of the connector member 20*b*" at the controller 30 side, on the other hand, terminals 1, 2, 3 and 4, to be connected to the terminal 1 for supplying a 5V potential, the terminal 2 for supplying a ground potential GND, the terminal 3 for controlling the arm, and the terminal 4 for controlling the swing, are disposed.

If the concave portion formed in the connector member 20*b*" is interfit with the convex portion formed in the front face (view from A) of the connector member 20*a*", as shown in FIG. 2(*b*), then the fore and back direction control signals, which are output from the control lever 100, are input to the control terminal 3 for controlling the arm of the controller 30 via the terminal 3 of the connector member 20". The left and right direction control signals, which are output from the control lever 100, are input to the terminal 4 for controlling the swing of the controller 30 via the terminal 4 of the connector member 20"*b*. Also a 5V potential is supplied to the control lever 100 via the terminal 1 for supplying a 5V potential of the controller 30, and the terminal 1 of the connector member 20"*b*. In the same way, a ground potential GND is supplied to the control lever 100 via the terminal 2 for supplying a ground potential GND of the controller 30 and the terminal 2 of the connector member 20"*b*. As a consequence, the control pattern is therefore changed to the "ISO pattern" shown in FIG. 19(*b*).

If the concave portion formed in the connector member 20*b*" is interfit with the convex portion formed in the back face (viewed from B) of the connector member 20*a*", as shown in FIG. 2(*c*), then the fore and back direction control signals, which are output from the control lever 100, are input to the terminal 4 controlling the swing of the controller 30 via the terminal 4 of the connector member 20"*b*. The left and right control signals, which are output from the control lever 100, are input to the terminal 3 for controlling the arm of the controller 30 via the terminal 3 of the connector member 20"*b*. Also a 5V potential is supplied to the control lever 100 via the terminal 1 for supplying a 5V potential of the controller 30 and the terminal 1 of the connector member 20"*b*. In the same way, a ground potential GND is supplied to the control lever 100 via the terminal 2 for supplying a ground potential GND of the controller 30 and the terminal 2 of the connector member 20"*b*. As a consequence, the control pattern is changed to the "pattern of company A" shown in FIG. 16(*c*).

While the connection mode of one connector 20 is changed in the above embodiment, an embodiment where the control pattern is changed by changing the connection mode of three connectors, 201, 202 and 203, is explained next referring to FIGS. 3(*a*), 3(*b*) and 3(*c*).

Figure 3C:
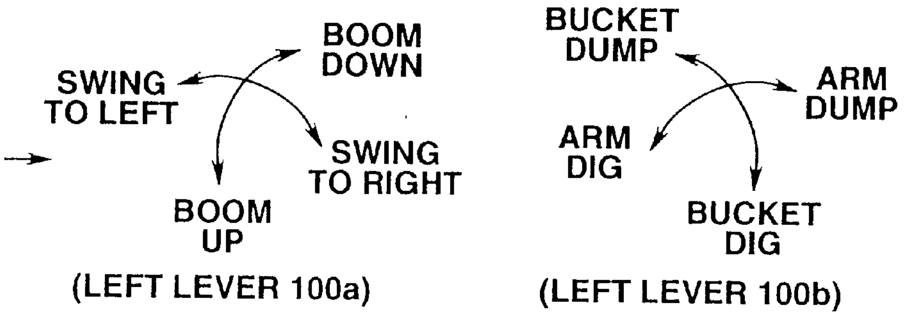
FIGS. 3($a$) to 3($c$) are drawings depicting a variant form of FIG. 1.

As FIG. 3(*a*) shows, three connectors, that is, a connector 201 disposed corresponding to the right control lever 100*b*, a connector 202 disposed corresponding to the left control lever 100*a*, and a connector 303 disposed in the controller 30, are used in this embodiment. The connector 201 comprises connector members 20*a*1 and 20*b*1, the connector 202 comprises connector members 20*a*2 and 20*b*2, and the connector 203 comprises connector members 20*c* and 20*d*. The connector 201 and the connector 202 are connectors having 6 pins, just like the connector shown in FIG. 1(*e*).

In the connector member 20*d* of the connector 203 at the controller 30 side, terminals 1 to 12 are disposed, where a 5V potential is supplied from the terminals 1 and 12 to the control levers 100*a* and 100*b* by a 24V battery via an electric signal wire. In the same manner, a ground potential GND is supplied from the terminals 2 and 11 of the connector member 20*d* to the control levers 100*a* and 100*b* via an electric signal wire. When the control signals of the control levers 100*a* and 100*b* are input to the terminal 3 of the connector member 20*d*, drive control signals for driving a hydraulic cylinder for the boom are generated in the controller 30 responding to these control signals, and the drive control signals are output to the hydraulic cylinder for the boom. This operates the boom in the upward or downward direction.

In the same way, when control signals of the control levers 100*a* and 100*b* are input to the terminal 4 of the connector member 20*d*, drive control signals for driving a hydraulic cylinder for a bucket are generated in the controller 30 responding to these control signals, and the drive control signals are output to the hydraulic cylinder for the bucket. This operates the bucket in the digging or dumping direction.

In the same way, when control signals of the control levers 100*a* and 100*b* are input to the terminal 5 of the connector member 20*d*, drive control signals for driving a hydraulic cylinder for an arm are generated in the controller 30 responding to these control signals, and the drive control signals are output to the hydraulic cylinder for the arm. This operates the arm in the digging or dumping direction.

In the same way, when the control signals of the control levers 100*a* and 100*b* are input to the terminal 6 of the connector member 20*d*, drive control signals for driving a hydraulic motor for swing are generated in the controller 30 responding to these control signals, and the drive control signals are output to the hydraulic motor for swing. This operates the upper structure in the left or right swing direction.

The terminals 7, 8, 9 and 10 of the connector member 20*d*are not connected.

The terminal 1 of the connector member 20*c* is connected to the terminal 1 of the connector member 20*b*1, the terminal 2 of the connector member 20*c* is connected to the terminal 3 of the connector member 20*b*1, the terminal 3 of the connector member 20*c* is connected to the terminal 2 of the connector member 20*b*1, the terminal 4 of the connector member 20*c* is connected to the terminal 5 of the connector member 20*b*1, the terminal 5 of the connector member 20*c* is connected to the terminal 2 of the connector member 20*b*2, the terminal 6 of the connector member 20*c* is connected to the terminal 5 of the connector member 20*b*2, the terminal 7 of the connector member 20*c* is connected to the terminal 5 of the connector member 20*b*1, the terminal 8 o f the connector member 20*c* is connected to the terminal 2 of the connector member 20*b*2, the terminal 9 of the connector member 20*c* is connected to the terminal 5 of the connector member 20*b*2, the terminal 10 of the connector member 20*c* is connected to the terminal 2 of the connector member 20*b*1, the terminal 11 of the connector member 20*c* is connected to the terminal 3 of the connector member 20*b*2, and the terminal 12 of the connector member 20*c* is connected to the terminal 1 of the connector member 20*b*2.

The connection mode of the connectors 201, 202 and 203 can be switched by reversing the top and bottom connections, as explained referring to FIG. 1. Also the connector members of the connector 201 and the connector 202 can be exchanged.

In other words, the connector member 20*b*2 can be connected to the connector member 20*a*2, and the connector member 20*b*1 can be connected to the connector member 20*a*2.

The connection state shown in FIG. 3(*a*) is defined as a "normal" connection state, and the state where one of the connector members of the connector in the above state is turned upside down and connected is defined as a "reverse" connection state.

FIG. 3(*b*) shows the relationship of the "normal" and the reverse connection states of each connector 201, 202 and 203, the control direction of the control lever which changes according to the switching of the members of the connector 201 and the connector 202, and the operation direction of the corresponding working machine. The left table in FIG. 3(*b*) shows the relationship of the control direction of the right lever 100*b* and the operating direction of the corresponding working machine, and the right table in FIG. 3(*b*) shows the relationship of the control direction of the left lever 100*b* and the operating direction of the corresponding working machine.

As FIG. 3(*c*) shows, if the connector 201 is in a "normal" connection state, the connector 202 is in a "normal" connection state and the connector 203 is in a "normal" connection state without switching the members of the connector 201 and the connector 202 (the connection state shown in FIG. 3(*a*)), then the control pattern is changed to the "ISO pattern" shown in FIG. 19(*b*).

If the connector 201 is in a "normal" connection state, the connector 202 is in a "reverse" connection state, and the connector 203 is in a "normal" connection state without switching the members of the connector 201 and the connector 202, then the control pattern is changed to the "pattern of company A".

If the connector 201 is in a "normal" connection state, the connector 202 is in a "normal" connection state", and the connector 203 is in a "reverse" connection state without switching the members of the connector 201 and the connector 202, then the control pattern is changed to the "pattern of company B".

If the connector 201 (the connector member 20*a*1 and the connector member 20*b*2) for the right control lever 100*b* is in a "reverse" connection state, the connector 202 (the connector member 20*a*2 and the connector member 20*b*1) for the left control lever 100*a* is in a "normal" connection state and the connector 203 is in a "reverse" connection state in a state where the members of the connector 201 and the connector 202 are switched (the state where the connector member 20*b*2 is connected to the connector member 20*a*1 and the connector member 20*b*1 is connected to the connector member 20*a*2), then the control pattern is changed to another control pattern. In other words, the control pattern is changed such that the boom is operated by the fore and back control of the left control lever 100*a*, the upper structure is operated by the left and right control, the bucket is operated by the fore and back control of the right control lever 100*b*, and the arm is operated by the left and right control.

In the above mentioned embodiment, the control levers 100*a* and 100*b* are assumed to be electric levers which output voltage values according to the control input, but can be applied to control levers which detect control of a lever by an ON/OFF contact switch and which can output the ON signal of the contact switch as a control signal.

A construction machine has equipment operated by various switch controls, such as wipers, lights and alarms. Normally a combination of the type of switch and the type of equipment, such as wipers, lights and alarms (hereafter control pattern) is fixed.

But depending on the mode of the construction machine, the operator may want to change the above mentioned control pattern so that the equipment is operated by a switch disposed at another location. For example, the operator may want to operate the wipers using the switch disposed for lights, or when the switch for wipers fails, the operator may want to operate the wipers using the switch for the lights, so that work can continue in rain without interruption.

An embodiment shown in FIG. 4(*a*) shows a control pattern change device which meets such a requirement.

The contact switch X is a switch for wipers, the contact switch Y is a switch for lights, and the contact switch Z is a switch for alarms. Each switch, X, Y and Z, outputs control signals when the switch is turned ON.

The connector 21 at the controller 30 side has terminals 1, 2, 3 and 4, and when the control signal $\alpha$ is input to the terminal 1, a drive control signal for driving the wipers is generated in the controller 30 responding to the control signal $\alpha$. This operates the wipers. In the same manner, when the control signal $\beta$ is input to the terminal 2 of the connector 21, a drive control signal for driving the lights is generated in the controller 30 responding to the control signal $\beta$. This operates the lights. In the same way, when the control signal $\gamma$ is input to the terminal 3 of the connector 21, a drive signal for driving the alarms is generated in the controller 30. This operates the alarms.

A ground potential GND is supplied from the terminal 4 of the connector 21 to each contact switch X, Y and Z via electric signal wires. The ground potential GND indicates the switch ON level of the switches X, Y and Z.

The connector 23 at the switches X, Y and Z side has terminals 1 to 9, just like the connector 20 in FIG. 1, so that a ground potential GND is supplied to the switches X, Y and Z from the controller 30 without fail, even if the connection mode of the connector members 20*a*3 and 20*b*3 of the connector 23 is different.

FIG. 4(*b*) shows the connection faces of the connector members 20*a*3 and 20*b*3 respectively.

As FIG. 4(*b*) shows, the shape of the connection face is square for both the connector member 20*a*3 and the connector member 20*b*3, where 3 connection terminal pins, vertically and horizontally, that is, 9 pins in total, are disposed. The terminal 1 of the connector member 20*a*3 is connected to the switch X, the terminal 2 is connected to the switch Y, the terminal 3 is connected to the switch Z, the terminal 4 is connected to the switch Z, the terminal 5 is the terminal for supplying a ground potential GND, the terminal 6 is connected to the switch X, the terminal 7 is connected to the switch Y, the terminal 8 is connected to the switch Y, and the terminal 9 is connected to the switch Y.

A control signal $\alpha$ for operating the wipers is output from the terminal 1 of the connector member 20*b*3 at the female side, a control signal $\beta$ for operating the lights is output from the terminal 2, and the control signal $\gamma$ for operating the alarms is output from the terminal 3. The terminal 5 of the connector member 20*b*3 is a terminal for a ground potential GND.

If the connector members are connected such that the control signal output terminals 1, 2 and 3 of the connector member 20*b*3 are connected to the terminals 1, 2 and 3 of the connector member 20*a*3 respectively, as shown in FIG. 4(*c*) (the connection state shown in FIG. 4(*b*)), then the ON signal of the switch X is output as the control signal $\alpha$, the ON signal of the switch Y is output as the control signal $\beta$, and the ON signal of the switch Z is output as the control signal $\gamma$. In other words, the control pattern is changed to the normal control pattern where the wipers are driven by the control of the switch X for wipers (hereafter normal control pattern).

If both connector members are connected such that the control signal outputs terminals 1, 2 and 3 of the connector member 20*b*3 are connected to the terminals 7, 4 and 1 of the connector member 20*a*3 respectively (the connection state in FIG. 4(*b*) where the connector member 20*b*3 is rotated 90° to the right), then the ON signal of the switch X is output as the control signal $\gamma$, the ON signal of the switch Y is output as the control signal α, and the ON signal of the switch Z is output as the control signal β. In other words, the control pattern is changed to the control pattern where the alarms are driven by the control of the switch X for wipers (hereafter the first change pattern).

Figure 4A:
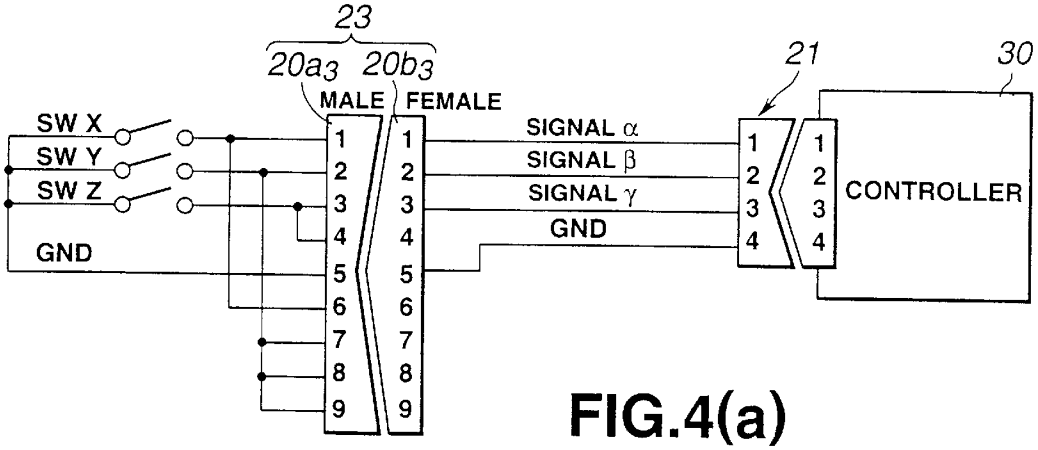
FIGS. 4($a$) to 4($c$) are drawings depicting a configuration of an embodiment of the control pattern change device in accordance with the present invention.
Figure 4B:
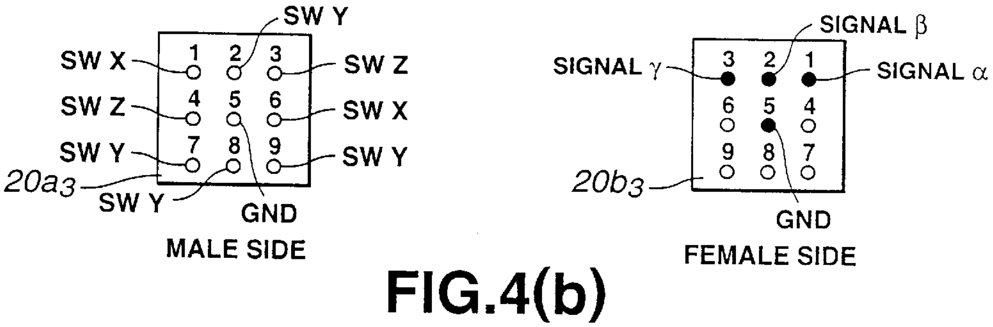

If both the connector members are connected such that the control signal output terminals 1, 2 and 3 of the connector member 20b3 are connected to the terminals 3, 6 and 9 of the connector member 20a3 respectively (the connection state in FIG. 4(b) where the connector member 20b3 is rotated 90° to the left), then the ON signal of the switch X is output as the control signal β, the ON signal of the switch Y is output as the control signal γ, and the ON signal of the switch Z is output as the control signal α. In other words, the control pattern is changed to the control pattern where the lights are driven by the control of the switch X for wipers (hereafter the second change pattern).

If the connector members are connected such that the control signal output terminals 1, 2 and 3 of the connector member 20b3 are connected to the terminals 9, 8 and 7 of the connector member 20a3 respectively (the connection state in FIG. 4(b) where the connector member 20b3 is turned upside down), then the ON signal of the switch Y is output as the control signal α, β and γ. In other words, the control pattern is changed to the control pattern where the wipers, lights and alarms are operated by the control of the switch Y for lights, and the equipment is not operated by the ON control of switches X and Y (hereafter the third change pattern).

In the case of a construction machine, if the wipers do not operate, for example, it is required to quickly determine whether a failure occurred due to a switch or another cause at the site, so that the failure is remedied immediately.

In accordance with the embodiment shown in FIG. 4, the determination of such failed areas is also possible.

Figure 4C:
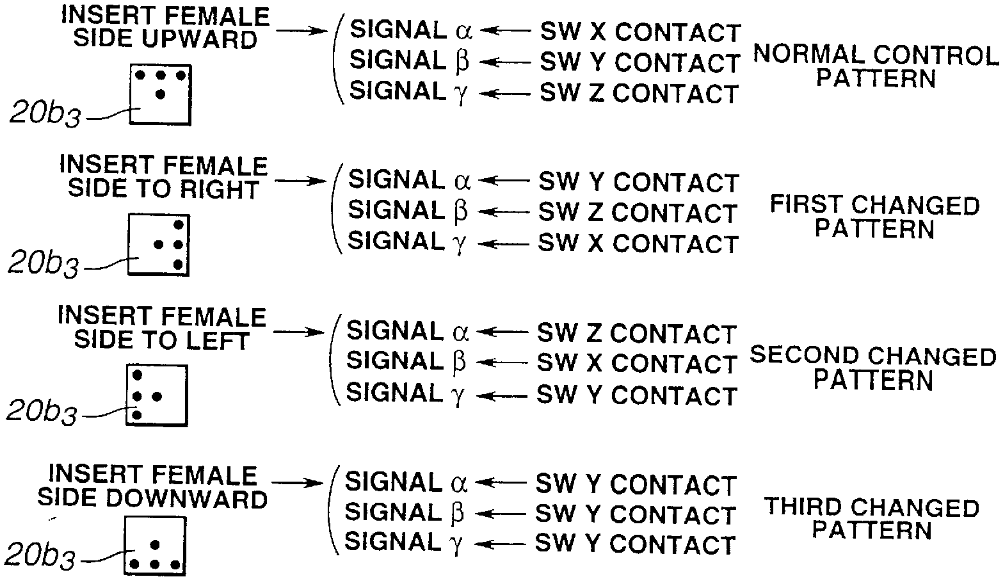

Now it is assumed that the wipers do not operate, even if the switch X is ON during operation based on the "normal control pattern" shown in FIG. 4(c).

In this case, the connection mode of the connector 23 is changed to "the first change pattern" to check operation at this time. If the alarms are operated by the control signal γ, which is output from the switch X for wipers, and the wiper is not operated by the control signal α, which is output from the switch Y for lights at this time, then it is determined that the switch X for wipers is normal, and a wiper drive control system other than the switch X is abnormal. If, on the other hand, the alarms are not operated by the control signal γ, which is output from the switch X for wipers, and the wipers are operated by the control signal α, which is output from the switch Y for lights, then it is determined that a wire drive control system other than the switch X is normal, and the switch X for wipers is abnormal.

While the above determination of a failed area is but one example, a more detailed failed area can be determined by a total result when the control pattern is changed to each control pattern (the first change pattern, the second change pattern, the third change pattern).

In the above mentioned embodiment shown in FIG. 4, the failed area is determined by inputting control signals which are output from the switches X, Y and Z, which are control means, to each terminal of the connector member 20a3 of the connector 23, but the input signals to be input to each terminal of the connector member 20a3 of the connector 23 are not restricted to the control signals. For example, control signals which are output from other equipment may be input to each terminal of the connector member 20a3 of the connector 23 to determine a failed area.

Also in the embodiment shown in FIG. 4, the number of terminals of the connector member 20b3 at the female side is the same as the number of terminals of the connector member 20a3 at the male side, but the number of terminals of the connector member 20a3 at the male side and the number of terminals of the connector member 20b3 at the female side may be different.

Figure 5A:
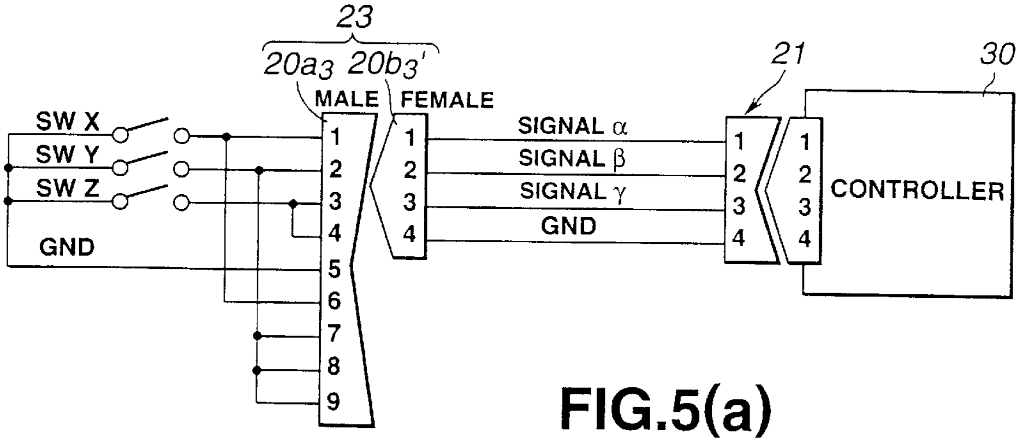
FIGS. 5($a$) to 5($c$) are drawings depicting a variant form of FIG. 4.

The embodiment shown in FIG. 5(a) basically has the same configuration as FIG. 4(a), but the number of terminals of the connector member 20b3' at the female side of the connector 23 has 4 pins, which is less than the 9 pins of the connector member 20a3 at the male side.

Figure 5B:

FIG. 5(b) shows the connection faces of the connector member 20a3 and the connector member 20b3'.

The shape of the connection face is square for both the connector member 20a3 and the connector member 20b3', where 3 connection terminal pins, vertically and horizontally, that is, 9 pins in total, are disposed for the connector member 20a3. For the connector member 20b3', 2 connection terminal pins, vertically and horizontally, that is, 4 pins in total, are disposed.

The terminal 1 of the connector member 20a3 is connected to the switch X, the terminal 2 is connected to the switch Y, the terminal 3 is connected to the switch Z, the terminal 4 is connected to the switch Z, the terminal 5 is the terminal for supplying a ground potential GND, the terminal 6 is connected to the switch X, the terminal 7 is connected to the switch X, the terminal 8 is connected to the switch Y and the terminal 9 is connected to the switch Z.

The control signal α for operating the wipers is output from the terminal 1 of the connector member 20b3' at the female side, the control signal β for operating the lights is output from the terminal 2, and the control signal γ for operating the alarms is output from the terminal 3. The terminal 4 of the connector member 20b3' is a terminal for supplying a ground potential GND.

Figure 5C:
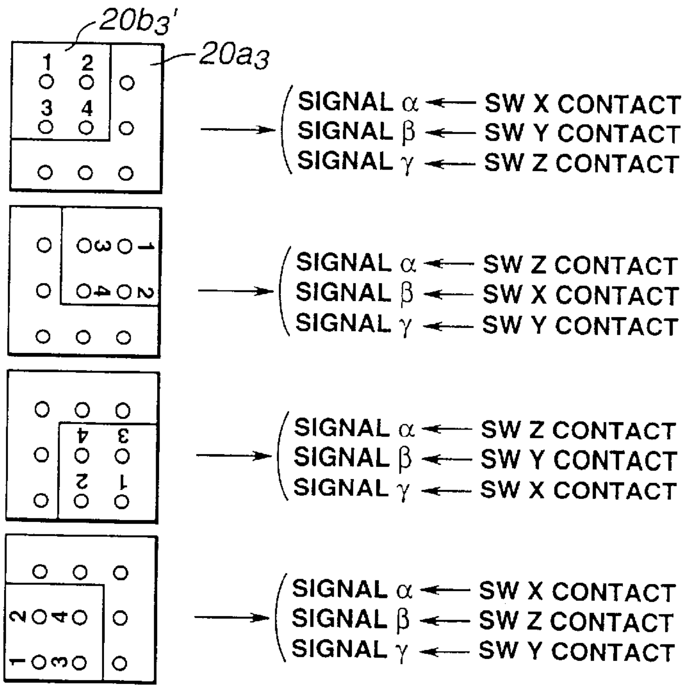

As FIG. 5(c) shows, if both connector members are connected such that the control signal output terminals 1, 2 and 3 of the connector member 20b3' are connected to the terminals 1, 2 and 4 of the connector member 20a3 respectively (the connection state where the connector member 20b3 is connected to the upper left on the connection face of the connector member 20a3), then the ON signal of the switch X is output as the control signal α, the ON signal of the switch Y is output as the control signal β, and the ON signal of the switch Z is output as the control signal γ. In other words, the control pattern is changed to the normal control pattern where the wipers are driven by the control of the switch X for the wipers (normal control pattern).

If both connector members are connected such that the control signal output terminals 1, 2 and 3 of the connector member 20b3' are connected to the terminals 3, 6 and 2 of the connector member 20a3 respectively (the connection state where the connector member 20b3 is connected to the upper right on the connection face of the connector member 20a3), then the ON signal of the switch X is output as the control signal β, the ON signal of the switch Y is output as the control signal γ, and the ON signal of the switch Z is output as the control signal α. In other words, the control pattern is changed to the control pattern where the lights are driven by the control of the switch X for the wipers (hereafter the fourth change pattern).

If both connector members are connected such that the control signal output terminals 1, 2 and 3 of the connector member 20b3' are connected to the terminals 9, 8 and 6 of the connector member 20a3 respectively (the connection state where the connector member **20*b*3 is connected to the lower right on the connection face of the connector member 20*a*3**), then the ON signal of the switch X is output as the control signal γ, the ON signal of the switch Y is output as the control signal β, and the ON signal of the switch Z is output as the control signal α. In other words, the control pattern is changed to the control Pattern where the alarms are driven by the control of the switch X for the wipers (hereafter the fifth change pattern).

If both connector members are connected such that the control signal output terminals 1, 2 and 3 of the connector member **20*b*3' are connected to the terminals 7, 4 and 8 of the connector member 20*a*3 respectively (the connection state where the connector member 20*b*3 is connected to the lower left on the connection face of the connector member 20*a*3**), then the ON signal of the switch X is output as the control signal α, the ON signal of the switch Y is output as the control signal γ, and the ON signal of the switch Z is output as the control signal β. In other words, the control pattern is changed to the control pattern where the wipers are driven by the control of the switch X for the wipers, and the switches for the lights and the alarms are exchanged (hereafter the sixth change pattern).

In the embodiment shown in FIG. 5 as well, when a failure occurs during operating with the normal control pattern, the failed area can be determined by changing the control pattern to each control pattern (the fourth change pattern, the fifth change pattern or the sixth change pattern) and checking the operation each time.

Figure 6A:
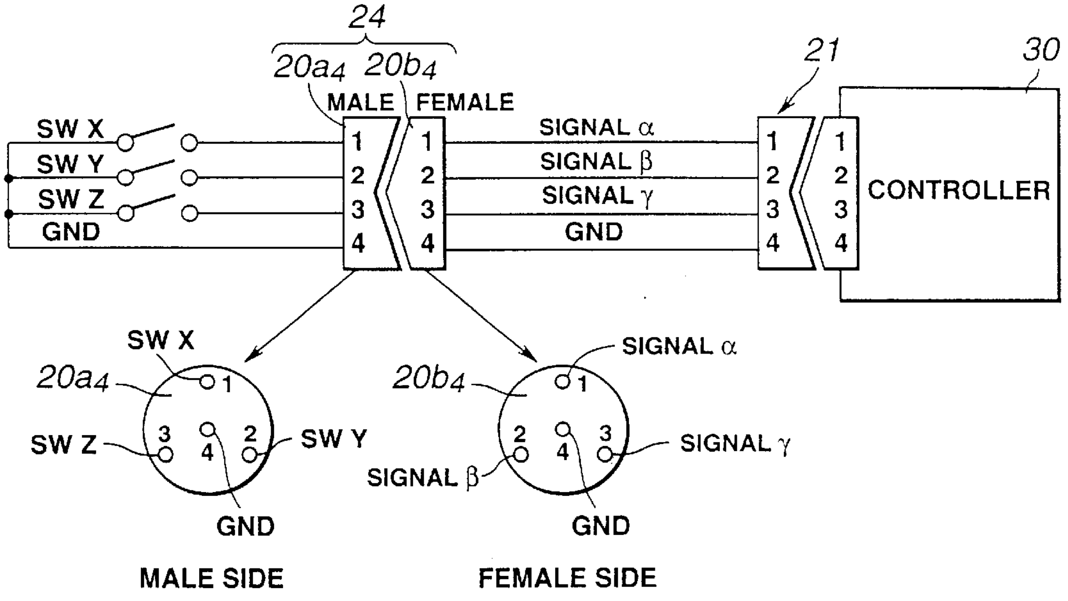
FIGS. 6($a$) and 6($b$) are drawings depicting a variant form of FIG. 4.
Figure 6B:
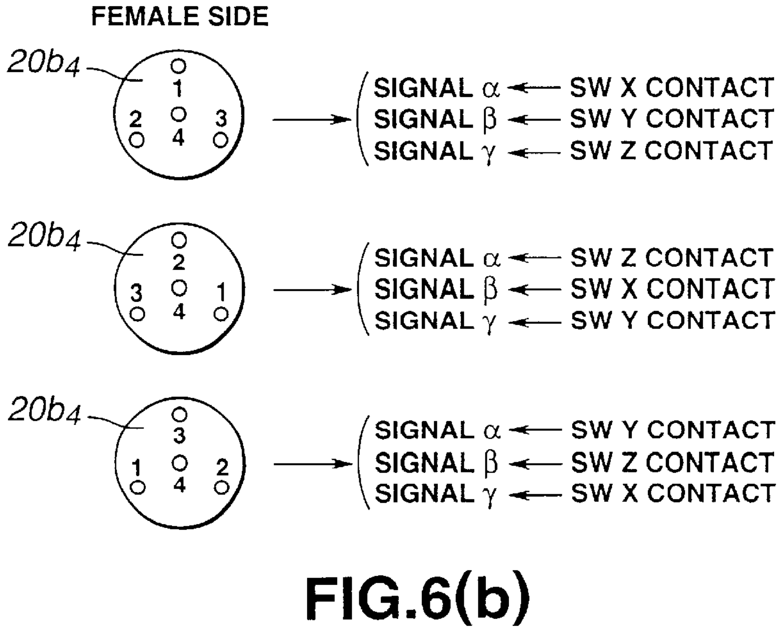

In the above mentioned embodiments shown in FIG. 4 and FIG. 5, the connection face of the connector 23 is a square, but the connector 24 having a circular connection face shown in FIG. 6 may be used.

The embodiment shown in FIG. 6(*a*) basically has the same configuration as FIG. 5(*a*), but the difference is that both connector members **20*a*4 and 20*b*4 of the connector 23** have 4 pins.

As shown in the connection face of the connector member **20*a*4 and the connector member 20*b*4 in FIG. 6**(*a*), the terminal 4 for supplying a ground potential GND is disposed at the center of the respective circular connection face. The terminals 1, 2 and 3 of the connector member **20*a*4 are disposed on the connection face at equal 120° intervals, where the terminal 1 is connected to the switch X, the terminal 2 is connected to the switch Y, and the terminal 3 is connected to the switch Z. In the same way, the terminals 1, 2 and 3 of the connector member 20*b*4 are disposed on the connection face at equal 120° intervals, where the control signal α for operating the wipers is output from the terminal 1, the control signal β for operating the lights is output from the terminal 2, and the control signal γ for operating the alarms is output from the terminal 3**.

As FIG. 6(*b*) shows, if both connector members are connected such that the control signal output terminals 1, 2 and 3 of the connector member **20*b*4 are connected to the terminals 1, 2 and 3 of the connector member 20*a*4 respectively (the connection state shown in FIG. 6**(*a*)), then the ON signal of the switch X is output as the control signal α, the ON signal of the switch Y is output as the control signal β0, and the ON signal of the switch Z is output as the control signal γ. In other words, the control pattern is changed to the normal control pattern where the wipers are driven by the control of the switch X for the wipers (normal control pattern).

If both connector members are connected such that the control signal output terminals 1, 2 and 3 of the connector member **20*b*4 are connected to the terminals 3, 1 and 2 of the connector member 20*a*4 respectively (the connection state where the connection face of the connector member 20*b*4, shown in FIG. 6**(*a*), is turned 120° to the right and is connected), then the ON signal of the switch X is output as the control signal β, the ON signal of the switch Y is output as the control signal γ, and the ON signal of the switch Z is output as the control signal α. In other words, the control pattern is changed to the control pattern where the lights are driven by the control of the switch X for the wipers (the seventh change pattern).

If both connector members are connected such that the control output terminals 1, 2 and 3 of the connector member **20*b*4 are connected to the terminals 2, 3 and 1 of the connector member 20*a*4 respectively (the state where the connection face of the connector member 20*b*4, shown in FIG. 6**(*a*), is turned 120° to the left and is connected), then the ON signal of the switch X is output as the control signal γ, the ON signal of the switch Y is output as the control signal α, and the ON signal of the switch Z is output as the control signal β. In other words, the control pattern is changed to the control pattern where the alarms are driven by the control of the switch X for the wipers (the eighth change pattern).

In the embodiment shown in FIG. 6 as well, when a failure occurs during operating with the normal control pattern, the failed area can be determined by changing the control pattern to each control pattern (the seventh change pattern or the eighth change pattern), and checking the operation each time.

In the above mentioned embodiment, the control pattern is changed by changing the connection mode of the connectors between the control levers 100, **100*a*, 100*b* and the switches X, Y and Z, and the controller 30, but the control pattern may be changed by changing the connection mode of the connector 25 between the controller 30 and the actuators SOL1, SOL2, SOL3 and SOL4 for driving the working machine, as shown in FIG. 7**.

The solenoids SOL1, SOL2, SOL3 and SOL4, shown in FIG. 7(*a*), are disposed corresponding to each hydraulic actuator for driving the working machine. The solenoid SOL1 is disposed corresponding to the hydraulic cylinder for the boom, where the flow control valve for the boom is driven by inputting the signal α (+) or a (−) to this solenoid SOL1, and energizing the solenoid in a plus (+) or minus (−) direction, and along with this, the hydraulic cylinder for the boom is driven and the boom is operated in an upward or downward direction.

In the same way, the solenoid SOL2 is disposed corresponding to the hydraulic cylinder for the bucket, where the flow control valve for the bucket is driven by inputting the signal β(+) or β(−) to this solenoid SOL2, and energizing the solenoid in a plus (+) or minus (−) direction, and along with this, the hydraulic cylinder for the bucket is driven and the bucket is operated in a digging or dumping direction.

In the same way, the solenoid SOL3 is disposed corresponding to the hydraulic cylinder for the arm, where the flow control valve for the arm is driven by inputting the signal γ(+) or γ(−) to this solenoid SOL3, and energizing the solenoid in a plus (+) or minus (−) direction, and along with this, the hydraulic cylinder for the arm is driven and the bucket is operated in a digging or dumping direction.

In the same way, the solenoid SOL4 is disposed corresponding to the hydraulic motor for swing, where the flow control valve for swing is driven by inputting the signal δ(+) or δ(−) to this solenoid SOL4, and energizing the solenoid in a plus (+) or minus (−) direction, and along with this, the hydraulic motor for swing is driven and the upper structure is operated in a left or right swing direction.

The controller 30 outputs the drive control signals a(+, −)–d(+, −) for energizing each of solenoids SOL1–SOL4.

The terminals 1 and 2 of the controller 30 output drive control signals a(+) and a(−) corresponding to the fore and back direction control signals of the right control lever 100*b* respectively. The drive control signal a(+) corresponds to the fore direction control signal, and the drive control signal a(−) corresponds to the back direction control signal.

In the same way, the terminals 3 and 4 of the controller 30 output drive control signals b(+) and b(−) corresponding to the left and right direction control signals of the right control lever 100*b* respectively. The drive control signal b(+) corresponds to the left direction control signal, and the drive control signal b(−) corresponds to the right direction control signal.

In the same way, the terminals 5 and 6 of the controller 30 output drive control signals c(+) and c(−) corresponding to the fore and back direction control signals of the left control lever 10*a* respectively. The drive control signal c(+) corresponds to the fore direction control signal, and the drive control signal c(−) corresponds to the back direction control signal.

In the same way, the terminals 7 and 8 of the controller 30 output drive control signals d(+) and d(−) corresponding to the left and right direction control signals of the left control lever 100*a* respectively. The drive control signal d (+) corresponds to the left direction control signal, and the drive control signal d(−) corresponds to the right direction control signal.

The above mentioned drive control signals a(+), a(−), b(+), b(−), c(+), (−), and d(+), (−) are input from the terminals 1 to 8 of the controller 30 to the terminals 1 to 8 of the connector member 20*a*5 of the connector 25 respectively. The drive control signals b(+) and b(−) are input from the terminals 3 and 4 of the controller 30 to the terminals 9 and 10 of the connector member 20*a*5 respectively, the drive control signals a(+) and a(−) are input from the terminals 1 and 2 of the controller 30 to the terminals 11 and 12 of the connector member 20*a*5 respectively, the drive control signals d(+) and d(−) are input from the terminals 7 and 8 of the controller 30 to the terminals 13 and 14 of the connector member 20*a*5 respectively, and the drive control signals c(+) and c(−) are input from the terminals 5 and 6 of the controller 30 to the terminals 15 and 16 of the connector member 20*a*5 respectively.

The signals a(+) and a(−) are output from the terminals 1 and 2 of the connector member 20*b*5 of the connector 25 to the solenoid SOL1, the signals β(+) and β(−) are output from the terminals 3 and 4 of the connector member 20*b*5 to the solenoid SOL2, the signals γ(+) and γ(−) are output from the terminals 5 and 6 of the connector member 20*b*5 to the solenoid SOL3, and the signals δ(+) and δ(−) are output from the terminals 7 and 8 of the connector member 20*b*5 to the solenoid SOL4.

FIG. 7(*b*) shows the connection faces of the connector member 20*a*5 and the connector member 20*b*5. The connection face of the connector member 20*a*5 has 2 pins vertically and 8 pins horizontally, that is, 16 terminal pins in total. Therefore the connector member 20*a*5 can be inserted into the connector member 20*b*5 by shifting in the left and right direction, so that the connection mode can be changed according to the shifted insertion position. Also, as described in FIG. 1, the connection mode can be changed by turning and connecting one connector member 20*b*5 of the connector 25 upside down.

The connection state shown in FIG. 7(*b*) is defined as a "normal" connection state, and the connection state where one connector member 20*b*5 of the connector is turned upside down from the above state and is connected is defined as a "reverse" connection state.

FIG. 7(*c*) shows the relationship of the shifted insertion position of the connector member 20*b*5 to the connector member 20*a*5, the drive control signals a to d, which change according to the "normal" and "reverse" connection state of the connector 25, and the corresponding solenoids SOL1 to SOL4.

Therefore as FIG. 7(*c*) shows, if the connector member 20*b*5 is shifted and inserted into the connector member 20*a*5 such that the connector member 20*b*5 is connected farthest left on the connection face of the connector member 20*a*5 in the state where the connector 25 is in the "normal" connection state (the connection state shown in FIG.7(*a*)), then the solenoid SOL1 for the boom is energized in the plus (+)or minus (−) direction by the control signal a(+) or a(−) corresponding to the fore and back direction control signals of the right control lever 100*b*. The solenoid SOL2 for the bucket is energized in the plus (+) or minus (−) direction by the drive control signal b(+) or b(−) corresponding to the left and right direction control signals of the right control lever 100*b*, the solenoid SOL3 for the arm is energized in the plus (+) or minus (−) direction by the drive control signals c(+) or c(−) corresponding to the fore and back direction control signals of the left control lever 100*a*, and the solenoid SOL4 for swing is energized in the plus (+) or minus (−) direction by the drive control signals d(+) or d(−) corresponding to the left and right direction of the left control lever 100*a*. As a result, the control pattern is changed to the "ISO pattern" shown in FIG. 19(*b*). The control pattern is also changed to other different control patterns depending on the connection mode.

FIG. 8 is a variant form of FIG. 7.

As FIG. 8(*a*) shows, 12 connection terminal pins are disposed in the connector member 20*a*6 of the connector 26, where the above mentioned drive control signal a is input to the terminals 1, 2, 5 and 7, the above mentioned control signal b is input to the terminals 3 and 4, the above mentioned drive control signal c is input to the terminals 6, 8, 11 and 12, and the above mentioned drive control signal d is input to the terminals 9 and 10. The signal α to the solenoid SOL1 is output from the terminal 1 of the connector member 20*b*6, the signal γ to the solenoid SOL3 is output from the terminal 3, the signal β to the solenoid SOL2 is output from the terminal 6, and the signal δ to the solenoid SOL4 is output from the terminal 8.

FIG. 8(*b*) shows the connection faces of the connector member 20*a*6 and the connector member 20*b*6.

As FIG. 8(*b*) shows, the terminals 1, 6, 3 and 8 to output each signal α, β, γ and δ of the connector member 20*b*6 are disposed in a staggered arrangement (indicated by black dots).

FIG. 8(*c*) shows the relationship of the shifted insertion position of the connector member 20*b*6 to the connector member 20*a*6, the drive control signals a to d, which change according to the "normal" and "reverse" connection state of the connector 26, and the corresponding solenoids SOL1 to SOL4.

Therefore as FIG. 8(*c*) shows, if the connector member 20*a*6 is shifted and inserted into the connector member 20*b*6 such that the connector member 20*b*6 is connected at the farthest left on the connection face of the connector member 20$a$6 in the state where the connector 26 is in a "normal" connection state, then the solenoid SOL1 for the boom is energized by the drive control signal corresponding to the fore and back direction control signal of the right control lever 100$b$, the solenoid SOL3 for the arm is energized by the drive control signal b corresponding to the left and right direction control signals of the right control lever 100$b$, the solenoid SOL2 for the bucket is energized by the drive control signal c corresponding to the fore and back direction control signal of the left control lever 100$a$, and the solenoid SOL4 for swing is energized by the drive control signal d corresponding to the left and right direction control signal of the left control lever 100$a$. The control pattern is also changed to other different control patterns depending on the connection mode.

Figure 9A:
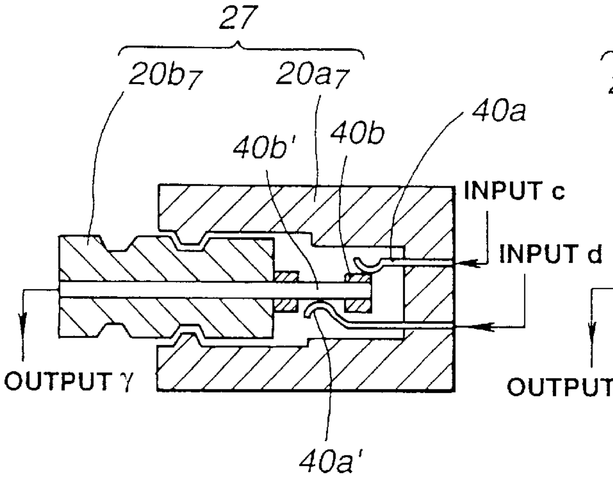
FIGS. 9($a$) to 9($c$) are drawings depicting a configuration of an embodiment of the control pattern change device in accordance with the present invention.
Figure 9B:
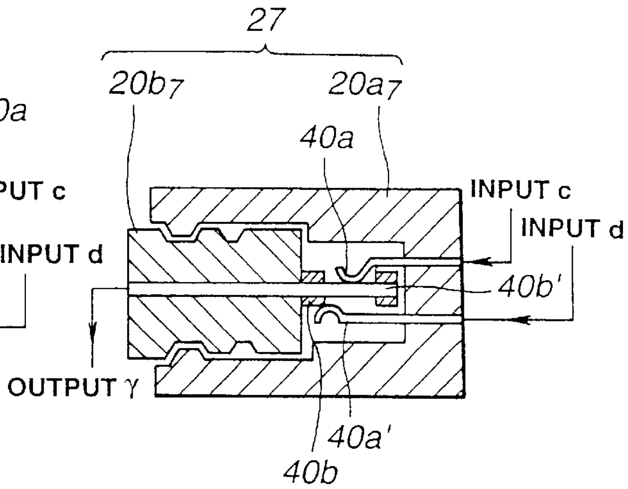
Figure 9C:
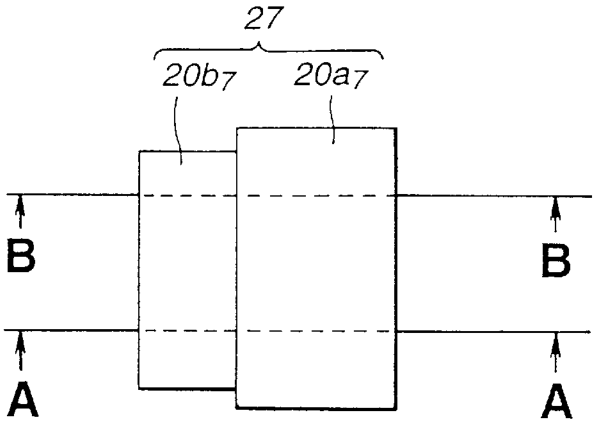
Figure 10A:
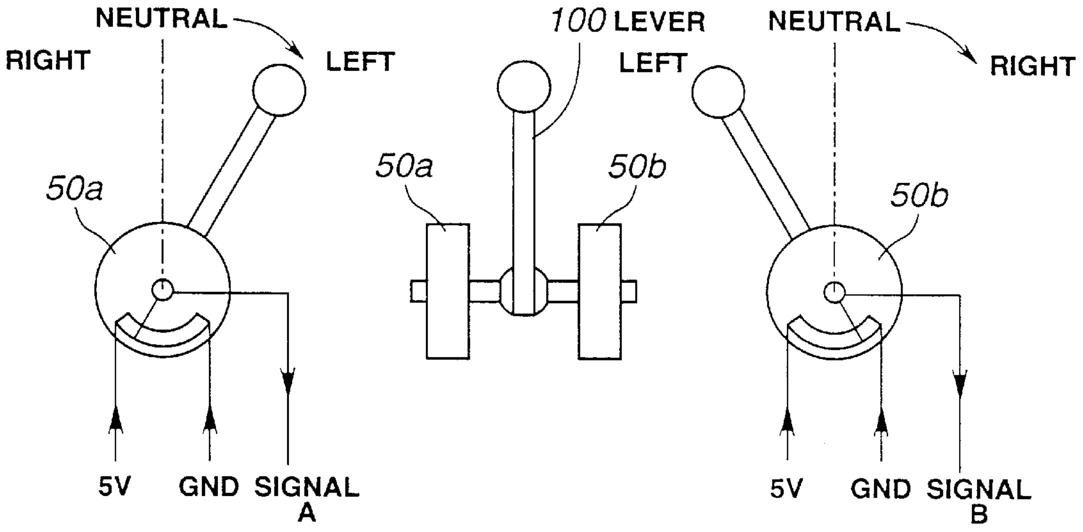
FIGS. 10($a$) to 10($d$) show a variant form of FIG. 1.
Figure 10B:
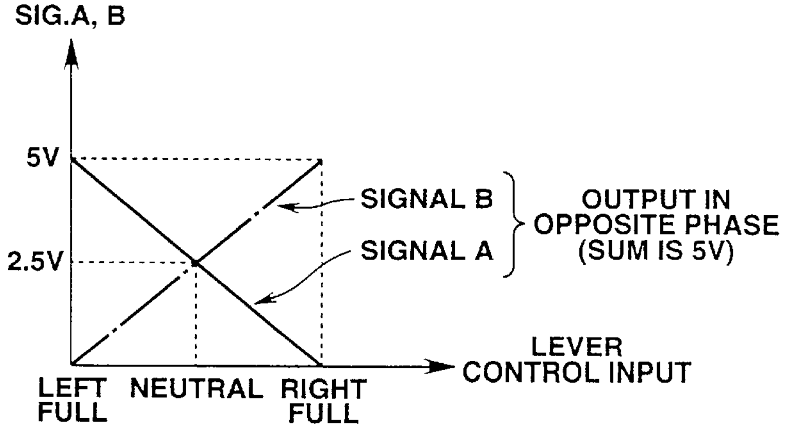
Figure 10C:
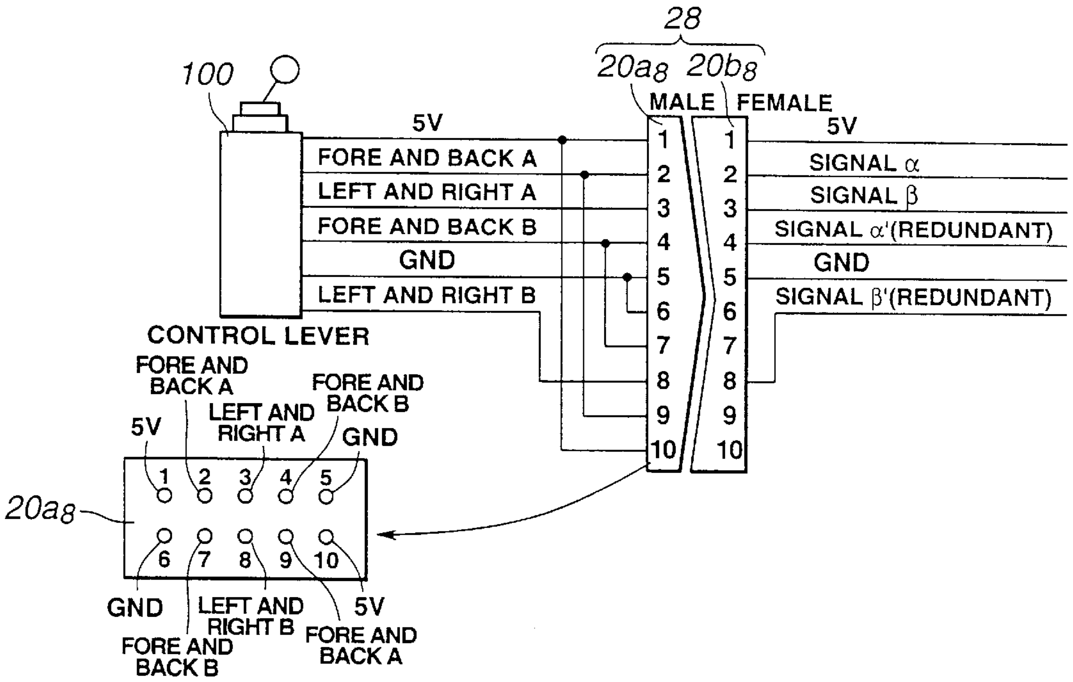
Figure 10D:
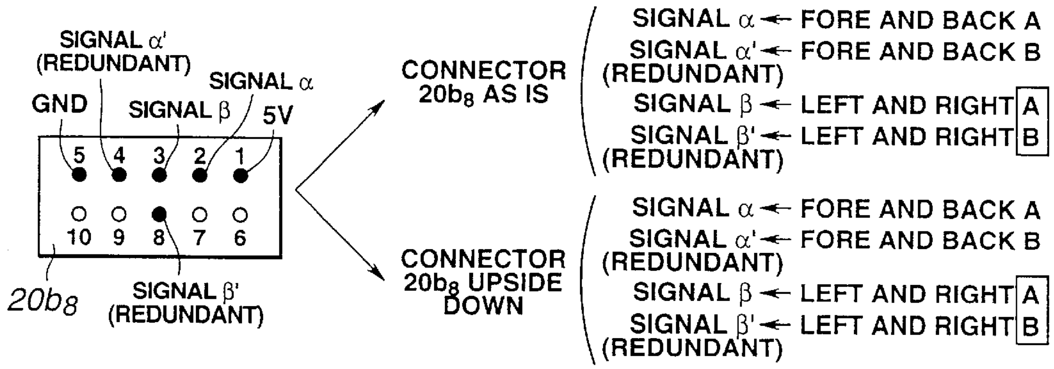

In the above mentioned embodiments, the control pattern is changed by changing the insertion direction or the insertion face of one connector member to the other connector member, but as FIG. 9 shows, the control pattern may be changed by changing the insertion depth of the connector member 20$b$7 to the connector member 20$a$7.

FIG. 9(*c*) shows a top view of the connector 27, FIGS. 9(*a*) and 9(*b*) show an A—A cross-sectional view of FIG. 9(*c*).

FIG. 9(*a*) is a cross-sectional view when the insertion depth of the connector member 20$b$7 to the connector member 20$a$7 is small (this is called the first step insertion position), and FIG. 9(*b*) is a cross-sectional view when the insertion depth of the connector member 20$b$7 to the connector member 20$a$7 is large (this is called the second step insertion position).

As FIG. 9(*a*) shows, the connector member 20$b$7 has 2 concave portions corresponding to the 2-step insertion depth (the first step insertion position, the second step insertion position). The connector member 20$a$7 has a convex portion which is engaged with the concave portion at insertion.

The connector member 20$b$7 has a conducting terminal 40$b$'where the electric signal γ for the solenoid SOL3 for the arm is conducted, and the conducting terminal 40$b$' has an insulator 40$b$ to prevent the conduction of electric signals.

The connector member 20$a$7, on the other hand, has a terminal 40$a$ for conducting the electric signal c corresponding to the fore and back direction control signal of the left control lever 100$a$, and a terminal 40$a$' for conducting the electric signal d corresponding to the left and right direction control signal of the left control lever 100$a$. The lengths of the terminals 40$a$ and 40$a$' are different.

If the connector member 20$b$7 is inserted into the connector member 20$a$7 up to the first step insertion position, the terminal 40$a$ for conducting one input electric signal c contacts the insulator 40$b$, which protrudes onto the conducting terminal 40$b$', and the terminal 40$a$', for conducting the other input electric signal d, contacts the conducting germinal 40$b$'. As a result, the drive control signal d corresponding to the left and right direction control signal of the left control lever 100$a$ is output from the connector 27 as the signal γ, and the solenoid SOL3 for the arm is energized by this.

In the B—B cross-sectional view of the connector 27 (FIG. 9(*c*)), the input signals c and d of the connector 27 in FIG. 9(*a*) are switched. And the signal δ for the solenoid SOL4 for swing is output from the connector 27. In other words, the terminal 40$a$ for conducting one input electric signal d contacts the insulator 40$b$ which protrudes onto the conducting terminal 40$b$', and the terminal 40$a$' for conducting the other input electric signal c contacts the conducting terminal 40$b$'. As a result, the drive control signal c, corresponding to the fore and back direction control signal of the left control lever 100$a$, is output from the connector 27 as the signal 6, and the solenoid SOL4 for the swing is energized by this.

In this way, when the connector 27 is inserted up to the first step insertion position, the control pattern changes to the "pattern of company A" shown in FIG. 16(*c*).

If the connector member 20$b$7 is more deeply inserted to the connector member 20$a$7 up to the second step insertion position, the terminal 40$a$ for conducting one input electric signal c contacts the conducting terminal 40$b$', and the terminal 40$a$' for conducting the other input electric signal d contacts the insulator 40$b$. As a result, the drive control signal c, corresponding to the fore and back direction control signal of the left control lever 100$a$, is output from the connection 27 as the signal γ, and the solenoid SOL3 for the arm is energized by this.

In the B—B cross-sectional view of the connector 27 (FIG. 9(*c*)), the input signals c and d of the connector 27 in FIG. 9(*a*) are switched. And the signal δ for the solenoid SOL4 for the swing is output from the connector 27. In other words, the terminal 40$a$ for conducting one input electric signal d contacts the conducting terminal 40$b$', and the terminal 40$a$'for conducting the other input electric signal c contacts the insulator 40$b$. As a result, the drive control signal d, corresponding to the left and right direction control signal of the left control lever 100$a$, is output from the connector 27 as the signal 6, and the solenoid SOL4 for swing is energized by this.

In this way, when the connector 27 is inserted up to the second step insertion position, the control pattern changes to the "ISO pattern" shown in FIG. 16(*b*).

Now an embodiment which can change the combination of polarity of the control direction of the control lever and the polarity of the operating direction of the working machine will be explained referring to FIG. 10.

In the "ISO pattern" shown in FIG. 16(*b*), the bucket is operated in the digging direction when the right control lever 100$b$ is controlled to the left control direction, and the bucket is operated in the dumping direction when the lever is controlled to the right direction. In this embodiment, this control pattern is changed such that the bucket is operated in the dumping direction when the right control lever 100$b$ is controlled to the left direction, and the bucket is operated in the digging direction when the lever is controlled to the right direction.

FIG. 10(*a*) shows the structure of the right control lever 100 (100$b$) of this embodiment. On both sides of the lever 100, two potentiometers 50$a$ and 50$b$, which output electric signals A and B respectively according to the control input of the lever, are disposed.

FIG. 10(*b*) shows the relationship between the control input of the lever (left full lever position—neutral position—right full lever position), voltage A which is output from the potentiometer 50$a$, and voltage B which is output from the potentiometer 50$b$.

As FIG. 10(*b*) shows, the voltage which is output from the potentiometer 50$a$ (signal A) decreases from 5V to 0V as the lever position changes from left full to right full, but the voltage which is output from the potentiometer 50$b$ (signal B) increases from 0V to 5V as the lever position changes from left full to right full. In other words, the phases of the signal A and the signal B are the opposite. This is to improve safety by making the total voltage of the signal A and the signal B always 5V.

FIG. 10(*c*) shows the connector 28 of the present embodiment.

The terminals 1 and 10 of the connector member 20*a*8 at the lever side of the connector 28 are terminals for supplying a 5V potential, and the terminals 5 and 6 are terminals for supplying a ground potential GND.

The signal A, for the fore and back direction of the control lever 100, is input to the terminals 2 and 9 of the connector member 20*a*8, the signal A, for the left and right direction of the control lever 100, is input to the terminal 3, the signal B, for the fore and back direction of the control lever 100, is input to the terminals 4 and 7, and the signal B, for the left and right direction of the control lever 100, is input to the terminal 8.

The terminal 1 of the connector member 20*b*8 at the controller side of the connector 28, on the other hand, is connected to the terminal for supplying a 5V potential of the controller, and the terminal 5 is connected to the terminal for supplying a ground potential GND of the controller.

The signal α, for operating the boom, is output from the terminal 2 of the connector member 20*b*8 to the controller, the signal β, for operating the bucket, is output from the terminal 3 to the controller, the signal α', a redundant signal for operating the boom, is output from the terminal 4 to the controller, and the signal β', a redundant signal for operating the bucket, is output from the terminal 8 to the controller. FIG. 10(*c*) shows the connection face of the connector member 20*a*8, and FIG. 10(*d*) shows the connection face of the connector member 20*b*8. The states shown in FIGS. 10(*c*) and 10(*d*) are defined as "normal" connection states, and the state where the connection face of the connector member 10*b*8 is turned upside down, shown in FIG. 10(*d*), is defined as a "reverse" connection state.

As FIG. 10(*d*) shows, when the connector 28 is connected in a "normal" connection state, the signal A, for the fore and back direction of the control lever 100, is output from the terminal 2 of the connector member 20*b*8 as the signal a for driving the boom via the input terminal 2 of the connector member 20*a*8. The signal B, for the fore and back direction of the lever, is output from the terminal 4 of the connector member 20*b*8 as the redundant signal α' for driving the boom via the input terminal 4 of the connector member 20*a*8. At this time, the boom is operated in the downward direction when the right control lever 100 is controlled to the forward direction, and the boom is operated in the upward direction when the lever is controlled to the backward direction.

The signal A, for the left and right control of the control lever 100, on the other hand, is output from the terminal 3 of the connector member 20*b*8 as the signal β for driving the bucket via the input terminal 3 of the connector member 20*a*8. The signal B, for the left and right direction of the control lever, is output from the terminal 8 of the connector member 20*b*8 as the redundant signal β' for driving the bucket via the input terminal 8 of the connector 20*a*8. At this time, the bucket is operated in the digging direction when the right control lever 100 is controlled to the left direction, and the bucket is operated in the dumping direction when the lever is controlled to the right direction. In other words, when the connector 28 is in a "normal" connection state, the lever is controlled in the "ISO pattern, shown in FIG. 16(*b*).

When the connector 28 is connected in a "reverse" connection state, on the other hand, the signal A, for the fore and back direction of the control lever 100, is output from the terminal 2 of the connector member 20*b*8 as the signal a for driving the boom via the input terminal 9 of the connector member 20*a*8. The signal B, for the fore and back direction of the lever, is output from the terminal 4 of the connector member 20*b*8 as the redundant signal α' for driving the boom via the input terminal 7 of the connector member 20*a*8. At this time, the boom is operated in the downward direction when the right control lever 100 is controlled to the forward direction, and the boom is operated in the upward direction when the lever is controlled to the backward direction. In other words, the combination of the polarity of the control direction of the lever and the polarity of the operating direction of the working machine is unchanged for the fore and back direction of the lever.

The signal A, for the left and right control of the control lever 100, on the other hand, is output from the terminal 8 of the connector member 20*b*8 as the redundant signal β' for driving the bucket via the input terminal 3 of the connector member 20*a*8. The signal B, for the left and right direction of the lever, is output from the terminal 3 of the connector member 20*b*8 as the signal β for driving the bucket via the input terminal 8 of the connector 20*a*8. At this time, the bucket is operated in the dumping direction when the right control lever 100 is controlled to the left direction, and the bucket is operated in the digging direction when the lever is controlled to the right direction. In other words, when the connector 28 is in a "reverse" connection state, the polarity of the control direction of the lever (left and right direction) and the polarity of the operating direction of the working machine (arm dump—arm dig) are different when the lever is controlled in the left and right direction, even if the control pattern is the "ISO pattern" shown in FIG. 16(*b*).

In this embodiment, the combination of the polarity of the control direction (left and right direction) of the lever and the polarity of the operating direction (arm dump—arm dig) of the working machine is different only for the left and right direction of the control lever, but the combination of the polarity of the control direction (fore and back direction) of the lever and the polarity of the operating direction (boom up—boom down) of the working machine can be different for the fore and back direction of the control lever as well. For example, if the connection mode of the connector 28 is changed such that a ground potential GND is supplied from the controller to the terminal for supplying a 5V potential of the connector member 20*a*8, and a 5V potential is supplied from the controller to the terminal for supplying a ground potential GND of the connector member 20*a*8, then the combination of the polarity of the control direction and the polarity of the operating direction of the working machine can be set differently for both the left and right direction and the fore and back direction of the control lever.

The controller 30 disposed in a construction machine generates control signals for controlling various hydraulic equipment. To control a swash plate of a hydraulic pump, for example, the swash plate of the hydraulic pump is controlled based on a predetermined p-q curve (p is the pump pressure, q is the displacement of the pump) so that the absorption torque of this hydraulic pump does not exceed a certain torque. This p-q curve differs depending on the model of the construction machine, specifications, the type of attachments, and other factors. Therefore, the data content of the p-q curve must be changed according to the model and other factors.

Now an embodiment which can easily change the data content of the controller using a technology for changing the connection mode of the connector will be explained.

Figure 11A:
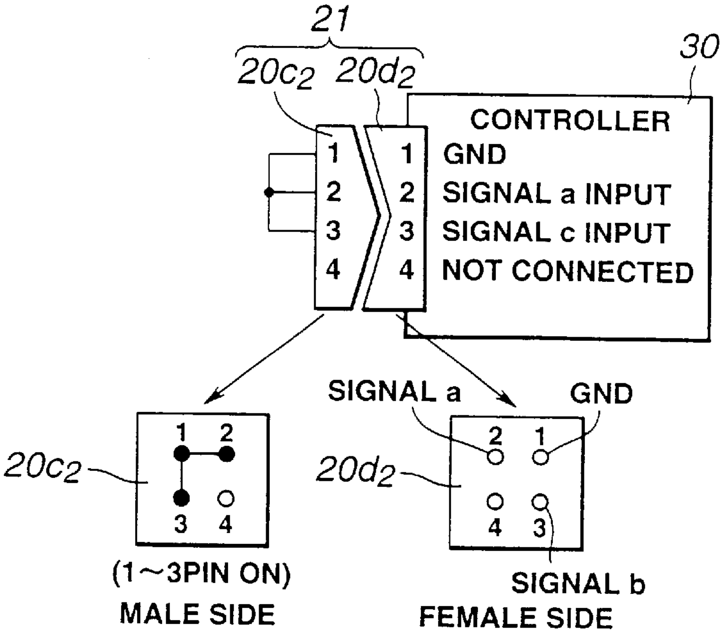
FIGS. 11($a$) and 11($b$) are drawings depicting a configuration of an embodiment of the data change device in accordance with the present invention.
Figure 11B:
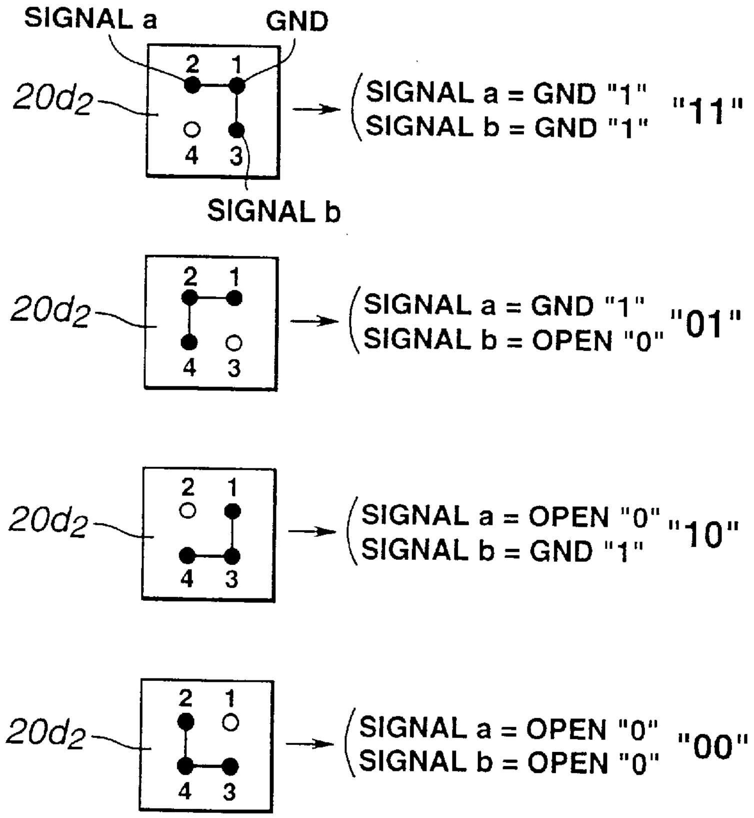

FIG. 11 shows the embodiment which changes the binary data to be input to the controller 30.

As FIG. 11(*a*) shows, a connector 21 is disposed in the controller 30. The connector member 20*d*2 of the connector 21 is fixed to the controller 30, and the connector member 20*c*2 at the other end is removably connected to the connector member 20*d*2.

The connection face is a square for both the connector member 20*c*2 and 20*d*2, where the 2 connection terminal pins, vertically and horizontally, that is, 4 pins in total, are disposed. The terminals 1, 2 and 3 of the connector member 20*c*2 are electrically connected. A ground potential GND is supplied to the terminal 1 of the connector member 20*d*2. The signal a, at the level of binary data 20, is input from the terminal 2 of the connector member 20*d*2 to the controller 30. In the same way, the signal b, at the level of binary data 21, is input from the terminal 3 of the connector member 20*d*2 to the controller 30. The terminal 4 of the connector member 20*d*2 is in an open state (not connected). The ground potential GND indicates a logic "1" level of the digital data, and the potential in the open state indicates a logic "0" level of the digital data.

FIG. 11(*b*) shows the state where the electric connection state of each terminal 1 to 4 (electrically connected terminals are connected with a line) on the connection face of the connector member 20*d*2 changes according to the connection mode of the connector 21, and the binary digital data to be input to the controller 30 is changed accordingly.

In other words, if the connector 21 is connected such that the terminal 1 of the connector member 20*c*2 is connected to the terminal 1 for supplying a ground potential GND of the connector member 20*d*2, then both the terminal 2 for inputting the signal a and the terminal 3 for inputting the signal b of the connector member 20*d*2 becomes a ground potential GND. Therefore the signal a becomes logic "1" level and the signal b becomes logic "1" level, and as a result the binary data "11" is input to the controller.

If the connector 21 is connected such that the terminal 3 of the connector member 20*c*2 is connected to the terminal 1 for supplying a ground potential GND of the connector member 20*d*2, the terminal 2 for inputting the signal a of the connector member 20*d*2 becomes a ground potential GND, and the terminal 3 for inputting the signal b becomes an open state potential. Therefore the signal a becomes logic "1" level and the signal b becomes logic "0" level, and as a result the binary data "01" is input to the controller 30.

If the connector 21 is connected such that the terminal 2 of the connector member 20*c*2 is connected to the terminal 1 for supplying a ground potential GND of the connector member 20*d*2, then the terminal 2 for inputting the signal a of the connector member 20*d*2 becomes an open state potential and the terminal 3 for inputting the signal b becomes a ground potential GND. Therefore the signal a becomes logic "0" level and the signal b becomes logic "1" level, and as a result the binary data "10" is input to the controller 30.

If the connector 21 is connected such that the terminal 4 of the connector member 20*c*2 is connected to the terminal 1 for supplying a ground potential GND, then both the terminal 2 for inputting the signal a and the terminal 3 for inputting the signal b of the connector member 20*d*2 become an open state potential. Therefore the signal a becomes logic "0" level and the signal b becomes logic "0" level, and as a result the binary data "00" is input to the controller 30.

In this way, the content of 2 digit binary data to be input to the controller 30 can be changed by changing the connection mode of the connector 21.

Now an embodiment which changes hexadecimal data to be input to the controller 30 will be explained referring to FIG. 12.

Figure 12A:
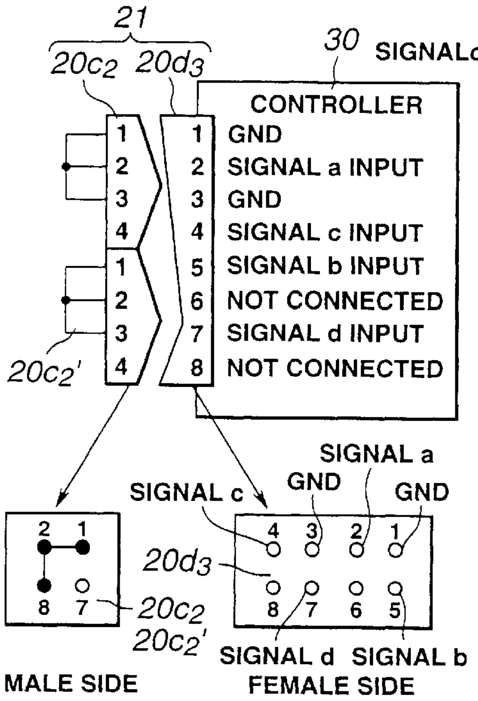
FIGS. 12($a$) and 12($b$) are drawings depicting a configuration of an embodiment of the data change device in accordance with the present invention.
Figure 12B:
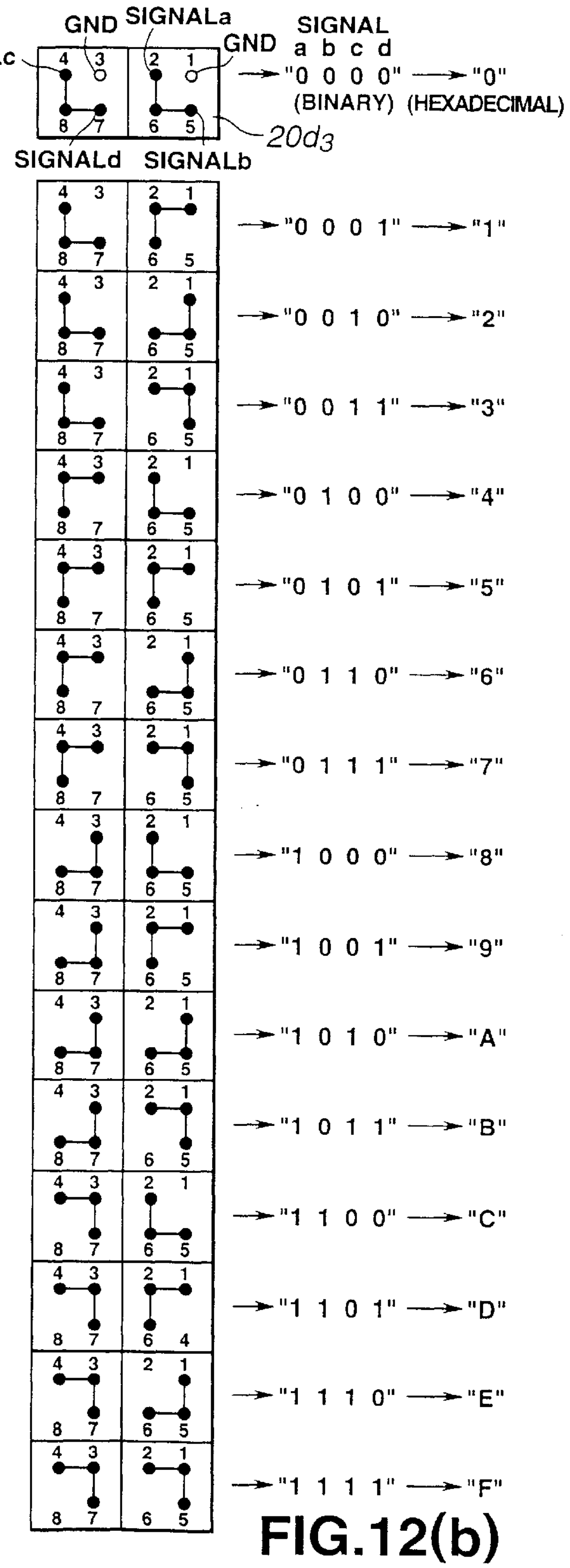

As FIG. 12(*a*) shows, the connector 21 is disposed in the controller 30. The connector member 20*d*3 of the connector 21 is fixed to the controller 30, and the two connector members 20*c*2 and 20*c*'2 at the other end are removably connected to the connector member 20*d*3.

The connection faces are square for both the connector members 20*c*2 and 20'*c*2, where 2 connection terminal pins, both vertically and horizontally, that is, 4 pins in total, are disposed. The terminals 1, 2 and 3 of the connector members 20*c*2 and 20*c*'2 are electrically connected. In the connection face of the connector member 20*d*3, on the other hand, 2 pins vertically and 4 pins horizontally, that is, 8 pins in total, are disposed. A ground potential GND is supplied to the terminals 1 and 3 of the connector member 20*d*3. The signal a at the level of binary data 20 is input from the terminal 2 of the connector member 20*d*3 to the controller 30. In the same way, the signal b at the level of binary data 21 is input from the terminal 5 of the connector member 20*d*3 to the controller 30. In the same way, the signal c at the level of binary data 22 is input from the terminal 4 of the connector member 20*d*3 to the controller 30. In the same way, the signal d at the level of the binary data 23 is input from the terminal 7 of the connector member 20*d*3 to the controller 30. The terminals 6 and 8 of the connector member 20*d*3 are in an open state (not connected). The ground potential GND indicates a logic "1" level of the digital data, and the potential in the open state indicates a logic "0" level of the digital data.

FIG. 12(*b*) shows the state where the electric connection state of each terminal 1 to 8 (electrically connected terminals are connected with a straight line) on the connection face of the connector member 20*d*3 change according to the connection mode of the connector 21, and the binary 4 digit digital data to be input to the controller 30 is changed, and the hexadecimal data is changed accordingly.

In other words, if the connector 21 is connected such that the terminal 4 of the connector member 20*c*2 is connected to the terminal 1 for supplying a ground potential GND of the connector member 20*d*3, and the terminal 4 of the connector member 20*c*'2 is connected to the terminal 3 for supplying a ground potential GND of the connector member 20*d*3, then the terminal 2 for inputting the signal a, the terminal 5 for inputting the signal b, the terminal 4 for inputting the signal c, and the terminal 7 for inputting the signal d of the connector member 20*d*2 become an open state potential. Therefore the signal a becomes logic "0" level, the signal b becomes logic "0" level, the signal c becomes logic "0" level, and the signal d becomes logic "0" level, and as a result the binary data "0000" is input to the controller 30 and the hexadecimal data "0" is input accordingly.

Then by changing the connection mode, the 4 digit binary data "0001" to "1111" is input to the controller 30 in the same manner, and the hexadecimal data "0" to "F" is input accordingly.

In this way, the content of the hexadecimal data to be input to the controller 30 can be changed by changing the connection mode of the connector 21.

Figure 13A:
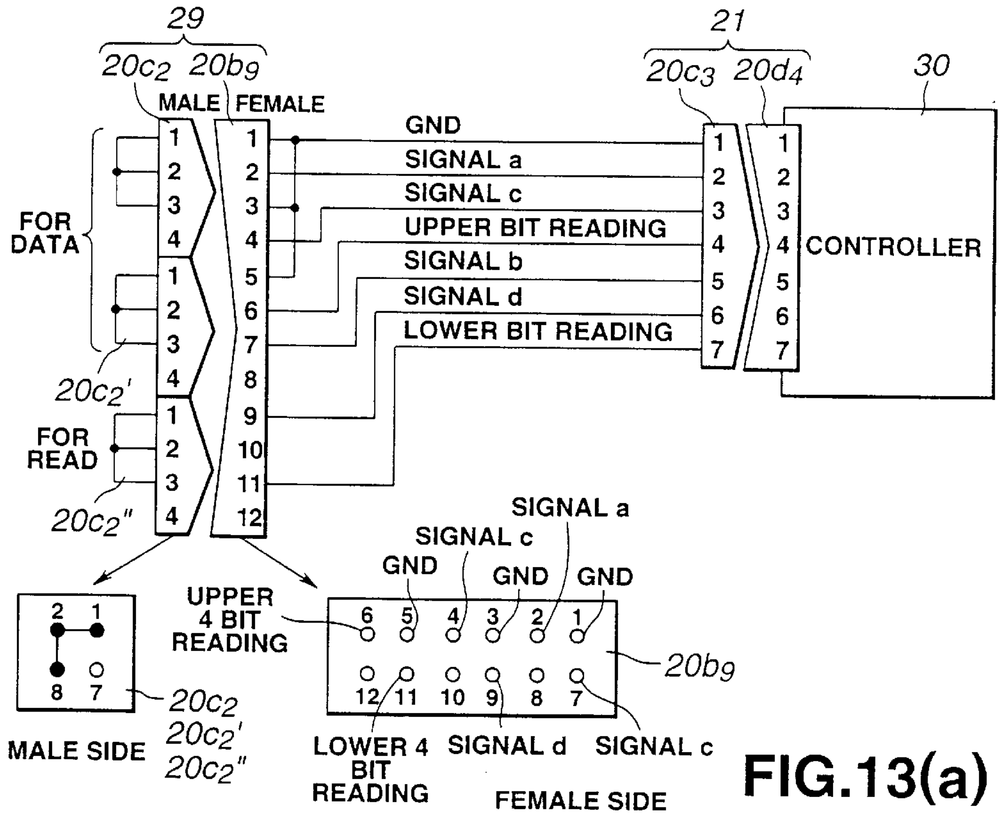
FIGS. 13($a$) and 13($b$) are drawings depicting a configuration of an embodiment of the data change device in accordance with the present invention.
Figure 13B:
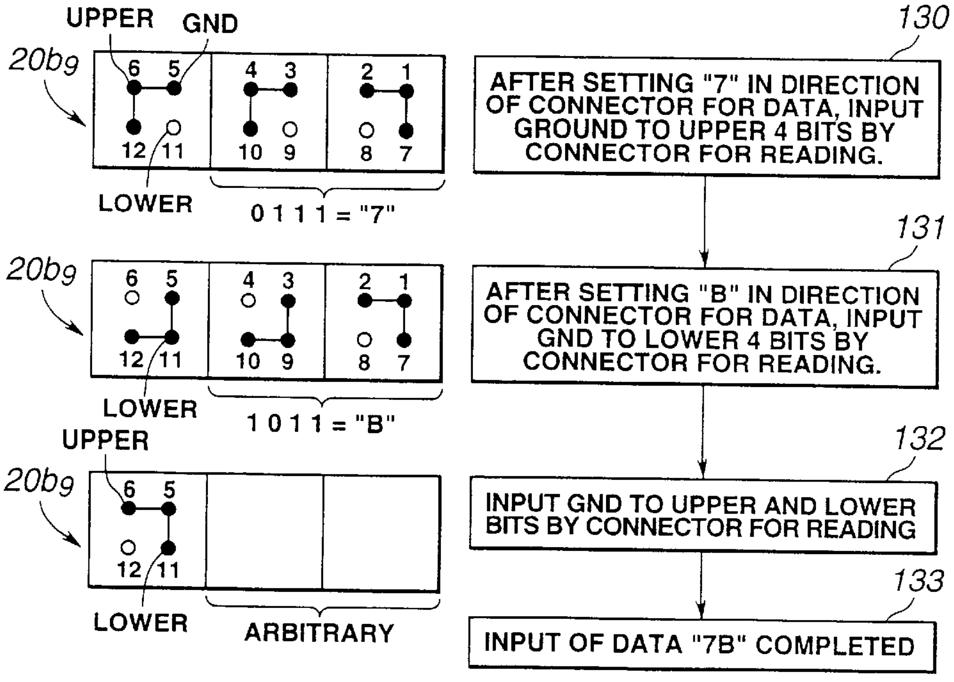

Now an embodiment which can specify an address of the memory to store the data of the controller 30 according to the connection mode of the connector when the data is input is explained referring to FIG. 13. In this embodiment, one byte data (−127 to +128) can be changed.

As FIG. 13(*a*) shows, the connector 21 is disposed in the controller 30. The connector member 20*d*4 of the connector 21 is fixed to the controller 30, and each terminal 1 to 7 of the connector member 20*c*3 at the other end is connected to each terminal 1 to 7 of the connector member 20*d*4.

A ground potential GND is supplied to the terminal 1 of the connector member 20*c*3.

A signal at the level of binary data 20 is input from the terminal 2 of the connector member 20*c*3. In the same way, the signal b at the level of binary data 21 is input from the terminal 5 of the connector member 20*c*3 to the controller 30. In the same way, the signal c at the level of binary data 22 is input from the terminal 3 of the connector member 20*c*3 to the controller 30. In the same way, the signal d at the level of binary data 23 is input from the terminal 6 of the connector member 20*c*3 to the controller 30.

The higher digit read signal for reading the higher digit (161) of the hexadecimal data is input from the terminal 4 of the connector member 20*c*3 to the controller 30. In the same way, the lower digit read signal for reading the lower digit (160) of the hexadecimal data is input from the terminal 7 of the connector member 20*c*3 to the controller 30. The ground potential GND indicates logic "1" level of the digital data, and the potential in the open state indicates logic "0" level of the digital data.

The connection mode of the connector 29 can be freely changed.

The connection face of each connector member 20*c*2, 20'*c*2 and 20"*c*2 at one side of the connector 29 are all square, where 2 connection terminal pins, vertically and horizontally, that is, 4 pins in total, are disposed. The connector members 20*c*2 and 20'*c*2 are the connector members for inputting data, and the connector member 20"*c*2 is the connector member for inputting higher and lower bit read signals.

The terminals 1, 2 and 3 of the connector members 20*c*2, 20*c*'2 and 20"*c*2 are electrically connected. In the connection face of the connector member 20*b*9, on the other hand, 2 pins vertically and 6 pins horizontally, that is, 12 pins in total, are disposed. A ground potential GND is supplied to the terminals 1, 3 and 5 of the connector member 20*b*9. The signal a at the level of the binary data 20 is input from the terminal 2 of the connector member 20*b*9 to the controller 30 via the terminal 2 of the connector 21. In the same way, the signal b at the level of the binary data 21 is input from the terminal 7 of the connector member 20*b*9 to the controller 30 via the terminal 5 of the connector 21. In the same way, the signal c at the level of the binary data 22 is input from the terminal 4 of the connector member 20*b*9 to the controller 30 via the terminal 3 of the connector 21. In the same way, the signal d at the level of the binary data 23 is input from the terminal 9 of the connector member 20*b*9 to the controller 30 via the terminal 6 of the connector 21.

The higher bit read signal is input from the terminal 6 of the connector member 20*b*9 to the controller 30. In the same way, the lower bit read signal is input from the terminal 1 of the connector member 20*b*9 to the controller 30 via the terminal 7 of the connector 21.

The terminals 8, 10 and 12 of the connector member 20*b*9 are in an open state (not connected). The ground potential GND indicates the logic "1" level of the digital data, and the potential in the open state indicates the logic "0" level of the digital data.

FIG. 13(*b*) shows the state where the electric connection state of each terminal 1 to 12 (electrically connected terminals are connected with a line) on the connection face of the connector member 20*b*9 changes according to the connection mode of the connector 21, and the data content to be input to the controller 30 is changed accordingly. Processing is executed in the procedure shown in Steps 130 to 133, and the input data is stored to the specified address of the memory of the controller 30.

Now the case of storing hexadecimal data "7B" (123 in decimal) to a predetermined address of the memory of the controller 30 will be explained.

As Step 130 in FIG. 13(*b*) shows, the connector members 20*c*2 and 20*c*2' for data are connected to the connector member 20*b*9, where the higher digit data of the hexadecimal data is set, and the connector member 20*c*2" for reading are connected to the connector member 20*b*9, where the data to read the higher digit data of the hexadecimal data is set.

The connector members 20*c*2 and 20*c*2' for data are connected to the terminals 1, 2, 3, 4, 7, 8, 9 and 10 of the connector member 20*b*9, and the connector member 20*c*" for reading is connected to the terminals 5, 6, 11 and 12 of the connector member 20*b*9.

As shown in FIG. 12(*b*), the connector members 20*c*2 and 20*c*' for data are connected to the connector member 20*b*9 such that the signal a becomes the logic "1" level, the signal b becomes the logic "1" level, the signal c becomes the logic "1" level and the signal d becomes the logic "0" level, and as a result the binary data "0111" is set and the hexadecimal data "7" is set accordingly. When both the connector members are connected such that the terminal 3 of the connector member 20*c*2" for reading is connected to the terminal 5 for supplying a ground potential GND of the connector member 20*b*9, the terminal 6 for inputting the higher bit read signal of the connector member 20*b*9 becomes a ground potential GND. When the terminal 6 for inputting the higher bit read signal becomes the ground potential GND, the higher bit read signal is input to the controller 30 via the connector 29 and the terminal 4 of the connector 21 at the controller 30 side. In response to this, the controller 30 reads the above mentioned binary data "0111" as the higher 4 bit data via the connector 29 and the terminals 2, 3, 5 and 6 of the connector 21 at the controller 30 side (Step 130).

Then the connector members 20*c*2 and 20*c*2' for data are connected to the connector member 20*b*9, where the lower digit data of the hexadecimal data is set, and the connector member 20*c*2" for reading is connected to the connector member 20*b*9, where the data to read the lower digit data of the hexadecimal data is set.

In other words, as shown in FIG. 12(*b*), the connector members 20*c*2 and 20*c*2' for data are connected to the connector member 20*b*9 such that the signal a becomes the logic "1" level, the signal b becomes the logic "1" level, the signal c becomes the logic "0" level, and the signal d becomes the logic "1" level, and as a result the binary data "1011" is set and the hexadecimal data "B" is set accordingly. When both the connector members are connected such that the terminal 2 of the connector member 20*c*2" for reading is connected to the terminal 5 for supplying a ground potential GND of the connector member 20*b*9, the terminal 11 for inputting the lower bit read signal of the connector member 20*b*9 becomes a ground potential GND. When the terminal 11 for inputting the lower bit read signal becomes the ground potential GND, the lower bit read signal is input to the controller 30 via the connector 29 and the terminal 7 of the connector 21 at the controller 30 side. In response to this, the controller 30 reads the above mentioned binary data "1011" as the lower 4 bit data via the connector 29 and the terminals 2, 3, 5 and 6 of the connector 21 at the controller 30 side (Step 131).

Then the connector members 20*c*2 and 20*c*2' for data are connected to the connector member 20*b*9, where the data indicating the specified address of the memory is set, and at the same time, the connector member 20*c*2" for reading is connected to the connector member 20*b*9, where the data to store the above mentioned higher 4 bit binary data "0111" and the lower 4 bit binary data "1011" in the specified address of the memory is set.

In other words, as shown in FIG. 12(*b*), the connector members 20*c*2 and 20*c*2' for data are connected to the connector member 20*b*9 such that the signal a becomes the logic "0" level, the signal b becomes the logic "0" level, the signal c becomes the logic "1" level, and the signal d becomes the logic "0" level, and as a result the binary data "0100? is set and the hexadecimal data "4" is set accordingly.

When both the connector members are connected such that the terminal 1 of the connector member 20*c*2" for reading is connected to the terminal 5 for supplying a ground potential GND of the connector member 20*b*9, both the terminal 6 for inputting the higher bit read signal and the terminal 11 for inputting the lower bit read signal of the connector member 20*b*9 become a ground potential GND. When both the terminal 6 for inputting the higher bit read signal and the terminal 11 for inputting the lower bit read signal become the ground potential GND, the higher bit read signal and the lower bit read signal are input to the controller 30 via the connector 29 and the terminals 4 and 7 of the connector 21 at the controller 30 side. In response to this, the controller 30 judges that the data should be stored in the specified address of the memory. Then in response to this, the controller 30 reads the above mentioned binary data "0100" indicating the specified address of the memory via the connector 29 and the terminals 2, 3, 5 and 6 of the connector 21 at the controller 30 side. And a data comprised of the higher 4 bit data "0111" and the lower 4 bit data "1011", which is hexadecimal data "7B", is stored in the specified address "0100" (hexadecimal data "4") of the memory (Step 133).

Now using the case of changing the data content of the above mentioned p-q curve as an example, the processing executed in the controller 30 will be more concretely explained. Since the basic configuration is the same as FIG. 13, overlapping information will be omitted here.

Figure 14A:
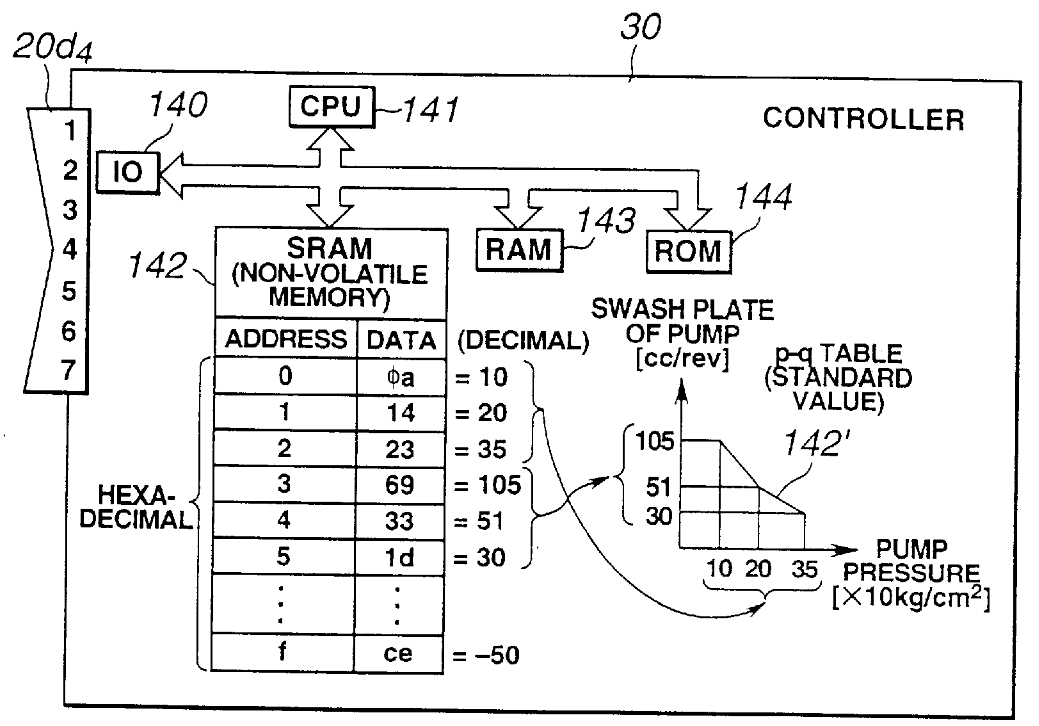
FIGS. 14($a$) to 14($c$) are drawings depicting a configuration of an embodiment of the data change device in accordance with the present invention.
Figure 14B:
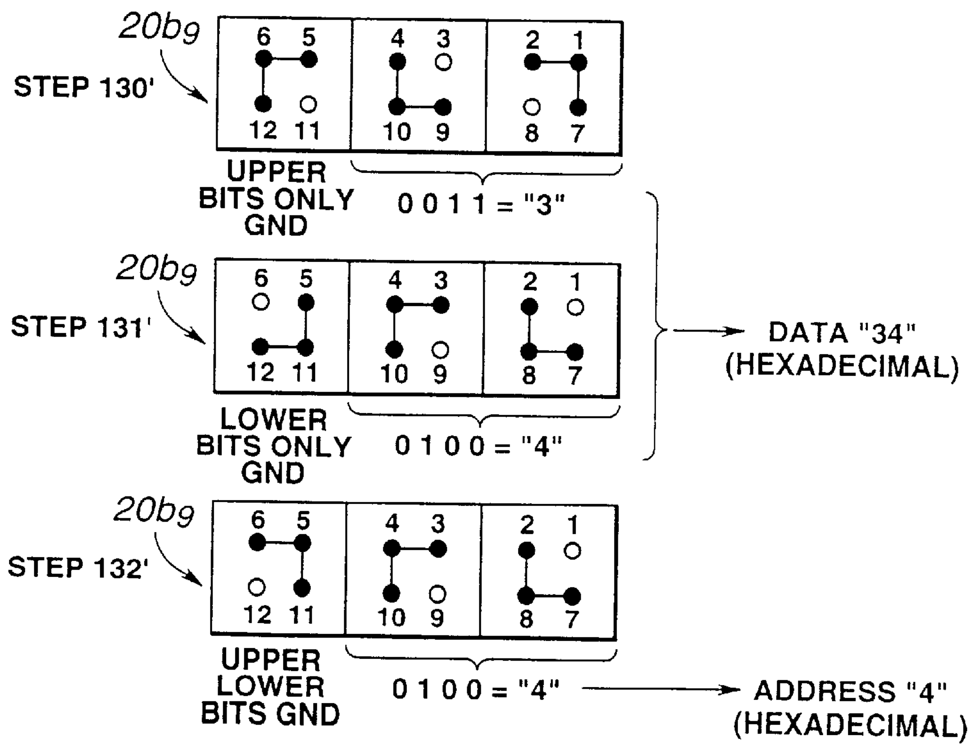
Figure 14C:
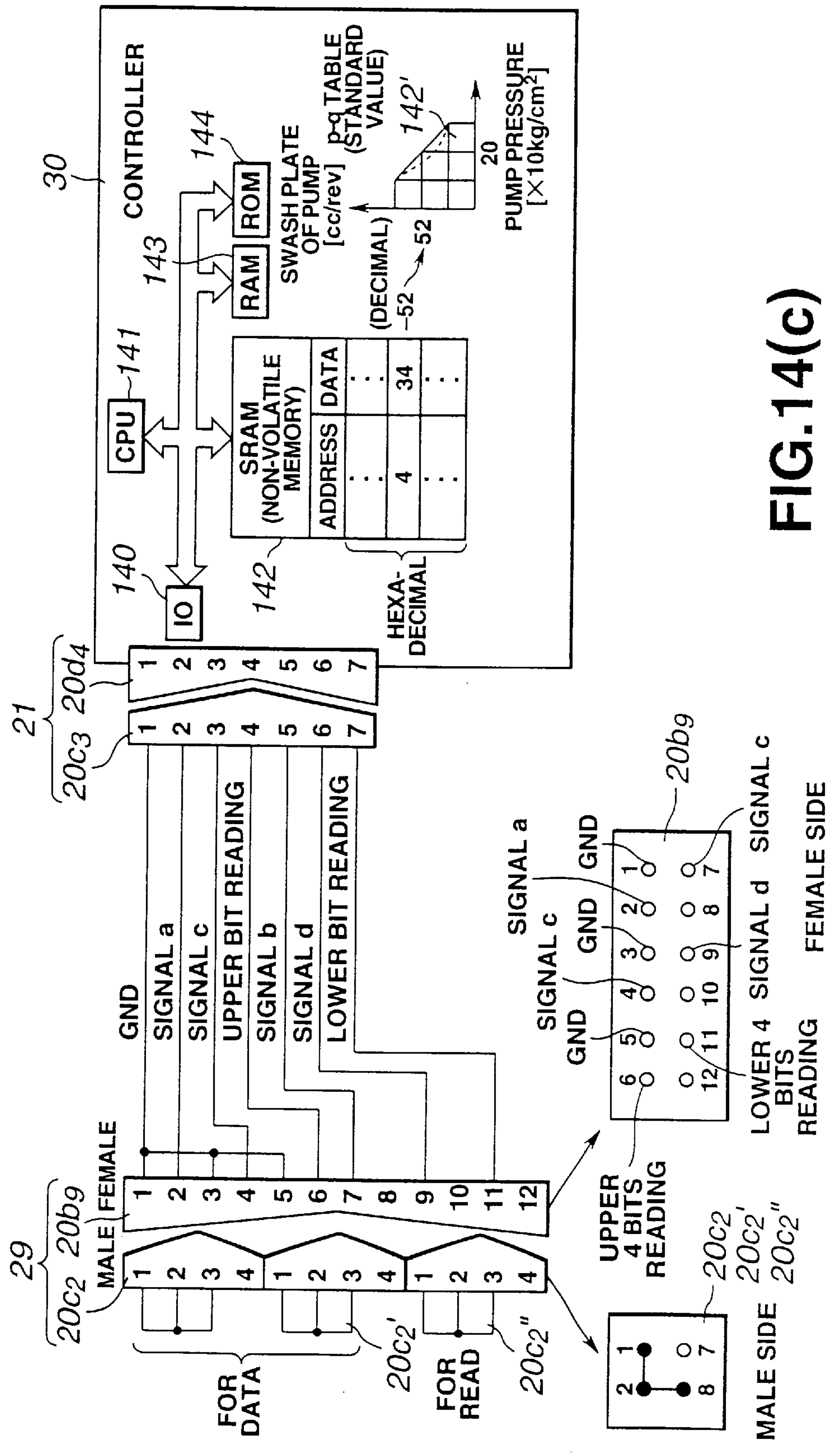
Figure 15:
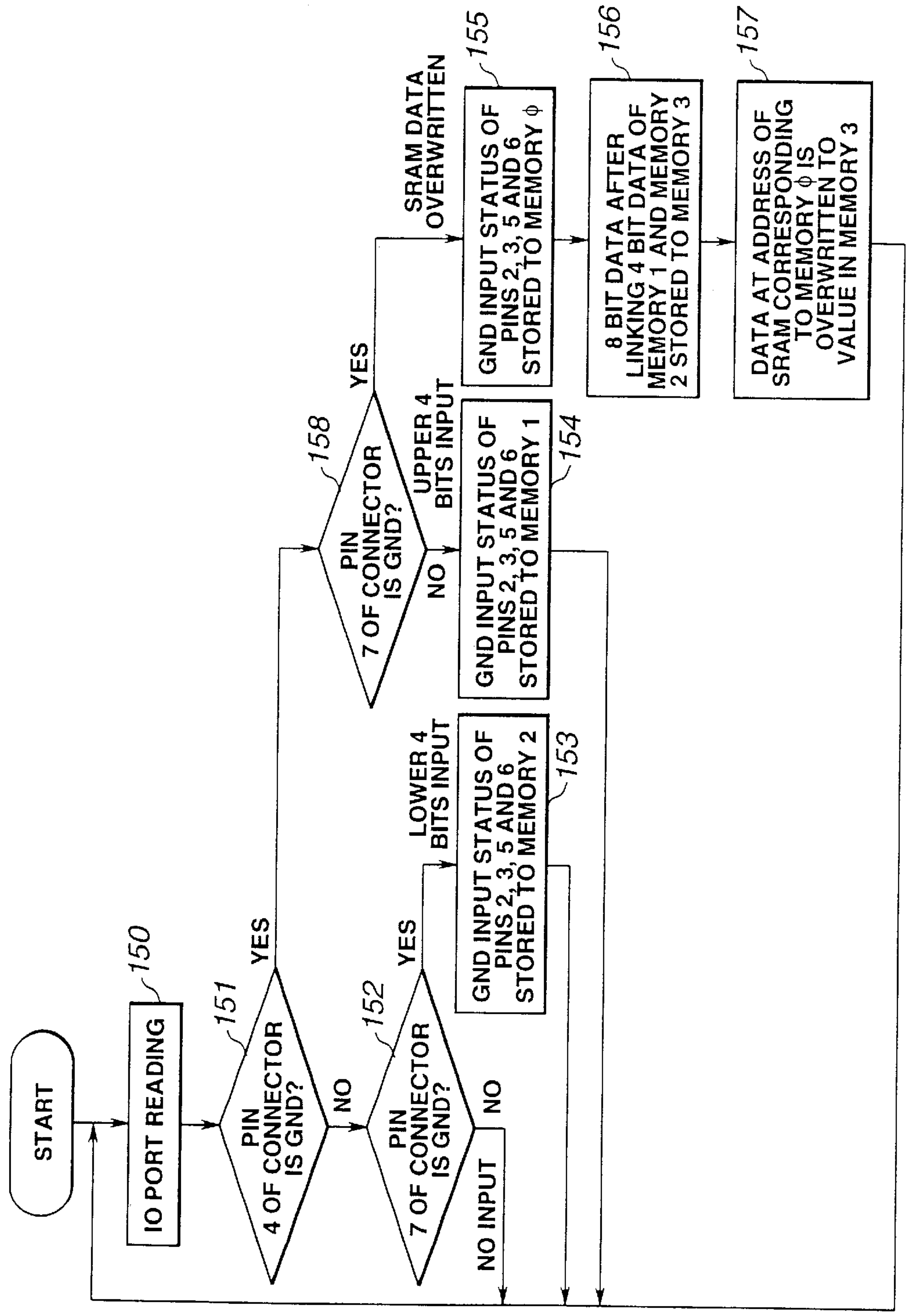
FIG. 15 is a flow chart showing the processing executed by the controller shown in FIG. 14.
Figure 16A:
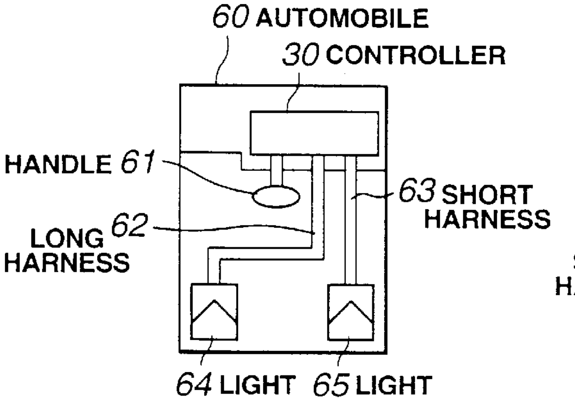
FIGS. 16($a$) to 16($d$) are drawings depicting a configuration of an embodiment of the connector in accordance with the present invention.
Figure 16B:
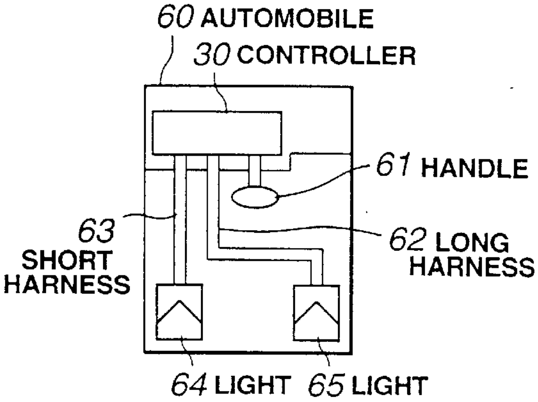
Figure 16C:
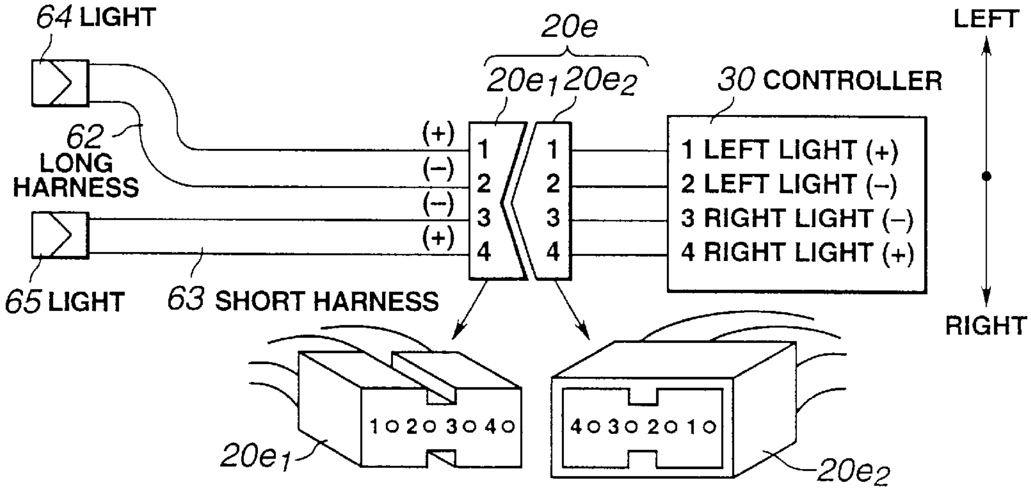
Figure 16D:
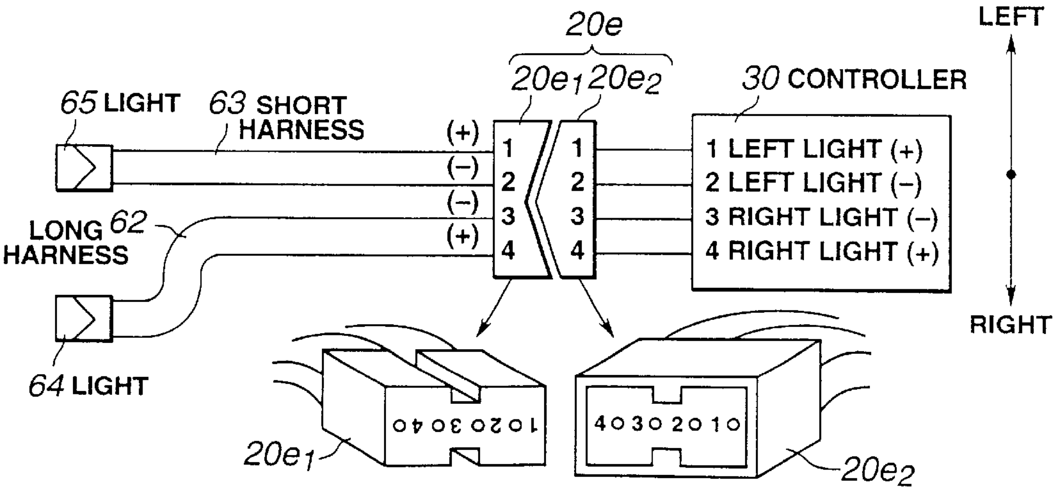
Figure 17A:
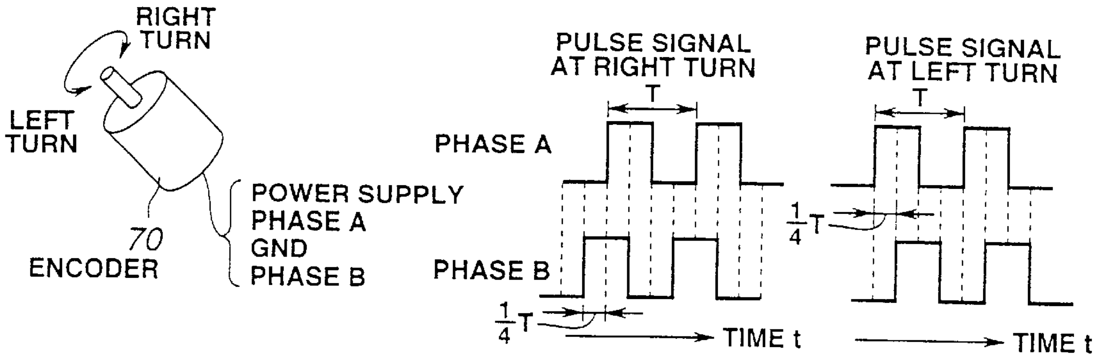
FIGS. 17($a$) to 17($d$) are drawings depicting a configuration of an embodiment of the connector in accordance with the present invention.
Figure 17B:
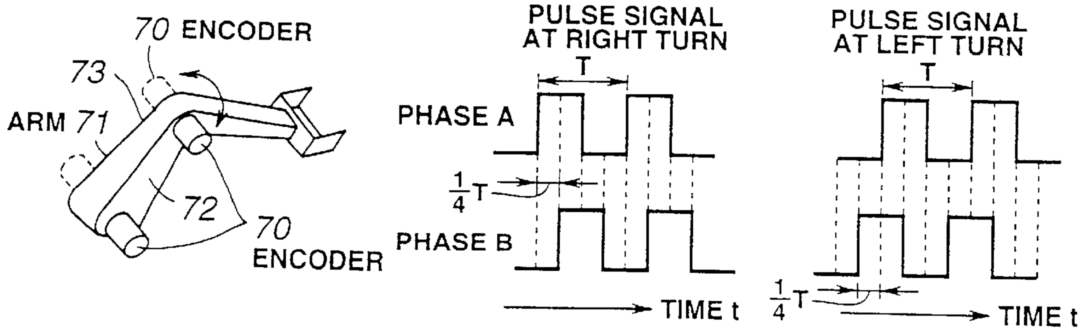
Figure 17C:
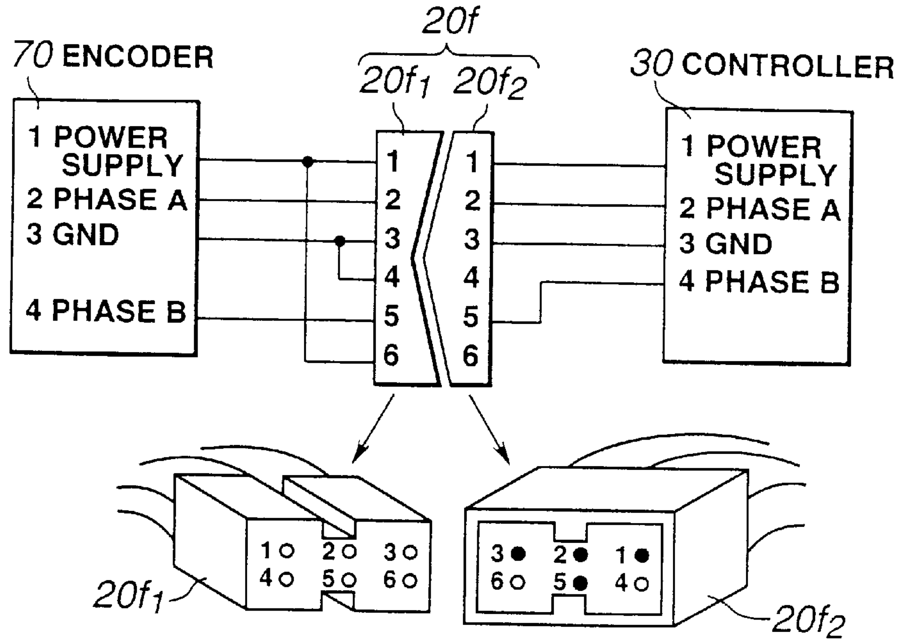
Figure 17D:
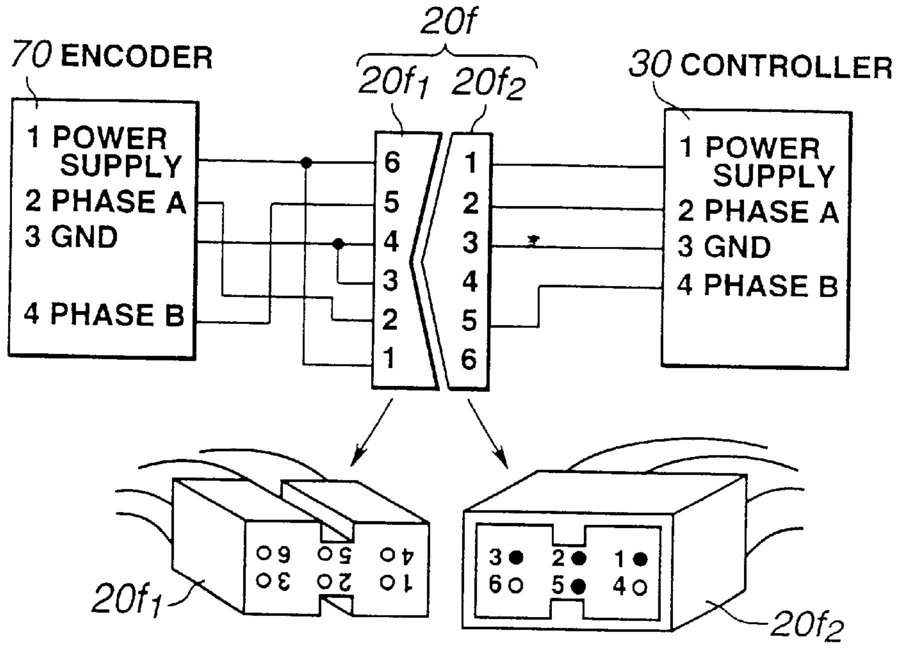

FIG. 14(*a*) is a block diagram depicting the internal configuration of the controller 30, FIG. 14(*b*) is a drawing corresponding to FIG. 13(*b*), FIG. 14(*c*) is a drawing depicting that data has been changed, and FIG. 15 is a flow chart showing the procedure of the processing executed in the controller 30.

As these drawings show, the controller 30 comprises an IO port 140 where the data is input via each terminal 1 to 8 of the connector member 20*d*4 of the connector 21, a CPU 141 which executes arithmetic processing for storing the input data to a memory, an SRAM 142 (non-volatile memory) for storing the above mentioned p-q curve data, a RAM 143 for temporarily storing data required for arithmetic processing, and a ROM 144 where the program shown in FIG. 15 is stored.

The content stored in the SRAM 142 (non-volatile memory) can be conceptually indicated by 142'. 142' indicates the p-q curve. The abscissa is pump discharge pressure p[×10 kg/cm$^2$] and the ordinate is the pump swash plate (displacement of the pump) q[cc/rev]. The swash plate of the hydraulic pump in the construction machine is controlled such that the absorption torque of the hydraulic pump does not exceed a certain torque determined by the p-q curve.

In each address 0, 1, 2, - - - f of the SRAM 142, the data of the pump swash plate q and the data of the pump pressure p are stored as hexadecimal data. In the addresses 0, 1 and 2, the data 10, 20 and 35 (decimal) of the pump pressure p is stored as hexadecimal data ϕa, 14 and 23 respectively. In the addresses 3, 4 and 5, the data 105, 51 and 30 (decimal) of the pump swash plate q is stored as hexadecimal data 69, 33 and 1*d* respectively.

Now the case when the data 33 in address 4 of the SRAM 142 is changed to 34 (hexadecimal) will be explained referring to FIG. 14(*b*) and FIG. 15. The "memory ϕ to 3" shown below is a variable in RAM 143.

At first, as Step 130' in FIG. 14(*b*) shows, the connector members 20*c*2 and 20*c*2' for data are connected to the connector member 20*b*9, where the higher digit data of the hexadecimal data is set, and at the same time, the connector member 20*c*2" for reading is connected to the connector member 20*b*9, where the data to read the higher digit data of the hexadecimal data is set (Step 130').

As shown in FIG. 12(*b*), the connector members 20*c*2 and 20*c*2' for data are connected to the connector member 20*b*9 such that the signal a becomes the logic "0" level, the signal b becomes the logic "0" level, the signal c becomes the logic "1" level, and the signal d becomes the logic "1" level, and as a result the binary data "0011" is set and the hexadecimal data "3" is set accordingly. When both the connector members are connected such that the terminal 3 of the connector member 20*c*2" for reading is connected to the terminal 5 for supplying the ground potential GND of the connector member 20*b*9, the terminal 6 for inputting the higher bit read signal of the connector member 20*b*9 becomes a ground potential GND. When the terminal 6 for inputting the higher bit read signal becomes the ground potential GND, the higher bit read signal is input to the controller 30 via the connector 29 and the terminal 4 of the connector 21 at the controller 30 side. In other words, the data input from the IO port 140 is read (Step 150) and it is judged that the terminal 4 of the connector 21 is a ground potential GND (YES in Step 151). At the moment, the terminal 7 of the connector 21 is not a ground potential GND (NO in Step 158).

In response to this, the controller 30 reads the above mentioned binary data "0011" as the higher 4 bit data via the terminals 2, 3, 5 and 6 of the connector 21 at the controller 30 side and stores the data in the memory 1 (Step 154).

Then the connector members 20*c*2 and 20*c*2' for data are connected to the connector member 20*b*9, where the lower digit data of the hexadecimal data is set, and at the same time, the connector member 20*c*2" for reading is connected to the connector member 20*b*9, where the data to read the lower digit data of hexadecimal data is set (Step 131).

In other words, as shown in FIG. 12(*b*), the connector members 20*c*2 and 20*c*2' for data are connected to the connector member 20*b*9 such that the signal a becomes the logic "0" level, the signal b becomes the logic "0" level, the signal c becomes the logic "1" level, and the signal d becomes the logic "0" level, and as a result the binary data "0100" is set and the hexadecimal data "4" is set accordingly. When both the connector members are connected such that the terminal 2 of the connector member 20*c*2" for reading is connected to the terminal 5 for supplying the ground potential GND of the connector member 20*b*9, the terminal 11 for inputting the lower bit read signal of the connector member 20*b*9 becomes a ground potential GND. When the terminal 11 for inputting the lower bit read signal becomes a ground potential GND, the lower bit read signal is input to the controller 30 via the connector 29 and the terminal 7 of the connector 21 at the controller 30 side. In other words, the data input from the IO port 140 is read (Step 150), and since the terminal 4 of the connector 21 is not a ground potential GND (NO in Step 151), it is judged that the terminal 7 of the connector 21 is a ground potential GND (YES in Step 152).

In response to this, the controller 30 reads the above mentioned binary data "0100" as the lower 4 bit data via the terminals 2, 3, 5 and 6 of the connector 21 at the controller 30 side and stores the data to the memory 2 (Step 153).

Then the connector members 20*c*2 and 20*c*2' for data are connected to the connector member 20*b*9, where the data indicating the specified address of the SRAM 142 is set, and at the same time, the connector member 20*c*2" for reading is connected to the connector member 20*b*9, where the data to store the above mentioned higher 4 bit binary data "0011" and the lower 4 bit binary data "0100" to the specified address of the SRAM 142 is set (Step 132').

In other words, as shown in FIG. 12(*b*), the connector members 20*c*2 and 20*c*2' for data are connected to the connector member 20*b*9 such that the signal a becomes the logic "0" level, the signal b becomes the logic "0" level, the signal c becomes the logic "1" level, and the signal d becomes the logic "0" level, and as a result the binary data "0100" is set and the hexadecimal data "4" is set accordingly.

When both connector members are connected such that the terminal 1 of the connector member 20*c*2" for reading is connected to the terminal 5 for supplying the ground potential GND of the connector member 20*b*9, both the terminal 6 for inputting the higher bit read signal and the terminal 11 for inputting the lower bit read signal become the ground potential GND. When both the terminal 6 for inputting the higher bit read signal and the terminal 11 for inputting the lower bit read signal become a ground potential GND, the higher bit read signal and the lower bit read signal are input to the controller 30 via the connector 29 and the terminals 4 and 7 of the connector 21 at the controller 30 side. In other words, the data input from the IO port 140 is read (Step 150), it is judged that the terminal 4 of the connector 21 is a ground potential GND (YES in Step 151), and it is judged that the terminal 7 of the connector 21 is a ground potential GND (YES in Step 158).

In response to this, the controller 30 reads the above mentioned binary data "0100" indicating the specified address of the SRAM 142 via the terminals 2, 3, 5 and 6 of the connector 21 at the controller 30 side and stores the data to the memory ϕ (Step 155).

Then the controller 30 links the higher 4 bit data "0011"stored in the memory 1 and the lower 4 bit data "0100" stored in the memory 2 to be the 8 bit data "00110100" (hexadecimal data "34"), and stores the data to the memory 3 (Step 156).

Then the controller 30 reads the address 0100 (hexadecimal data "4") of the SRAM 142 stored in the memory ϕ, and overwrites the data "33 (hexadecimal) currently stored in this address "0100" to the value "34" (hexadecimal) stored in the memory 3 (Step 157).

In this way, the data 33 (51 in decimal) in address 4 of the SRAM 142 is changed to be 34 (52 in decimal), and the p-q curve is changed to be the broken line shown in 142' (see FIG. 14(*c*)).

In the embodiments shown in FIG. 14 and FIG. 15, the data stored in the SRAM 142 is changed, but each program in the controller for automatically calibrating such an input/output device as a sensor may be started up by a combination of the insertion directions of the connector.

Also in the present embodiment, the change of control pattern of a construction machine, the change of data content of the controller of a construction machine, and the determination of a failed area of a construction machine are assumed, but the present invention can be applied to any subject without being restricted to a construction machine.

Now an embodiment to change a steering wheel specification of an automobile will be explained referring to FIGS. 16(*a*), 16(*b*) and 16(*c*).

FIGS. 16(*a*) and 16(*b*) are states where a light 65 and a light 64 of an automobile and a controller for controlling these lights are connected via a long harness 62 and a short harness 63, which is shorter than the harness 62. FIG. 16(*a*) shows a right steering wheel specification where the steering wheel 61 and the controller 30 are disposed at the right side of the seats, and FIG. 16(*b*) shows a left steering wheel specification where the steering wheel 61 and the controller 30 are disposed at the left side of the seats.

In accordance with a prior art shown in FIGS. 16(*a*) and 16(*b*), the long harness 62 and the short harness 63 are disconnected once from the controller 30, and the light 64 and the light 65, and are then reconnected to change the right steering specification to the left steering specification or vice versa. This increases the load on the service personnel to carry out the operation of changing the specification, which reduces work efficiency.

So in accordance with the steering wheel specification change device of the present invention, the specification of the steering wheel is changed by changing the connection mode of the connector members for connecting the harnesses.

As FIG. 16(*c*) shows, this steering wheel specification change device for an automobile comprises a light 64, a light 65, a controller 30, which outputs right light signals for turning on the right light and the left light signals for turning on the left light to the light 64 and the light 65, a long harness 62 for connecting the controller 30 and the light 64, a short harness 63 for connecting the controller 30 and the light 64, and a connector 20*e*, where the disposition of the harnesses changes depending on the connection mode of a connector member 20*e*1 and a connector member 20*e*2.

The controller 30 has terminals 1, 2, 3 and 4, where a left light signal (+) is output from the terminal 1, a left light signal (−) from the terminal 2, a right light signal (−) from the terminal 3, and the right light signal (+) from the terminal 4 respectively to the lights 64 and 65 via electric signal wires.

Each connector 20*e*1 and 20*e*2 of the connector 20*e* has each terminal 1 to 4 respectively, so that the light signals (+) and (−) are input from the controller 30 to the light 64, and the light signals (+) and (−) are input from the controller 30 to the light 65 without fail, even if the connection mode of the connectors 20*e*1 and 20*e*2 changes. The terminal 1 of the connector member 20*e*1 is a terminal for supplying the plus direction electric signals, the terminal 2 of the connector member 20*e*1 is a terminal for supplying the minus direction electric signals, and the long harness 62 is connected to these terminals 1 and 2 of the connector member 20*e*1 so as to input the electric signals to the light 64. The terminal 3 of the connector member 20*e*2 is a terminal for supplying the minus direction electric signals, the terminal 4 of the connector member 20*e*1 is a terminal for supplying the plus direction electric signals, and a short harness 63 is connected to these terminals 3 and 4 of the connector member 20*e*1 so as to input the electric signals to the light 65.

The terminal 1 of the connector member 20*e*2 is connected to the terminal 1 for outputting the left light signals (+) of the controller 30 via an electric signal wire. In the same way, the terminal 2 of the connector member 20*e*2 is connected to the terminal 2 for outputting the left light signals (−) of the controller 30 via an electric signal wire. The terminal 3 of the connector member 20*e*2 is connected to the terminal 3 for outputting the right light signals (−) of the controller 30 via an electric signal wire. In the same way, the terminal 4 of the connector member 20*e*2 is connected to the terminal 4 for outputting the right light signals (+) of the controller 30 via an electric signal wire.

At the top and bottom parts of the connection face of the connector member 20*e*1, a concave portion is formed respectively so that a convex portion formed at the top and bottom parts of the connection face of the connector member 20*e*2 interfits respectively.

Therefore if both the connector members are connected such that the convex portions of the connector member 20*e*2 interfit with the concave portions of the connector member 20*e*1 without changing the vertical relationship shown in FIG. 16(*c*), then the terminals 1, 2, 3 and 4 of the connector member 20*e*1 are connected to the terminals 1, 2, 3 and 4 of the connector member 20*e*2 respectively.

At this time, the left light signal (+) and the left light signal (−), which are output from the terminals 1 and 2 of the controller 30, are input to the light 64 via the terminals 1 and 2 of the connector member 20*e*2, the terminals 1 and 2 of the connector member 20*e*1, and the long harness 62. As a result, the light 64 functions as the left light.

The right light signal (+) and the right signal (−), which are output from the terminals 3 and 4 of the controller 30, are input to the light 65 via the terminals 3 and 4 of the connector member 20*e*2, the terminals 3 and 4 of the connector member 20*e*1, and the short harness 63. As a result, the light 65 functions as the right light.

In this way, the steering wheel specification of the automobile 60 is changed to the right steering wheel specification.

If the connector member 20*e*1 is turned upside down in the state shown in FIG. 16(*c*) so as to change the insertion direction of the connector member 20*e*1 to the connector member 20*e*2, and these connector members 20*e*1_@ and 20*e*2 are connected in this state, then the terminals 1, 2, 3 and 4 of the connector member 20*e*2 are connected to the terminals 4, 3, 2 and 1 of the connector member 20*e*1 respectively, as shown in FIG. 16(*d*).

At this time, the left light signal (+) and the left light signal (−), which are output from the terminals 1 and 2 of the controller 30, are input to the light 65 via the terminals 1 and 2 of the connector member 20*e*2, the terminals 4 and 3 of the connector member 20*e*1, and the short harness 63. As a result, the light 65 functions as the left light.

The right light signal (+) and the right light signal (−), which are output from the terminals 3 and 4 of the controller 30, are input to the light 64 via the terminals 3 and 4 of the connector member 20*e*2, the terminals 2 and 1 of the connector member 20*e*1, and the long harness 62. As a result, the light 64 functions as the right light.

In this way, the steering wheel specification of the automobile 60 is changed to the left steering wheel specification.

As described above, in accordance with the present embodiment, the steering wheel specification of an automobile can be changed merely by changing the connection mode of the connector members 20*e*1 and 20*e*2. It is unnecessary to disconnect the harnesses from the controller and the lights, and reconnect them as in a prior art. This decreases the load on the service personnel and improves work efficiency to change the specification.

Now an embodiment to change the signals to be output from a rotary encoder will be explained referring to FIGS. 17(*a*), 17(*b*), 17(*c*) and 17(*d*).

As FIG. 17(*a*) shows, pulse signals having different phases, phase A and phase B, are output from the encoder 70. For example, when the encoder 70 is turned to the right, the phase of the phase B pulse signal is ¼ cycle ahead of the phase of the phase A pulse signal. When the encoder 70 is turned to the left, the phase of the phase B pulse signal is ¼ cycle behind the phase of the phase B pulse signal.

In this way, the encoder 70 outputs two signals and detects the rotation direction depending on which phase of these signals is ahead or behind.

A ground potential GND and a power supply required for outputting pulse signals from the encoder 70 are supplied to the encoder 70.

However, as FIG. 17(*b*) shows, when the encoder 70 is installed on an arm 71 of a robot, for example, if the encoder 70 is installed on the face 73 (indicated by the dotted line), which is the opposite side of the face 72 where the encoder 70 is installed in FIG. 17(*b*), then the phases of the phase A and phase B pulse signals become opposite that of the phases of the pulse signal shown in FIG. 17(*a*).

In other words, when the encoder 70 is turned to the right, as shown in FIG. 17(*b*), the phase of the phase B pulse signal is ¼ cycle behind the phase of the phase A pulse signal. When the encoder 70 is turned to the left, the phase of the phase B pulse signal is ¼ cycle ahead of the phase of the phase A pulse signal.

Here it is assumed that the encoder 70 is made by company A, where the phase A and phase B pulse signals to be output have the phase relationship shown in FIG. 17(*a*). And it is also assumed that the phase A and phase B pulse signals to be output from the encoder made by company B have the phase relationship shown in FIG. 17(*b*). In such a case, the encoders made by company A and company B are not compatible since the phase relationship of the phase A and phase B pulse signals to be output from the encoder is different. Therefore if the controller requires pulse signals having the phase relationship shown in FIG. 17(*b*), the encoder 70 made by company A cannot be used, and if the controller requires pulse signals having the phase relationship shown in FIG. 17(*a*), then the encoder made by company B cannot be used.

So in accordance with the rotary encoder output signal change device of the present invention, the pulse signals to be output from the rotary encoder are changed by changing the connection mode of the connector members.

As FIG. 17(*c*) shows, the rotary encoder output signal change device of this embodiment comprises an encoder 70 which outputs 2 pulse signals in phase A and phase B, a controller 30 for detecting the rotation angle and rotation direction based on the pulse signals to be output from the encoder 70, and a connector 20*f* where the pulse signals to be output from the rotary encoder 70 are changed depending on the connection mode of the connector member 20*f*1 and the connector member 20*f*2.

In this embodiment it is assumed that the controller 30 is a controller which requires pulse signals having the phase relationship shown in FIG. 17(*a*). And it is assumed that the encoder 70 is made by company A and is installed on the face 72 of the arm 71.

The controller 30 has the terminals 1, 2, 3 and 4, and a power supply is supplied from the terminal 1 to the encoder 70 via an electric signal wire. In the same way, a ground potential GND is supplied from the terminal 3 of the controller 30 to the encoder 70 via an electric signal wire. And the phase A pulse signal, which is output from the encoder 70, is detected at the terminal 2. In the same way, the phase B pulse signal, which is output from the encoder 70, is detected at the terminal 4.

The encoder 70, on the other hand, has the terminals 1, 2, 3 and 4, and a power supply is supplied from the controller 30 to the terminal 1 via an electric signal wire. In the same way, a ground potential GND is supplied from the controller 30 to the terminal 3. The phase A pulse signal is output from the terminal 2. In the same way, the phase B pulse signal is output from the terminal 4.

Each connector **20*f*1 and 20*f*2 of the connector 20*f* have each terminal 1 to 6 so that a ground potential GND is supplied from the controller 30 to the encoder 70 without fail, and a power supply is supplied from the controller 30 to the encoder 70 without fail, even if the connection mode of the connectors 20*f*1 and 20*f*2** changes.

The connector member **20*f*1 has each terminal 1 to 6. The terminal 1 of the connector member 20*f*1 is a terminal for supplying a power supply, and a power supply is supplied from the terminal 1 for supplying a power supply to the terminal 1 of the rotary encoder 70 via an electric signal wire. In the same way, the terminal 3 of the connector member 20*f*1 is a terminal for supplying a ground potential GND, and a ground potential GND is supplied from the terminal 3 for supplying a ground potential GND to the terminal 3 of the encoder 70** via an electric signal wire.

Signal wires branched from the above mentioned electric signal wires are connected to the terminals 4 and 6 of the connector member **2*f*1. In other words, a ground potential GND is supplied from the terminal 4 of the connector member 20*f*1 to the terminal 3 of the encoder 70 via an electric signal wire. In the same way, a power supply is supplied from the terminal 6 of the connector member 20*f*1 to the terminal 1 of the encoder 70** via an electric signal wire.

The phase A pulse signal shown in FIG. 17(*a*), which is output from the terminal 2 of the encoder 70, is input to the terminal 2 of the connector member **20*f*1. In the same way, the phase B pulse signal shown in FIG. 17**(*a*), which is output from the terminal 4 of the encoder 70, is input to the terminal 5 of the connector member **20*f*1**.

The terminal 1 of the connector member **20*f*2, on the other hand, is connected to the terminal 1 for supplying a power supply of the controller 30 via an electric signal wire. In the same way, the terminal 3 of the connector member 20*f*2 is connected to the terminal 3 for supplying a ground potential GND of the controller 30** via an electric wire.

The terminal 2 of the connector member **20*f*2 is connected to the terminal 2 for detecting the pulse A pulse signal of the controller 30 via an electric signal wire. In the same way, the terminal 5 of the connector member 20*f*2 is connected to the terminal 4 for detecting the phase B pulse signal of the controller 30 via an electric signal wire. The other terminals 4 and 6 of the connector member 20*f*2** are not connected.

At the top and bottom parts of the connection face of the connector member **20*f*1, a concave portion is formed respectively so that a convex portion formed at the top and bottom parts of the connection face of the connector member 20*f*2** interfits respectively.

Therefore if both the connector members are connected such that the convex portions of the connector member **20*f*2 interfit with the concave portions of the connector member 20*f*1 without changing the vertical relationship shown in FIG. 17**(*c*), then the terminals 1, 2, 3, 4, 5 and 6 of the connector member **20*f*1 are connected to the terminals 1, 2, 3, 4, 5 and 6 of the connector member 20*f*2** respectively.

At this time, the phase A pulse signal, which is output from the encoder 70, is input to the terminal 2 for detecting the phase A pulse signal of the controller 30 via the terminal 2 of the connector member **20*f*1 and the terminal 2 of the connector member 20*f*2. The phase B pulse signal, which is output from the encoder 70, is input to the terminal 4 for detecting the phase B pulse signal of the controller 30 via the terminal 5 of the connector member 20*f*1 and the terminal 5 of the connector member 20*f*2**.

A power supply is supplied to the encoder 70 via the terminal 1 for supplying a power supply of the controller 30, the terminal 1 of the connector member **20*f*2, and the terminal 1 for supplying a power supply of the connector member 20*f*1. In the same way, a ground potential GND is supplied to the encoder 70 via the terminal 3 for supplying a ground potential GND of the controller 30, the terminal 3 of the connector member 20*f*2, and the terminal for supplying a ground potential GND of the connector member 20*f*1**.

Here it is assumed that the encoder 70, made by company A, is installed on the face 73 (indicated by the dotted line) of the arm 71, which is at the opposite side of the face 72 where the encode] is installed in FIG. 17(*b*). Or it is assumed that the encoder 70, made by company A, is replaced with the encoder made by company B (installation face 72 of the arm 71 is the same).

If the connector member **20*f*1 is turned upside down in the state shown in FIG. 17**(*c*) so as to change the insertion direction of the connector member **20*f*1 to the connector member 20*f*2, and these connector members 20*f*1 and 20*f*2 are connected in this state, then the terminals 6, 5, 4, 3, 2 and 1 of the connector member 20*f*1 are connected to the terminals 1 to 6 of the connector member 20*f*2 respectively, as shown in FIG. 17**(*d*).

At this time, the phase A pulse signal, which is output from the encoder 70, is input to the terminal 4 for detecting the phase B pulse signal of the controller 30 via the terminal 2 of the connector member **20*f*1 and the terminal 5 of the connector member 20*f*2. The phase B pulse signal, which is output from the encoder 70, is input to the terminal for detecting the phase A pulse signals of the controller 30 via the terminal 5 of the connector member 20*f*1 and the terminal 2 of the connector member 20*f*2**.

A power supply is supplied to the encoder 70 via the terminal 1 for supplying a power supply of the controller 30, the terminal 1 of the connector member **20*f*2 and the terminal 6 for supplying a power supply of the connector member 20*f*1. In the same way, a ground potential GND is supplied to the encoder 70 via the terminal 3 for supplying a ground potential GND of the controller 30, the terminal 3 of the connector member 20*f*2 and the terminal 4 for supplying a ground potential GND of the connector member 20*f*1**.

As a result, the terminal 2 and the terminal 4 of the controller 30 can detect the pulse signals having the phase relationship shown in FIG. 17(*a*), regardless the installation state on the arm 71 and regardless the specification of the encoder, such as made by company A or made by company B. In the above described embodiment, a controller which requires pulse signals having the phase relationship shown in FIG. 17(*a*) is assumed, but the present embodiment can be applied to a controller which requires pulse signals having the relationship shown in FIG. 17(*b*) just as well.

As described above, in accordance with the present embodiment, signals to be output from the rotary encoder are changed by changing the connection mode of both connector members **20*f*1 and 20*f*2**, therefore the rotary encoder can be installed on the opposite installation face, and a rotary encoder made by a manufacturer with a different specification can be used.

Now an embodiment to select a communication mode of a controller will be explained referring to FIGS. 18(*a*), 18(*b*) and 18(*c*).

When a communication is carried out between controllers in industrial machines and automobiles, such a parallel interface cable as a harness is not used, instead a serial interface cable is used for data communication to decrease the number of electric equipment parts, such as using an RS232C interface between the controller 30A and the controller 30B, and a CAN interface between the controller 30A and the controller 30C.

However, there is a demand for selecting from a plurality of communication systems using one controller 30A, for functional changes, specification changes and model changes.

So in the communication mode selection device for a controller in accordance with the present invention, a communication mode of a controller is selected by changing the connection mode of the connector members. As FIG. 18(*b*) shows, the communication mode change device for a controller comprises sensors 81 and 82, a controller 30 for communicating data with the controller 30B based on the data on the S1 and S2 signals which are input from these sensors 81 and 82, a connector **20*g* for which communication mode is changed according to the connection mode of the connector member 20*g*1 and the connector member 20*g*2, and a connector 20*h* for replacing the controller 30B with another controller by disconnecting the connector member 20*h*1 and the connector member 20*h*2**.

Each connector **20*g*1 and 20*g*2 of the connector 20*g* has terminals 1 to 8 such that a ground potential GND is supplied from the controller 30A to the controller 30B or to another controller, and to the sensors 81 and 82 without fail, an RS232C signal and CAN signal are supplied from the controller 30A to the controller 30B or to another controller without fail, and the S1 signal, which is output from the sensor 81, and the S2 signal, which is output from the sensor 282, are input to the controller 30A without fail, even if the connection mode of these connectors 20*g*1 and 20*g*2** is different.

The connectors **20*h*1 and 20*h*2 of the connector 20*h* have the terminals 1 and 2** respectively.

The terminal 1 of the connector member **20*g*1 at the controller 30A side is connected to the terminal 1 for outputting the RS232C signal of the connector member 20*g*2. In the same way, the terminal 2 of the connector member 20*g*1 is connected to the terminal 2 for supplying a ground potential GND of the connector member 20*g*2**.

The terminal 3 of the connector member **20*g*1 is connected to the terminal 3 of the connector member 20*g*2 so as to detect the S1 signal which is output from the sensor 81. In the same way, the terminal 4 of the connector member 20*g*1 is connected to the terminal 4 of the connector member 20*g*2 so as to supply a ground potential GND to the sensor 81**.

The terminal 5 of the connector member **20*g*1 is connected to the connector member 20*g*2 so as to supply a ground potential GND to the sensor 82. In the same way, the terminal 6 of the connector member 20*g*2 is connected to the connector member 20*g*2 so as to detect the S2 signal which is output from the sensor 82**.

The terminal 1 of the connector member **20*g*2, on the other hand, is connected to the terminal 1 for inputting the RS232C signal of the connector member 20*h*1 via an electronic signal wire. In the same way, the terminal 2 of the connector member 20*g*2 is connected to the terminal 2 for supplying a ground potential GND of the connector member 20*h*1** via an electric signal wire.

The terminal 3 of the connector member **20*g*2 is connected to the sensor 81 so as to detect the S1 signal which is output from the sensor 81 via an electric signal wire. In the same way, the terminal 4 of the connector member 20*g*2 is connected to the sensor 81** so as to supply a ground potential GND via an electric signal wire.

The terminal 5 of the connector member **20*g*2 is connected to the sensor 82 so as to supply a ground potential GND via an electric signal wire. In the same way, the terminal 6 of the connector member 20*g*2 is connected to the sensor 82 so as to detect the S2 signal which is output from the sensor 82** via an electric signal wire.

The other terminals 7 and 8 of the connector **20*g*2** are not connected.

At the top and bottom parts of the connection face of the connector member **20*g*1, a concave portion is formed respectively so that a convex portion formed at the top and bottom parts of the connection face of the connector 20*g*2** interfits respectively.

Figure 18A:
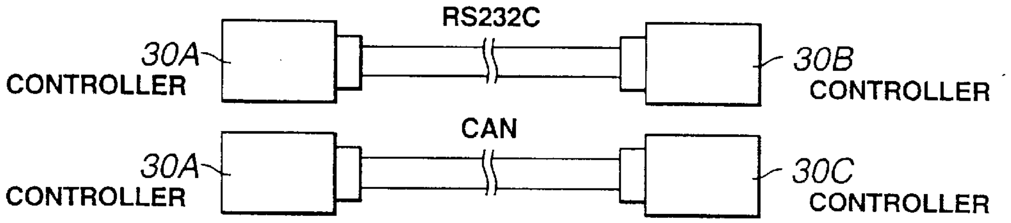
FIGS. 18(*a*) to 18(*c*) are drawings depicting a configuration of an embodiment of the connector in accordance with the present invention.
Figure 18B:
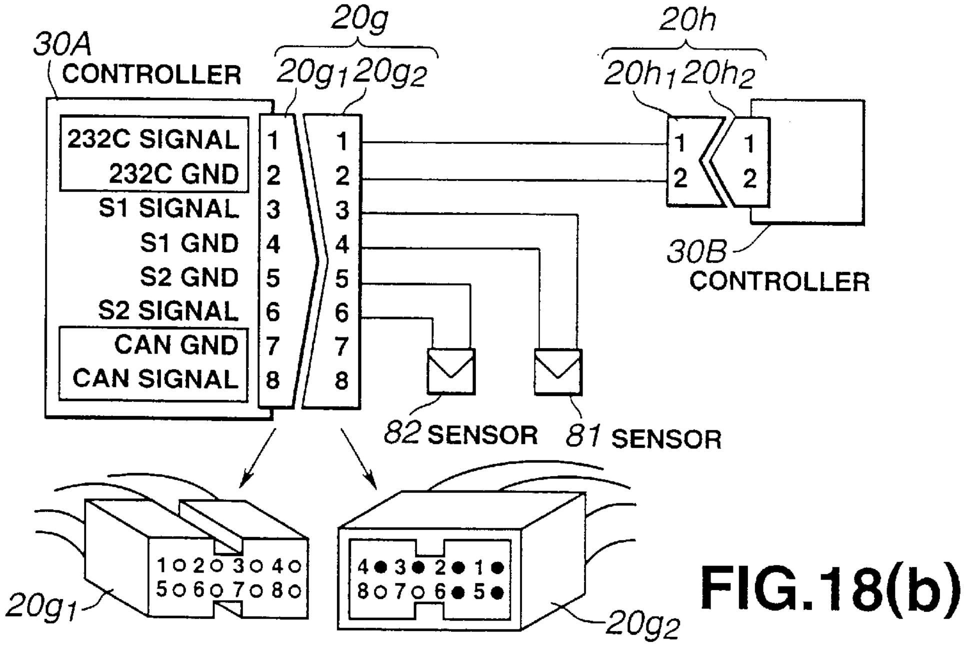
Figure 18C:
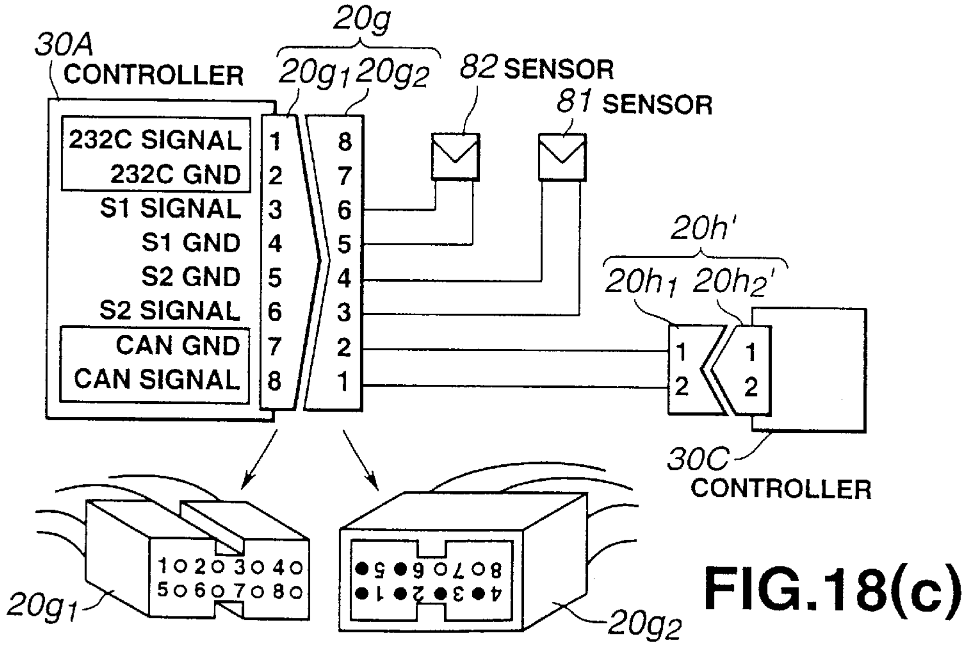
Figure 19A:
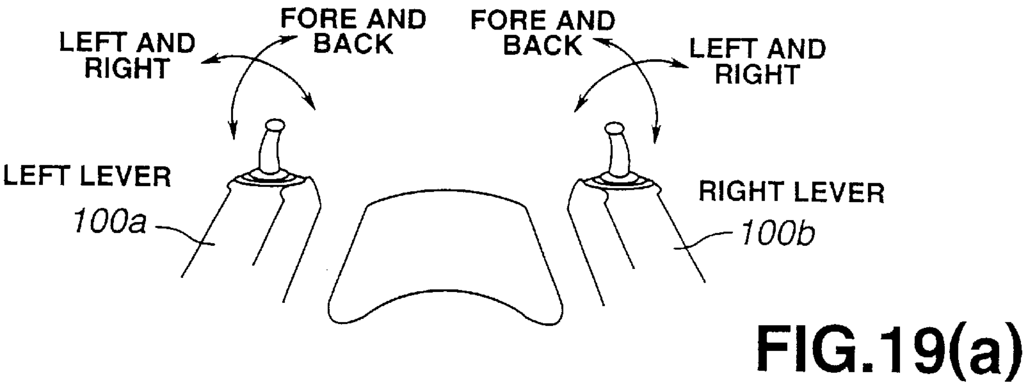
FIGS. 19(*a*) to 19(*d*) are examples of control patterns.
Figure 19B:
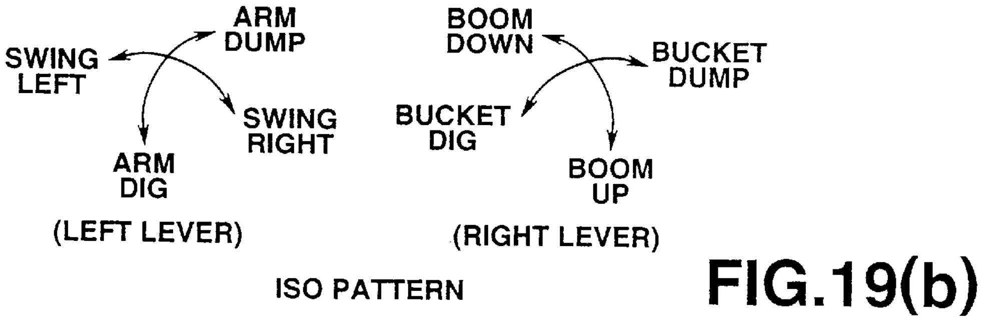
Figure 19C:
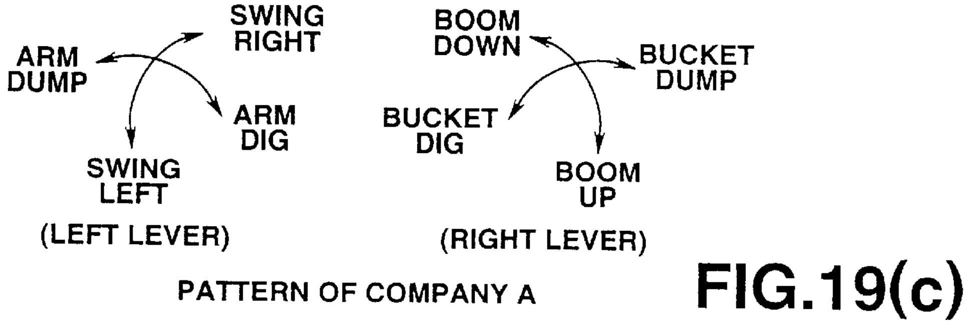
Figure 19D:
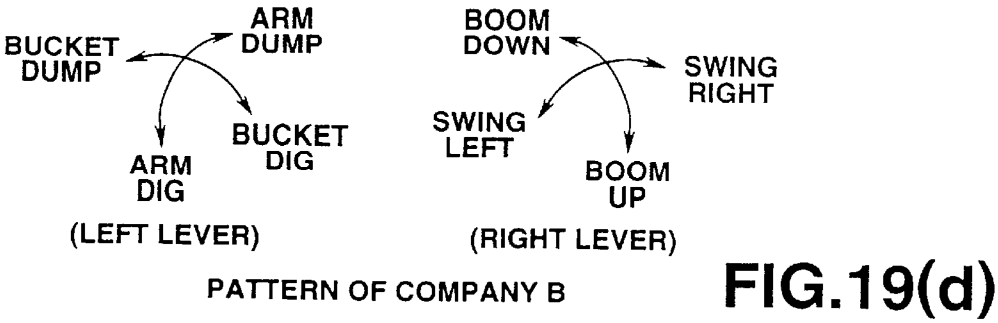
Figure 20A:
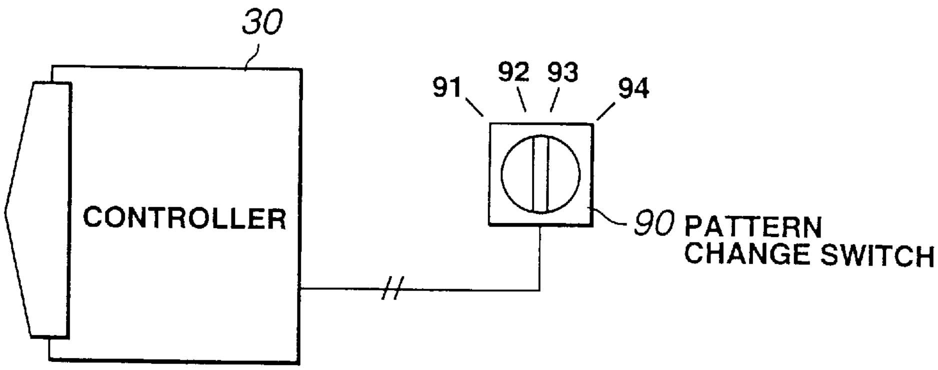
FIGS. 20(*a*) to 20(*c*) are drawings showing a prior art.
Figure 20B:
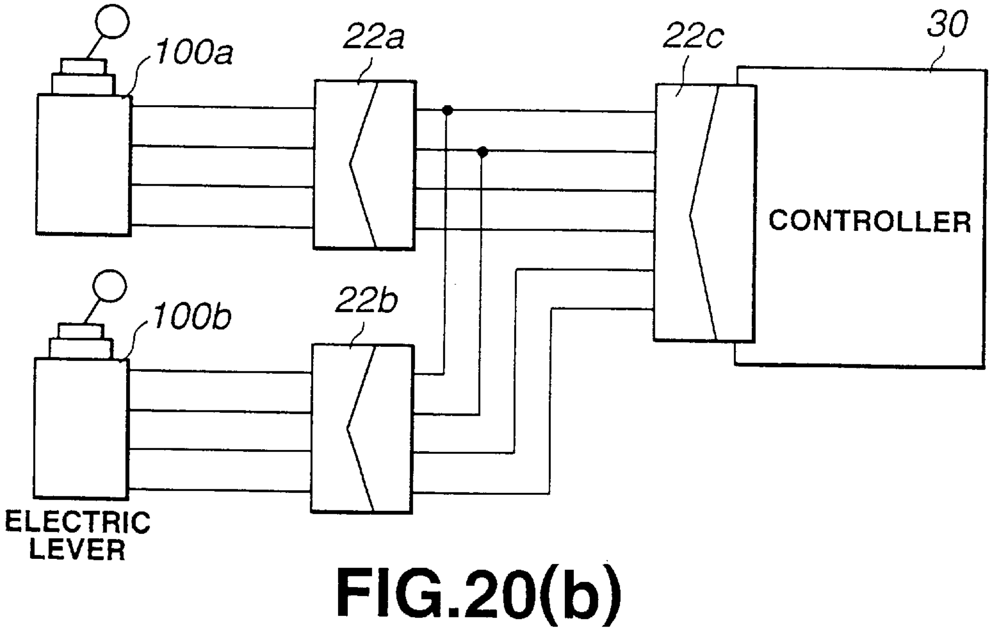
Figure 20C:
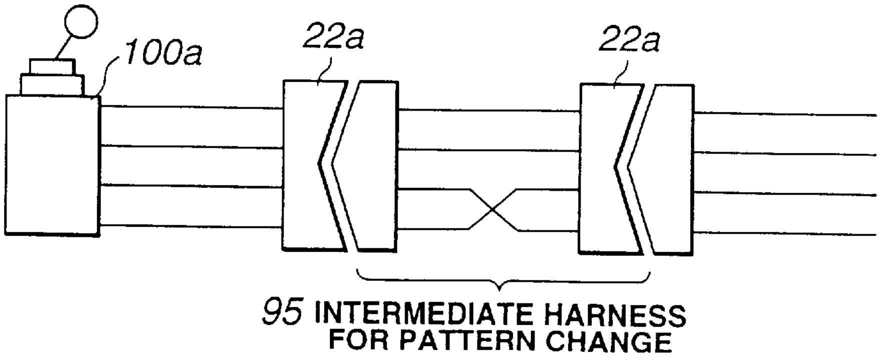

Therefore if both the connector members are connected such that the convex portions of the connector member **20*g*2 interfit with the concave portions of the connector member 20*g*1 without changing the vertical relationship shown in FIG. 18**(*b*), then the terminals 1, 2, 3, 4, 5, 6, 7, and 8 of the connector member **20*g*1 are connected to the terminals 1, 2, 3, 4, 5, 6, 7, and 8 of the connector member 20*g*2** respectively.

At this time, the RS232C signal, which is output from the controller 30A, is input to the terminal 1 for inputting the RS232C signal of the connector member **20*h*2 at the controller 30B side via the terminal 1 of the connector member 20*g*1, the terminal 1 of the connector member 20*g*2, and the terminal 1 of the connector member 20*h*1**.

The S1 signal, which is output from the sensor 81, is input to the terminal 3 for detecting the S1 signal of the connector member **20*g*1 at the controller 30A side via the terminal 3 of the connector member 20*g*2. In the same way, the S2 signal, which is output from the sensor 82, is input to the terminal 6 for detecting the S2 signal of the connector member 20*g*1 at the controller 30A side via the terminal 6 of the connector member 20*g*2**.

A ground potential GND is supplied to the terminal 2 for supplying a ground potential GND of the connector member **20*h*2 at the controller 30B side via the terminal 2 of the connector 20*g*1 of the controller 30A, the terminal 2 of the connector member 20*g*2, and the terminal 2 of the connector member 20*h*1**.

In the same way, a ground potential GND is supplied to the sensor 81 via the terminal 4 of the connector member **20*g*1 of the controller 30A and the terminal 4 of the connector member 30*g*2. Also, a ground potential GND is supplied to the sensor 82 via the terminal 5 of the connector member 20*g*1 of the controller 30A and the terminal 5 of the connector member 20*g*2**.

Here it is assumed that the connector member **20*h*2 of the controller 30B is disconnected from the connector member 20*h*1, as shown in FIG. 18**(*c*), and the connector member **20*h*2' is connected to the connector member 20*h*1 so as to connect the controller 30C instead of the controller 30**B.

As FIG. 18(*c*) shows, the connector member 20*g*2 is turned upside down in the state shown in FIG. 18(*b*), the insertion direction of the connector member 20*g*2 to the connector member 20*g*1 is changed, and the terminals 1, 2, 3, 4, 5, 6, 7 and 8 of the connector member 20*g*1 are connected to the terminals 8, 7, 6, 5, 4, 3, 2 and 1 of the connector member 20*g*2 respectively.

At this time, the CAN signal, which is output from the controller 30A, is input to the terminal 1 for inputting the CAN signal of the connector member 20*h*2' at the controller 30C side via the terminal 8 of the connector member 20*g*1, the terminal 1 of the connector member 20*g*2, and the terminal 1 of the connector member 20*h*1.

The detection signal, which is output from the sensor 82, becomes the S1 signal, and is input to the terminal 3 for detecting the S1 signal of the connector member 20*g*1 at the controller 30A side via the terminal 6 of the connector member 20*g*2. In the same way, the detection signal, which is output from the sensor 81, becomes the S2 signal, and is input to the terminal 6 for detecting the S2 signal of the connector member 20*g*1 at the controller 30A side via the terminal 3 of the connector member 20*g*2.

A ground potential GND is supplied to the terminal 2 for supplying the ground potential GND of the connector member 20*h*2' at the controller 30C side via the terminal 7 of the connector member 20*g*1 of the controller 30A, the terminal 2 of the connector member 20*g*2, and the terminal 2 of the connector member 20*h*1. In the same way, a ground potential GND is supplied to the sensor 82 via the terminal 4 of the connector member 20*g*1 of the controller 30A and the terminal 5 of the connector member 20*g*2. Also, a ground potential GND is supplied to the sensor 81 via the terminal 5 of the connector member 20*g*1 of the controller 30A and the terminal 4 of the connector member 20*g*2.

In this way, in accordance with the present embodiment, the protocol of the communication signals to be output from the controller 30A is changed from the RS232C to the CAN, by changing the connection mode of the connector members 20*g*1 and 20*g*2, and different protocol signals, such as RS232C and CAN, are sent to the controller 30B or 30C via one cable.

In this way, communication signals are changed from one controller 30A to other controllers 30B and 30C via one cable merely by changing the connection mode of the connector members 20*g*1 and 20*g*2, therefore selection from a plurality of communication systems becomes possible without increasing such an electronic equipment part as an interface cable.

What is claimed is:

1. A connector comprising a first connector member having terminals each for receiving a power signal a GND signal and each input signal and a second connector member having terminals each for outputting the power signal, the GND signal and each output signal, the second connector member having electrodes identical in number with electrodes of the first connector member, the first connector member being connected with the second connector member, wherein the power signal and the GND signal are branched and respectively connected with input terminals of the first connector member and the input signals are connected, without being branched, with input terminals of the first connector member, the power signal and the GND signal are output from same terminals of the second connector member and a same input signal is output from different terminals of the second connector member by changing a connection mode of the first connector member and the second connector member.

2. A control pattern change device comprising control means for outputting control signals according to a control input, a first connector member having terminals each for receiving a control signal for each control direction of the control means, and a second connector member having terminals each for outputting a drive signal for each drive direction of an actuator, the actuator being driven in a drive direction according to a control direction of the control means by connecting each terminal of the first connector member and each terminal of the second connector member, wherein a control signal for a same control direction of the control means is output from different terminals of the second connector member to change a control pattern by changing a connection mode of the first connector member and the second connector member.

3. The control pattern change device according to claim 2, wherein the control pattern is changed by changing an insertion direction of the first connector member to the second connector member.

4. The control pattern change device according to claim 2, wherein the first connector member has a plurality of insertion faces for the second connector member, and the control pattern is changed by changing the insertion face of the first connector member.

5. The control pattern change device according to claim 2, wherein the control pattern is changed by changing the control input of the first connector member to the second connector member.

6. A data change device comprising a first connector member having terminals each for receiving a signal, and a second connector member having terminals each for outputting a control signal to a controller, data being input to the controller to change a data content by connecting each terminal of the first connector member and each terminal of the second connector member, wherein the data content to be input to the controller is changed by changing a connection mode of the first connector member and the second connector member.

7. The data change device according to claim 6, wherein at least two terminals of the first connector member are electrically connected, at least one terminal of the second connector member conducts electric signals at logic 1 level, which are output from the controller, and the content of digital data to be input to the controller is changed by changing the connection mode of the first connector member and the second connector member.

8. A control pattern change device comprising control means for outputting control signals according to control inputs, a first connector member having terminals each for receiving a control signal for each control direction of the control means, and a second connector member having terminals each for outputting a drive signal for each drive direction of an actuator, the actuator being driven in a drive direction according to a control direction of the control means by connecting each terminal of the first connector member and each terminal of the second connector member, wherein a plurality of terminals are provided in the first connector member as terminals for receiving control signals in a same control direction of the control means, and each one of the terminals for receiving the control signal in the same control direction of the first connector member is connected to a different terminal of the second connector member to change a control pattern by changing a connection mode of the first connector member and the second connector member.

9. The control pattern change device according to claim 3, wherein the control pattern is changed by changing an insertion direction of the first connector member to the second connector member.

10. The control pattern change device according to claim 3, wherein the first connector member has a plurality of insertion faces for the second connector member, and the control pattern is changed by changing the insertion face of the first connector member.

11. The control pattern change device according to claim 3, wherein the control pattern is changed by changing the control input of the first connector member to the second connector member.

12. A failed area determination device comprising a first connector member terminals each for receiving each input signal and a second connector member having terminals each for outputting a drive signal to each equipment, a failed area in case of driving a corresponding equipment being determined according to the input signal by connecting each terminal of the first connector member and each terminal of the second connector, wherein a same input signal is output from different terminals of the second connector member by changing the connection mode of the first connector member and the second connector member, and the failed area is determined based on the drive signal output from each terminal of the second connector member for each connection mode of the first connector member and the second connector member.

13. A drive actuator change device comprising control means for instructing control amounts to a plurality of actuators, a first connector member having a terminal for supplying a power signal to the respective control means and terminals each for receiving a control signal from each one of the control means, and a second connector member having terminals each for outputting a drive signal to each equipment, the second connector member having electrodes identical in number with electrodes of the first connector member, each actuator being driven by connecting each terminal of the first connector member and each terminal of the second connector member, wherein a combination of each actuator associated with each control means is changed by changing a connection mode of the first connector member and the second connector member.

14. A control pattern change device comprising control means for outputting control signals, a first connector member having terminals each for receiving a control signal from each one of the control means, and a second connector member having terminals each for outputting a drive signal to each equipment, a corresponding equipment being driven according to the control of the control means by connecting each terminal of the first connector member and each terminal of the second connector member, wherein a plurality of terminals are provided in the first connector as terminals to receive the control signals of a same control means, and each one of the plurality of terminals to receive the control signal of the same control means of the first connector member is connected to a different terminal of the second connector member to change a control pattern by changing a connection mode of the first connector member and the second connector member.

15. A failed area determination device comprising control means for outputting control signals, a first connector member having terminals each for receiving a control signal from each one of the control means, and a second connector member having terminals each for outputting a drive signal to each equipment, a failed area in cased of driving a corresponding equipment according to the control of the control means being determined by connecting each terminal of the first connector member and each terminal of the second connector member, wherein a control signal of a same control means is output from different terminals of the second connector member by changing a connection mode of the first connector member and the second connector member, and the failed area is determined based on the drive signals output from each terminal of the second connector member for each connection mode of the first connector member and the second connector member.

16. A control pattern change device comprising control means for outputting control signals according to a control input, a first connector member having terminals each for receiving a power signal, a GND signal and a control signal for each control direction of the control means, and a second connector member having terminals each for outputting a drive signal for each drive direction of an actuator, the actuator being driven in a drive direction according to a control direction of the control means by connecting each terminal of the first connector member and each terminal of the second connector member, wherein the power signal and the GND signal are branched and respectively connected with input terminals of the first connector member and the control signals are connected, without being branched, with input terminals of the first connector member, the power signal and the GND signal are output from same terminals of the second connector member and a control signal for a same control direction of the control means is output from different terminals of the second connector member to change a control pattern by changing a connection mode of the first connector member and the second connector member.

17. A control pattern change device according to claim 16, wherein the control pattern is changed by changing an insertion direction of the first connector member to the second connector member.

18. A drive actuator change device comprising control means for instructing control amounts to a plurality of actuators, a first connector member having a terminal for supplying a power signal to each control means, a terminal for a GND signal and terminals each for receiving a control signal from each of the control means, and a second connector member having terminals each for outputting a drive signal to each equipment and having electrodes identical in number with electrodes of the first connector member, each actuator being driven by connecting each terminal of the first connector member and each terminal of the second connector member, wherein the power signal and the GND signal are branched and respectively connected with input terminals of the first connector member and the control signals are connected, without being branched, with input terminals of the first connector member, and the power signal and the GND signal are output from same terminals of the second connector member and a control signal for a same control direction of the control means is output from different terminals of the second connector member to change a combination of each actuator associated with each control means by changing a connection mode of the first connector member and the second connector member.

* * * * *